(12) United States Patent
Ryan et al.

(10) Patent No.: US 12,091,570 B2
(45) Date of Patent: *Sep. 17, 2024

(54) POLYMER COMPOSITE PHOTONIC CRYSTAL COATINGS

(71) Applicant: Colorado State University Research Foundation, Fort Collins, CO (US)

(72) Inventors: Matthew David Ryan, Berkeley, CA (US); Garret Miyake, Fort Collins, CO (US); Ryan Michael Pearson, Berkeley, CA (US)

(73) Assignee: Colorado State University Research Foundation, Fort Collins, CO (US)

( * ) Notice: Subject to any disclaimer, the term of this patent is extended or adjusted under 35 U.S.C. 154(b) by 517 days.

This patent is subject to a terminal disclaimer.

(21) Appl. No.: 17/390,238

(22) Filed: Jul. 30, 2021

(65) Prior Publication Data

US 2021/0363378 A1 Nov. 25, 2021

Related U.S. Application Data

(63) Continuation-in-part of application No. PCT/US2020/015927, filed on Jan. 30, 2020.
(Continued)

(51) Int. Cl.
*C09D 5/22* (2006.01)
*C08F 299/04* (2006.01)
(Continued)

(52) U.S. Cl.
CPC .... *C09D 155/005* (2013.01); *C08F 299/0485* (2013.01); *C08K 3/22* (2013.01);
(Continued)

(58) Field of Classification Search
CPC ............ C09D 5/004; C09D 5/32; C09D 7/41; C09D 7/61; C09D 155/005;
(Continued)

(56) References Cited

U.S. PATENT DOCUMENTS

| 4,052,539 A | 10/1977 | Shropshire et al. |
| 5,462,990 A | 10/1995 | Hubbell et al. |

(Continued)

FOREIGN PATENT DOCUMENTS

| CN | 104007489 B | 4/2016 |
| EP | 3917993 A1 | 12/2021 |

(Continued)

OTHER PUBLICATIONS

Alfrey et al., "Physical Optics of Iridescent Multilayered Plastic Films," Polym. Sci Eng., 9(6):400-404, Nov. 1969.
(Continued)

*Primary Examiner* — Bijan Ahvazi

(57) ABSTRACT

Polymer composite photonic crystal materials are disclosed as coatings which have high reflection (>30%) in a specific range of the electromagnetic spectrum, such as ultraviolet (<400 nm), visible (Vis, 400 nm-700 nm), or near-infrared radiation range (NIR, 700-2000 nm), and relatively low reflection (<20% reflection) in a second, different range of the electromagnetic spectrum. Surprisingly, it was found that through a formulation and additives approach, the optical properties of polymer composite photonic crystal films can be selectively modified from a variety of different coating methods, including spray deposition.

22 Claims, 12 Drawing Sheets

| Haze (%) | 26 |
| SHGC | 62.2 |
| $T_{vis}$ (%) | 67 |
| CRI | 96.8 |

Related U.S. Application Data

(60) Provisional application No. 62/887,186, filed on Aug. 15, 2019, provisional application No. 62/846,127, filed on May 10, 2019, provisional application No. 62/798,760, filed on Jan. 30, 2019.

(51) Int. Cl.

| | | |
|---|---|---|
| *C08K 3/22* | (2006.01) | |
| *C08K 5/00* | (2006.01) | |
| *C08K 13/02* | (2006.01) | |
| *C09D 5/32* | (2006.01) | |
| *C09D 5/33* | (2006.01) | |
| *C09D 7/41* | (2018.01) | |
| *C09D 7/61* | (2018.01) | |
| *C09D 155/00* | (2006.01) | |
| *G02B 1/11* | (2015.01) | |

(52) U.S. Cl.
CPC .......... *C08K 5/0041* (2013.01); *C08K 13/02* (2013.01); *C09D 5/004* (2013.01); *C09D 5/32* (2013.01); *C09D 7/41* (2018.01); *C09D 7/61* (2018.01); *C08K 2003/2244* (2013.01); *G02B 1/11* (2013.01)

(58) Field of Classification Search
CPC ................ C08F 299/0485; C08K 3/22; C08K 5/0041; C08K 13/02; C08K 2003/2244; G02B 1/11
See application file for complete search history.

(56) References Cited

U.S. PATENT DOCUMENTS

| | | | |
|---|---|---|---|
| 6,007,845 A | 12/1999 | Domb et al. | |
| 6,208,466 B1 | 3/2001 | Liu et al. | |
| 6,306,540 B1 | 10/2001 | Hiroi et al. | |
| 6,383,500 B1 | 5/2002 | Wooley et al. | |
| 6,407,187 B1 | 6/2002 | Matyjaszewski et al. | |
| 6,433,931 B1 | 8/2002 | Fink et al. | |
| 6,479,592 B2 | 11/2002 | Rheinberger et al. | |
| 6,489,055 B1 | 12/2002 | Ichihashi et al. | |
| 6,542,682 B2 | 4/2003 | Cotteverte et al. | |
| 6,627,314 B2 | 9/2003 | Matyjaszewski et al. | |
| 6,671,097 B2 | 12/2003 | Fink et al. | |
| 6,692,914 B1 | 2/2004 | Klaerner et al. | |
| 6,696,142 B2 | 2/2004 | Baer et al. | |
| 6,797,057 B1 | 9/2004 | Amos et al. | |
| 7,101,937 B1 | 9/2006 | Frechet et al. | |
| 7,231,122 B2 | 6/2007 | Weisberg et al. | |
| 7,251,402 B2 | 7/2007 | Akiyama et al. | |
| 7,795,355 B2 | 9/2010 | Matyjaszewski et al. | |
| 7,960,479 B2 | 6/2011 | Cheng et al. | |
| 8,415,436 B2 | 4/2013 | Han et al. | |
| 8,419,792 B2 | 4/2013 | Vanderbilt et al. | |
| 8,454,689 B2 | 6/2013 | Vanderbilt et al. | |
| 9,045,579 B2 | 6/2015 | Xia et al. | |
| 9,142,835 B2 | 9/2015 | Vicari et al. | |
| 9,382,387 B2* | 7/2016 | Xia ............ | C08G 83/008 |
| 9,453,943 B2* | 9/2016 | Miyake ............ | G02F 1/0054 |
| 9,575,212 B2 | 2/2017 | Grubbs et al. | |
| 9,957,383 B2 | 5/2018 | Macfarlane et al. | |
| 10,081,705 B2 | 9/2018 | Xia et al. | |
| 10,153,513 B2* | 12/2018 | Grubbs ............ | C08G 81/00 |
| 10,533,069 B2* | 1/2020 | Char ............ | C08J 5/18 |
| 11,053,356 B2 | 7/2021 | Grubbs et al. | |
| 11,912,886 B2* | 2/2024 | Pearson ............ | C09D 5/002 |
| 2002/0135880 A1 | 9/2002 | Fink et al. | |
| 2002/0183473 A1 | 12/2002 | Matyjaszewski et al. | |
| 2005/0192409 A1 | 9/2005 | Rhodes et al. | |
| 2006/0193578 A1 | 8/2006 | Ouderkirk et al. | |
| 2007/0099791 A1 | 5/2007 | Wan et al. | |
| 2007/0289119 A1 | 12/2007 | Lee et al. | |
| 2009/0323014 A1 | 12/2009 | Cunningham et al. | |
| 2010/0305368 A1 | 12/2010 | Grubbs et al. | |
| 2011/0015363 A1 | 1/2011 | Marchand et al. | |
| 2013/0296491 A1 | 11/2013 | Xia et al. | |
| 2013/0324666 A1 | 12/2013 | Xia et al. | |
| 2014/0011958 A1 | 1/2014 | Miyake et al. | |
| 2014/0218792 A1 | 8/2014 | Krogman et al. | |
| 2014/0243483 A1 | 8/2014 | Grubbs et al. | |
| 2016/0024244 A1 | 1/2016 | Xia et al. | |
| 2016/0024250 A1 | 1/2016 | Yang et al. | |
| 2016/0068669 A1 | 3/2016 | Macfarlane et al. | |
| 2016/0289392 A1 | 10/2016 | Grubbs et al. | |
| 2016/0356923 A1 | 12/2016 | Miyake et al. | |
| 2017/0018801 A1 | 1/2017 | Grubbs et al. | |
| 2017/0057908 A1 | 3/2017 | Jones et al. | |
| 2017/0062874 A1 | 3/2017 | Jones et al. | |
| 2018/0067393 A1 | 3/2018 | Weitekamp | |
| 2018/0094099 A1 | 4/2018 | Johnson et al. | |
| 2018/0223034 A1 | 8/2018 | Char et al. | |
| 2018/0258230 A1 | 9/2018 | Grubbs et al. | |
| 2019/0085118 A1 | 3/2019 | Lee et al. | |
| 2021/0230444 A1 | 7/2021 | Pearson et al. | |
| 2021/0355261 A1 | 11/2021 | Pearson et al. | |
| 2021/0363378 A1 | 11/2021 | Ryan et al. | |
| 2021/0395463 A1 | 12/2021 | Grubbs et al. | |

FOREIGN PATENT DOCUMENTS

| | | |
|---|---|---|
| EP | 3917994 A2 | 12/2021 |
| JP | 2006052326 A | 2/2006 |
| JP | 2008102183 A | 5/2008 |
| JP | 2008239588 A | 10/2008 |
| JP | 2016535720 A | 11/2016 |
| JP | 2022523113 A | 4/2022 |
| JP | 2022523114 A | 4/2022 |
| KR | 20210121160 A | 10/2021 |
| KR | 20210122811 A | 10/2021 |
| WO | 2012124693 A1 | 9/2012 |
| WO | 2013138494 A1 | 9/2013 |

OTHER PUBLICATIONS

Chang et al., "Design, Synthesis, and Self-Assembly of Polymers with Tailored Graft Distributions," J Am Chem Soc., 139(48):17683-17693, Nov. 2017.

Chantakit et al., "Ultra-High Green Light Transparency Coating on 1D Photonic Crystal Structure," Siam Physics Congress 2017 (SPC2017), J Phys. Conference Series, 901(1):012150, Sep. 2017.

Edrington et al., "Polymer-Based Photonic Crystals," Adv Mater., 13(6):421-425, Mar. 2001.

International Search Report and Written Opinion of the ISA/US in PCT/US2020/015927, dated Oct. 7, 2020; 9pgs.

International Search Report and Written Opinion of the ISA/US in PCT/US2020/015928, dated May 26, 2020; 10pgs.

Krogman et al., "Industrial-Scale Spray Layer-by-Layer Assembly for Production of Biomimetic Photonic Systems," Bioinspir. Biomim., 8(4):045005, Dec. 2013.

Liberman-Martin et al., "Application of Bottlebrush Block Copolymers as Photonic Crystals," Macromol Rapid Commun., 38(13):1700058, May 2017.

Macfarlane et al., "Improving Brush Polymer Infrared One-Dimensional Photonic Crystals via Linear Polymer Additives," J Am Chem Soc., 136(50):17374-17377, Dec. 2014, Supporting Information.

Macfarlane et al., "Improving Brush Polymer Infrared One-Dimensional Photonic Crystals via Linear Polymer Additives," J Am Chem Soc., 136(50):17374-17377, Dec. 2014.

Müller et al., "Dye-Containing Polymer Beads as Photonic Crystals," Chem. Mater., 12(8):2508-2512, Abstract, Aug. 2000.

Radford et al., "Reflectivity of Iridescent Coextruded Multilayered Plastic Films," Polym Sci Eng., 13(3):216-221, May 1973.

Runge et al., "Synthesis of High Molecular Weight Comb Block Copolymers and Their Assembly into Ordered Morphologies in the Solid State," J Am Chem Soc., 129(34):10551-10560, Aug. 2007.

Schrenk et al., "Some Physical Properties of Multilayered Films," Polym Eng Sci., 9(6):393-399, Nov. 1969.

(56) References Cited

OTHER PUBLICATIONS

Sveinbjörnsson et al., "Rapid Self-Assembly of Brush Block Copolymers to Photonic Crystals," Proc Natl Acad Sci USA, 109(36):14332-14336, Sep. 2012.
Takiguchi, "PIndustrial Application of Three-Dimensional Colloidal Photonic Crystals Made in Space," International Symposium on Advanced Nanodevices and Nanotechnology, J Physics Conference Series, 109:012004, Jan. 2008.
Saariaho et al., "Effect of Side Chain Rigidity on the Elasticity of Comb Copolymer Cylindrical Brushes: A Monte Carlo Simulation Study", Macromolecules, 1999, 32(13): 4439-4443.
Sahara et al., "Efficient Photocatalysts for CO2 Reduction", Inorg. Chem., 2015, 54:5096-5104.
Sampson et al., "Direct Observation of the Reduction of Carbon Dioxide by Rhenium Bipyridine Catalysts", Energy Environ. 2013, Sci., 6:3748-3755.
Segalman, "Patterning with Block Copolymer Thin Films", Materials Science and Engineering, 2005, R48:191-226.
Semenov, "Contribution to the Theory of Microphase Layering in Block-Copolymer Melts", Sov. Phys. JETP, 1985, 61(4): 733-742.
Sing et al., "Theory of Melt Polyelectrolyte Blends and Block Copolymers: Phase Behavior, Surface Tension, and Microphase Periodicity", J. Chem. Phys., 2015, 142:034902.
Singh et al., "Effect of Molecular Weight on the Mechanical and Electrical Properties of Block Copolymer Electrolytes", Macromolecules. 2007, 40(13):4578-4585.
Slugovc et al., "The Resting State Makes the Difference: The Influence of the Anchor Group in the ROMP of Norbornene Derivatives", Macromol. Rapid Commun., 2004, 25: 475-480.
Song et al., "Review of Gel-Type Polymer Electrolytes for Lithium-Ion Batteries", J. Power Sources, 1999, 77:183-197.
Soo et al., "Preparation of Block Copolymer Vesicles in Solution", J. Polym. Sci. Part B.: Polym. Phy., 2004, 42(6):923-938.
Stephan et al., "Review on Composite Polymer Electrolytes for Lithium Batteries", Polymer, 2006, 47(16):5952-5964.
Stoykovich et al., "Block Copolymers and Conventional Lithography", Materials Today, 2006, 9:20.
Sun et al., "Structure-Conductivity Relationship for Peptoid-Based PEO-Mimetic Polymer Electrolytes", Macromolecules, 2012, 45(12):5151-5156.
Susan et al., "Ion Gels Prepared by in Situ Radical Polymerization of Vinyl Monomers in an Ionic Liquid and Their Characterization as Polymer Electrolytes", J. Am. Chem. Soc., 2005, 127(13):4976-4983.
Sutthasupa et al., "Recent Advances in Ring-Opening Metathesis Polymerization, and Application to Synthesis of Functional Materials", Polym. J., 2010, 42:905-915.
Tang et al., "Synthesis and properties of heterografted toothbrush-like copolymers with alternating PEG and PCL grafts and Tunable RAFT-generated segments", 2014 Polymer Chemistry 5, 4679-4692 and supporting information.
Teran et al., "Discontinuous Changes in Ionic Conductivity of a Block Copolymer Electrolyte through an Order-Disorder Transition", ACS Macro Letters, 2012, 1(2):305-309.
Teran et al., "Thermodynamics of Block Copolymers with and without Salt", The J. of Physical Chemistry B., 2014, 118(1):4-17.
Trapa et al., "Rubbery Graft Copolymer Electrolytes for Solid-State, Thin-Film Lithium Batteries", J. of the Electrochemical Society, 2005, 152(1):A1-A5.
Trapa et al., "Synthesis and Characterization of Single-Ion Graft Copolymer Electrolytes", J. of the Electrochemical Society, 2005, 152(12):A2281-A2284.
Troparevsky et al., "Transfer-Matrix Formalism for the Calculation of Optical Response in Multilayer Systems: From Coherent to Incoherent Interference", Optics Express, 2010, 18:24715-24721.
Tseng et al., "Block Copolymer Nanostructures for Technology", Polymer, 2010, 2:470-489.
Ueki et al., "Macromolecules in Ionic Liquids: Progress, Challenges, and Opportunities", Macromolecules, 2008, 41(11):3739-3749.

Urbas et al., "One-Dimensionally Periodic Dielectric Reflectors from Self-Assembled Block Copolymers—Homopolymer Blends", Macromolecules, 1999, 32:4748-4750.
Urbas et al., "Tunable Block Copolymer/Homopolymer Photonic Crystals", Adv. Mater., 2000, 12:812-814.
Valkama et al., "Self-Assembled Polymeric Solid Films with Temperature-Induced Large and Reversible Photonic-Bandgap Switching", Nature Mater., 2004, 3:872-876.
Van Gurp et al., "Time-Temperature Superposition for Polymer Blends", Rheol. Bull., 1998, 67:5-8.
Van Ruymbeke et al., "Molecular Rheology of Branched Polymers: Decoding and Exploring the role of Architectural Dispersity Through a Synergy of Anionic Synthesis, Interaction Chromatography, Rheometry and Modeling", Soft Matter, 2014, 10: 4762-4777.
Verduzco et al., "Structure, Function, Self-Assembly, and Applications of Bottlebrush Copolymers", Chem. Soc. Rev., 2015, 44:2405-2420.
Vygodskii et al., "Cyclopolymerization of N,N-Dipropargylamines and N,N-Dipropargyl Ammonium Salts", Macromolecules, 2008, 41: 1919-1928.
Walsh et al., "Electrocatalytic CO2 Reduction with a Membrane Supported Manganese Catalyst in Aqueous Solution", Chem. Commun., 2014, 50:12698-12701.
Wanakule et al., "Thermodynamic Properties of Block Copolymer Electrolytes Containing Imidazolium and Lithium Salts", Macromolecules, 2010, 43:8282-8289.
Wang et al., "All Solid-State Lithium-Polymer Battery Using a Self-Cross-Linking Polymer Electrolyte", J. of the Electrochemical Society, 2003, 150(9):A1166-A1170.
Welton, "Room-Temperature Ionic Liquids. Solvents for Synthesis and Catalysis", Chem. Rev., 1999, 99:2071-2084.
Westphalen et al., "Metal Cluster Enhanced Organic Solar Cells", Solar Energy Materials & Solar Cells, 1999, 61:97-105.
Windmon et al., "Diels-Alder Reactions in the Presence of a Minimal Amount of Water", Green Chemistry Letters and Reviews, 2008, 1: 155-163.
Xu et al., "Fabrication of Silicon Oxide Nanodots with an Areal Density Beyond 1 Teradots Inch-2", Adv. Mater., 2011, 22:5755.
Xu et al., "Molecular Pressure Sensors", Adv. Mater., 2007, 19(19): 2930-2934.
Yavitt et al., "High Molecular Mobility and Viscoelasticity of Microphase-Separated Bottlebrush Diblock Copolymer Melts", Macromolecules, 2017, 50(1): 396-405.
Yoon et al., "Optically Transparent and High Molecular Weight Polyolefin Block Copolymers Toward Self-Assembled Photonic Band Gap Materials", Macromolecules, 2006, 39:1913-1919.
Yoon et al., "Self-Assembly of Block Copolymers for Photonic-Bandgap Materials", MRS Bull., 2005, 30: 721-726.
Young et al., "Block Copolymer Electrolytes for Rechargeable Lithium Batteries", J. of Polymer Science Part B: Polymer Physics, 2014, 52(1):1-16.
Young et al., "Investigating Polypropylene-Poly(Ethylene Oxide)-Polypropylene Triblock Copolymers as Solid Polymer Electrolytes for Lithium Batteries", Solid State Ionics, 2014, 263:87-94.
Yuan et al., "Ionic Conductivity of Low Molecular Weight Block Copolymer Electrolytes", Macromolecules, 2013, 46(3):914-921.
Zhang, "Block Copolymer-Based Ion Gels as Solid Polymer Electrolytes", Dissertation (Ph.D.). University of Minnesota 2012.
Zhang et al., "Cylindrical Polymer Brushes", J. Polym. Sci. Part A: Polym. Chem., 2005, 43:3461-3481.
Zhang et al., "Design of Graft Block Polymer Thermoplastics", Macromolecules, 2016, 49(23): 9108-9118.
Zhang et al., "Physical Properties of Ionic Liquids: Database and Evaluation", J. Phys. Chem. Ref. Data., 2006, 35:1475-1517.
Zhang et al., "Well-Defined Polyethylene-Based Random, Block, and Bilayered Molecular Cobrushes", Macromolecules, 2015, 48(11): 3556-3562.
Zhulina, "Polymer brushes: Polymers in Soft and Biological Matter", Boulder CO, USA, Institute of Macromolecular Compounds, Russian Academy of Sciences, St. Petersburg, Russia (Jul. 30-Aug. 1, 2012).
Zhulina, "Polymer brushes: Simple Views on Polymers at Surfaces and Interfaces: Simposium Honoring P.-G. de Gennes", APS meet-

(56) References Cited

OTHER PUBLICATIONS ing, Mar. 13, 2008, New Orleans USA, Institute of Macromolecular Compounds, Russian Academy of Sciences, St. Petersburg, Russia.
Zigon et al., "The Proceedings of the Austrian—Slovenian Polymer Meeting 2013", Centre of Excellence PoliMaT. Bled, Slovenia., www.aspm.si, (Apr. 3-5, 2013), pp. 1-303.
Extended Search Report of the EPO dated Mar. 13, 2023 in EP Application No. 20748208.4; 7pgs.
Xia et al., "Efficient Synthesis of Narrowly Dispersed Brush Copolymers and Study of Their Assemblies: The Importance of Side Chain Arrangement", J. Am. Chem. Soc., 131, 18525-18532, Nov. 2009.
Extended Search Report and Written Opinion of the European Patent Office dated Mar. 13, 2023 in EP Application No. 20766785.8; 8pgs.
Song et al., "Hierarchical Photonic Pigments via the Confined Self-Assembly of Bottlebrush Block Copolymers" ACS Nano 2019, Jan. 8, 2019, 13, pp. 1764-1771.
Song et al., "Thermally Tunable Metallodielectric Photonic Crystals from the Self-Assembly of Brush Block Copolymers and Gold Nanoparticles", Adv. Optical Mater. 2015, Jan. 1, 2015, vol. 3, No. 9, pp. 1169-1175.
Verduzco et al., "Structure, function, self-assembly, and applications of bottlebrush copolymers", Chem. Soc. Rev., 2015, 44, pp. 2405-2420.
Kang et al., "Broad-Wavelength-Range Chemically Tunable Block-Copolymer Photonic Gels", Nat. Mater., 2007, 6:957-960.
Kapnistos et al., "Nonlinear Rheology of Model Comb Polymers", J. Rheol., 2009, 53:1133-1153.
Karl et al., "Modern Global Climate Change", Science, 2003, 302:1719-1723.
Kim et al., "Artificial Photosynthesis for Sustainable Fuel and Chemical Production", Angew. Chem., Int. Ed., 2015, 54:3259-3266.
Kim et al., "From Self-Assembled Monolayers to Coatings: Advances in the Synthesis and Nanobio Applications of Polymer Brushes", Polymers, 2015, 7:1346-1378.
Kortlever et al., "Catalysts and Reaction Pathways for the Electrochemical Reduction of Carbon Dioxide", J. Phys. Chem. Lett., 2015, 6:4073-4082.
Krause et al., "Simple Synthesis of Poly(acetylene) Latex Particles in Aqueous Media", Angew. Chem. Int. Ed., 2003, 42: 5965-5969.
Kuan et al., "Controlled Ionic Conductivity via Tapered Block Polymer Electrolytes", RSC Advances, Jan. 23, 2015, 5(17):12597-12604.
Lei et al., "Gas Solubility in Ionic Liquids", Chem. Rev., 2013, 114:1289-1326.
Leitgeb et al., "The ROMP toolbox upgraded", Polymer, 2010, 51:2927-2946.
Li et al., "Dynamic Cylindrical Assembly of Triblock Copolymers by a Hierarchical Process of Covalent and Supramolecular Interactions", J. Am. Chem. Soc. 2011, 133(5):1228-1231.
Li et al., "Facile Syntheses of Cylindrical Molecular Brushes by a Sequential RAFT and ROMP "Grafting-Through" Methodology", J. Polym. Sci., Part A: Polym. Chem., 2009, 47(20): 5557-5563.
Li et al., "Surface Properties of Bottlebrush Polymer Thin Films", Macromolecules, 2012, 45(17):7118-7127.
Lim et al., "A Review on the Electrochemical Reduction of $CO_2$ in Fuel Cells, Metal Electrodes and Molecular Catalysts", Catal. Today, 2014, 233:169-180.
Lin et al., "A Three-Dimensional Photonic Crystal Operating at Infrared Wavelengths", Nature, 1998, 394:251-253.
Lin et al., "Control of Grafting Density and Distribution in Graft Polymers by Living Ring-Opening Metathesis Copolymerization", J. Am. Chem. Soc., 2017,139: 3896-3903.
Lin et al., "Ionic Liquid Co-catalyzed Artificial Photosynthesis of CO", Sci. Rep., Jan. 11, 2013, 3:1056. pp. 1-5.
Lindquist et al., "Plasmonic Nanocavity Arrays for Enhanced Efficiency in Organic Photovoltaic Cells", Applied Physics Letters, 2008, 93:123308.
Lopes et al., "Hierarchical Self-Assembly of Metal Nanostructures on Diblock Copolymer Scaffolds", Nature, 2001, 414:735-738.
Lu et al., "One-Pot Synthesis of Brush-Like Polymers via Integrated RingOpening Metathesis Polymerization and Polymerization of Amino Acid N-Carboxyanhydrides", J Am Chem Soc. Sep. 30, 2009; 131(38): 13582-13583.
Luca et al., "The Selective Electrochemical Conversion of Preactivated $CO_2$ to Methane", J. Electrochem. Soc., 2015, 162:H473-H476.
Luttge, "Massively Parallel Fabrication of Repetitive Nanostructures: Nanolithography for Nanoarrays", J. Phys. D: Appl. Phys., 2009, 42:123001.
MacFarlane et al., "Energy Applications of Ionic Liquids", Energy & Environmental Science, 2013, 7(1):232-250.
Maeda et al., "Helical Polymer Brushes with a Preferred-Handed Helix-Sense Triggered by a Terminal Optically Active Group in the Pendant", Chem. Commun,, 2012,48: 3342-3344.
Mahurin et al., "High $CO_2$ Solubility, Permeability and Selectivity in Ionic Liquids with the Tetracyanoborate Anion", RSC Adv., 2012, 2:11813-11819.
Mai et al., "Self-Assembly of Block Copolymers", A. Chem. Soc. Rev., 2012, 41: 5969-5985.
Mai et al., "Topology-Controlled Relaxation Dynamics of Single Branched Polymers", ACS Macro Lett., 2015, 4(4): 446-452.
Manbeck et al., "Push or Pull? Proton Responsive Ligand Effects in Rhenium Tricarbonyl $CO_2$ Reduction Catalysts", J. Phys. Chem. B., 2015, 119:7457-7466.
Matsen, "Melts of Semiflexible Diblock Copolymer", The Journal of Chemical Physics, 1996, 104: 7758-7764.
Matsen et al., "Conformationally Asymmetric Block Copolymers", J. Poly. Sci. Part B: Polym. Phys., 1997, 35:945-952.
Matsubara et al., "Thermodynamic Aspects of Electrocatalytic $CO_2$ Reduction in Acetonitrile and with an Ionic Liquid as Solvent or Electrolyte", ACS Catal., 2015, 5:6440-6452.
Mcintosh et al., "Evolution of Morphology, Modulus, and Conductivity in Polymer Electrolytes Prepared via Polymerization-Induced Phase Separation", Macromolecules, 2015, 48(5):1418-1428.
Mcleish, "Tube Theory of Entangled Polymer Dynamics", Advances in Physics, 2002, 51: 1379-1527.
Miranda et al., "Cross-Linked Block Copolymer/Ionic Liquid Self-Assembled Blends for Polymer Gel Electrolytes with High Ionic Conductivity and Mechanical Strength", Macromolecules, 2013, 46(23):9313-9323.
Miyake et al., "Synthesis of Isocyanate-Based Brush Block Copolymers and Their Rapid Self-Assembly to Infrared-Reflecting Photonic Crystals", J. Am. Chem. Soc. 2012, 134, 34, 14249-14254.
Moatsou et al., "Precision polymers: a kinetic approach for functional poly(norbornenes)", Chem. Sci., 2014, 5: 2246-2250.
Moon et al., "Chemical Aspects of Three-Dimensional Photonic Crystals", Chem. Rev., 2010, 110:547-574.
Muftuoglu et al., "Photoinitiated Crosslinking and Grafting of Methylmethacrylate Using N,N-Dimethyl Amino Functional Polystyrene Block Copolymers", Turk. J. Chem., 2004, 28:469-476.
Mullner et al., "Cylindrical polymer brushes—Anisotropic building blocks, unimolecular templates and particulate nanocarriers", Polymer, 2016, 98: 389-401.
Nguyen et al., "Nanocomposite Hydrogels based on Liquid Crystalline Brush-like Block Copolymer/Au nanorods and its Application in $H_2O_2$ Detection", Chem. Commun., (May 28, 2015), 51:12174-12177.
Nicholson et al., "Theory of Stationary Electrode Polarography. Single Scan and Cyclic Methods Applied to Reversible, Irreversible, and Kinetic Systems", Anal. Chem., 1964, 36:706-723.
Niitani et al., "Star-Shaped Polymer Electrolyte with Microphase Separation Structure for All-Solid-State Lithium Batteries", J. of the Electrochemical Society, 2009, 156(7):A577-A583.
Niitani et al., "Synthesis of Li+ Ion Conductive PEO-PSt Block Copolymer Electrolyte with Microphase Separation Structure", Electrochem. Solid-State Lett., 2005, 8:A385-A388.
Noel et al., "Self-Reporting Degradable Fluorescent Grafted Copolymer Micelles Derived from Biorenewable Resources", ACS Macro Letters, 2015, 4: 645-650.

(56) References Cited

OTHER PUBLICATIONS

Oh et al., "Ionic Liquids Enhance the Electrochemical CO2 Reduction Catalyzed by Moo2", Chem. Commun., 2015, 51:13698-13701.
Ong et al., "Electrochemical Windows of Room-Temperature Ionic Liquids from Molecular Dynamics and Density Functional Theory Calculations", Chem. Mater., 2011, 23:2979-2986.
Orfanidis, "Electromagnetic Waves and Antennas", Rutgers University, Jun. 1, 2014, retrieved from http://www.ece.rutgers.edu/~orfanidi/ewa/, 610 pages.
Pangborn et al., "Safe and Convenient Procedure for Solvent Purification", Organometallics, 1996, vol. 15, No. 5, pp. 1518-1520.
Paquet et al., "Nanostructured Polymers for Photonics", Materials Today, 2008, 11: 48-56.
Park et al., "Block Copolymer Lithography: Periodic Arrays of-1011 Holes in 1 Square Centimeter", Science, 1997, 276:1401-1404.
Park et al., "Enabling Nanotechnology with Self Assembled Block Copolymer Patterns", Polymer, 2003, 44:6725-6760.
Park et al., "Macroscopic 10-Terabit-per-Square-Inch Arrays from Block Copolymers with Lateral Order", Science, 2009, 323:1030-1033.
Parnell et al., "Continuously Tuneable Optical Filters from Self-Assembled Block Copolymer Blends", Soft Matter, 2011, 7:3721-3725.
Paturej et al., "Molecular Structure of Bottlebrush Polymers in Melts", Science Advances, 2016, 2(11): e1601478.
Patz et al., "Impact of Regional Climate Change on Human Health", Nature, 2005, 438:310-317.
Pedersen et al., "Determination of size distribution from small-angle scattering data for systems with effective hard-sphere interactions", J. of Applied Crystallography, 1994, 27(4):595-608.
Pelletier et al., "Aluminum Nanowire Polarizing Grids: Fabrication and Analysis", Appl. Phys. Lett., 2006, 88:211114.
Peng et al., "Surface Urban Heat Island Across 419 Global Big Cities", Environ. Sci. Technol., 2012, 46(2), 696-703.
Pesek et al., "Small-Angle Neutron Scattering Analysis of Bottlebrush Backbone and Side Chain Flexibility", J. Polym. Sci., Part B: Polym. Phys., 2017, 55(1): 104-111.
Pesek et al., "Small-Angle Neutron Scattering Analysis of Bottlebrush Polymers Prepared via Grafting-Through Polymerization", Macromolecules, 46(17): 2013, 6998-7005.
Polymeropoulos et al., "50th Anniversary Perspective: Polymers with Complex Architectures", Macromolecules, 2017, 50(4):1253-1290.
Pusey et al., "Phase Behaviour of Concentrated Suspensions of Nearly Hard Colloidal Spheres", Nature, 1986, 320(6060):340-342.
Qiu et al., "Self-Assembled Polyethylenimine-Graft-Poly(£-Caprolactone) Micelles as Potential Dual Carriers of Genes and Anticancer Drugs", Biomaterials, 28(28): 2007, 4132-4142.
Quezada et al., "Electrocatalytic Reduction of Carbon Dioxide on a Cobalt Tetrakis(4-Aminophenyl)Porphyrin Modified Electrode in Bmimbf4", New J. Chem., 2014, 38:3606-3612.
Quinn et al., "Novel Electrochemical Studies of Ionic Liquids", Langmuir, 2002, 18:1734-1742.
Radzinski et al., "Bottlebrush Polymer Synthesis by Ring-Opening Metathesis Polymerization: The Significance of the Anchor Group", J. Am. Chem. Soc., 2016, 138(22): 6998-7004.
Radzinski et al., "Synthesis of Bottlebrush Polymers Via Transfer-to and Grafting-through Approaches using a RAFT Chain Transfer Agent with a ROMP-Active Z-Group", Polym. Chem., 2015, 6: 5643-5652.
Radzinski et al., "Tapered Bottlebrush Polymers: Cone-Shaped Nanostructures by Sequential Addition of Macromonomers", ACS Macro Lett., 2017, 6(10): 1175-1179.
Rathgeber et al., "On the shape of bottle-brush macromolecules: Systematic variation of architectural parameters", The J. Chem. Phys., 2005, 122: 124904.
Rey et al., "Structural Transition in an Ionic Liquid Controls CO2 Electrochemical Reduction", J. Phys. Chem. C., 2015, 119:20892-20899.

Rizwan et al., "A Review on the Generation, Determination and Mitigation of Urban Heat Island", J. of Environmental Sciences, 2008, 20:120-128.
Rogers et al., "Voltammetric Characterization of the Ferrocene|Ferrocenium and Cobaltocenium|Cobaltocene Redox Couples in RTILs", J. Phys. Chem. C., 2008, 112:2729-2735.
Rule et al., "ROMP Reactivity of endo- and exo-Dicyclopentadiene", Macromolecules, 2002, 35(21): 7878-7882.
Rutenberg et al., "Synthesis of Polymer Dielectric Layers for Organic Thin Film Transistors via Surface-Initiated Ring-Opening Metathesis Polymerization", J. Am. Chem. Soc., 2004, 126(13):4062-4063.
Rzayev, "Molecular Bottlebrushes: New Opportunities in Nanomaterials Fabrication", J. ACS Macro. Lett., 2012, 1:1146-1149.
Rzayev, "Synthesis of Polystyrene-Polylactide Bottlebrush Block Copolymers and Their Melt Self-Assembly into Large Domain Nanostructures", Macromolecules, 2009, 42:2135-2141.
International Search Report and Written Opinion for International Application No. PCT/US2013/030978, Search completed Jul. 17, 2013, Mailed Jul. 18, 2013, 10 pg.
Aguirre et al., "Tunable Colors in Opals and Inverse Opal Photonic Crystals", Adv. Funct. Mater., 20:2565-2578.
Akbari et al., "Cool Surfaces and Shade Trees to Reduce Energy Use and Improve Air Quality in Urban Areas", Solar Energy, (2001), 70(3): 295-310.
Al Samak et al., "Alternating ring-opening metathesis copolymerization of bicyclo[2.2.1]hept-2-ene and cyclopentene", J. Chem. Commun., 2057-2058 (1997).
Alberico et al., "Towards a Methanol Economy Based on Homogeneous Catalysis: Methanol to H2 and CO2 to Methanol", Chem. Commun. (2015), 51:6714-6725.
Albert et al., "Self-Assembly of Block Copolymer Thin Films", Materials Today, (2010) 13(6):24-33.
Alvarez-Guerra et al., "Ionic Liquids in the Electrochemical Valorisation of CO2", Energy Environ. Sci., 8:2574-2599 (2015).
Appel et al., "Frontiers, Opportunities, and Challenges in Biochemical and Chemical Catalysis of CO2 Fixation", Chem. Rev., 113:6621-6658 (2013).
Armand et al., "Ionic-Liquid Materials for the Electrochemical Challenges of the Future", Nat. Mater., 8:621-629 (2009).
Atwater et al., "Plasmonics for improved photovoltaic devices", Nature Materials, vol. 9, No. 3, Feb. 19, 2010, pp. 205-213, DOI: 10.1038/NMAT2629.
Azzaroni, "Polymer Brushes Here, There, and Everywhere: Recent Advances in Their Practical Applications and Emerging Opportunities in Multiple Research Fields", J. of Polymer Science Part A: Polymer Chemistry. 50:3225-3258 (2012).
Bae et al., "Organization of Rigid Wedge-Flexible Coil Block Copolymers into Liquid Crystalline Assembly", Macromolecules, 2005, 38(10):4226-4230.
Bajpai et al., "Responsive Polymers in Controlled Drug Delivery", Progress in Polymer Science, 2008, 33:1088-1118.
Bang et al., "Dual Templating Synthesis of Mesoporous Titanium Nitride Microspheres", Adv. Mater., 2009, 21:3186-3190.
Barrosse-Antle et al., "Voltammetry in Room Temperature Ionic Liquids: Comparisons and Contrasts with Conventional Electrochemical Solvents", Chem. Asian J., 2010, 5:202-230.
Bates et al., "50th Anniversary Perspective: Block Polymers-Pure Potential", Macromolecules, 2017, 50(1): 3-22.
Bates et al., "ABA Triblock Brush Polymers: Synthesis, Self-Assembly, Conductivity, and Rheological Properties", Macromolecules, 2015, 48:4967-4973.
Bates et al., "Block Copolymer Thermodynamics: Theory and Experiment", Ann. Rev. Phys. Chem., 1990, 41:525-557.
Bates et al., "Block Copolymers-Designer Soft Materials", Physics Today, 1999, 52:32-38.
Bates et al., "Multiblock Polymers: Panacea or Pandora's Box?", Science, 2012, 336:434-440.
Benitez et al., "Conformational Analysis of Olefin-Carbene Ruthenium Metathesis Catalysts", Organometallics, 2009, 28(8): 2643-2645.

(56) References Cited

OTHER PUBLICATIONS

Benson et al., "Electrocatalytic and homogeneous approaches to conversion of CO2 to liquid fuels", Chem. Soc. Rev., 2009, 38:89-99.
Bertone et al., "Thickness Dependence of the Optical Properties of Ordered Silica-Air and Air-Polymer Photonic Crystals", Phys. Rev. Lett., 1999, 83:300-303.
Bielawski et al., "Living Ring-Opening Metathesis Polymerization", Prog. Polym. Sci., 2007, 32:1-29.
Borner et al., "Synthesis of Molecular Brushes with Gradient in Grafting Density by Atom Transfer Polymerization", Macromolecules, 2002, 35(9): 3387-3394.
Bouchet et al., "Charge Transport in Nanostructured PS-PEO-PS Triblock Copolymer Electrolytes", Macromolecules, 2014, 47:2659-2665.
Campbell et al., "Fabrication of Photonic Crystals for the Visible Spectrum by Holographic Lithography", Nature, 2000, 404:53-56.
Cao et al., "Computer Simulations of Bottle Brushes: From Melts to Soft Networks", Macromolecules, 2015, 48(14):5006-5015.
Carmesin et al., "Static and Dynamic Properties of Two-Dimensional Polymer Melts", J. Phys. (Paris), 1990, 51:915-932.
Chambon et al., "Synthesis, Temperature Gradient Interaction Chromatography, and Rheology of Entangled Styrene Comb Polymers", Macromolecules, 2008, 41(15): 5869-5875.
Chan et al., "A Robust and Efficient Cobalt Molecular Catalyst for CO2 Reduction", Chem. Commun., 2015, 51:7799-7801.
Chang et al., "Manipulating The ABCs of Self-Assembly via Low-X Block Polymer Design", Proc. Natl. Acad. Sci. U.S.A., 2017, 114(25): 6462-6467.
Chen et al., "Molecular Catalysis of the Electrochemical and Photochemical Reduction of CO2 with Earth-Abundant Metal Complexes. Selective Production of CO vs HCOOH by Switching of the Metal Center", J. Am. Chem. Soc., 2015, 137:10918-10921.
Chen et al., "Splitting CO2 into CO and O2 by a Single Catalyst", Proc. Natl. Acad. Sci USA, 2012, 109:15606-15611.
Chintapalli et al., "Effect of Grain Size on the Ionic Conductivity of a Block Copolymer Electrolyte", Macromolecules, 2014, 47(15):5424-5431.
Cho et al., "Printable Ion-Gel Gate Dielectrics for Low-Voltage Polymer Thin-Film Transistors on Plastic", Nat. Mater., 2008, 7:900-906.
Connelly et al., "Chemical Redox Agents for Organometallic Chemistry", Chem. Rev., 1996, 96:877-910.
Costentin et al., "Catalysis of the Electrochemical Reduction of Carbon Dioxide", Chem. Soc. Rev., 2013, 42:2423-2436.
Daeffler, "Ring-Opening Metathesis of Bulky Norbornene Monomers and Radical-Mediated Hydrophosphonation of Olefins", Ph.D. Thesis, California Institute of Technology, Pasadena, California (2013).
Dalsin et al., "Bottlebrush Block Polymers: Quantitative Theory and Experiments", ACS Nano, 9: 2015, 12233-12245.
Dalsin et al., "Linear Rheology of Polyolefin-Based Bottlebrush Polymers", Macromolecules, 2015, 48:4680-4691.
Daniel et al., "Solvent-Free, Supersoft and Superelastic Bottlebrush meits and Networks", Nature Materials, 2016, 15: 183-189.
Eddaoudi et al., "CO2 Separation, Capture and Reuse: A Web Themed Issue", Chem. Commun., 2015, 51:5554-5555.
Elli et al., "Size and persistence length of molecular bottle-brushes by Monte Carlo simulations", J. Chem. Phys, 2004, 120: 6257-6267.
Fabry et al., "Immobilization and Continuous Recycling of Photoredox Catalysts in Ionic Liquids for Applications in Batch Reactions and Flow Systems: Catalytic Alkene Isomerization by Using Visible Light", Chem. Eur. J.,. 2015, 21:5350-5354.
Ferry et al., "Design Considerations for Plasmonic Photovoltaics", Adv. Mater., 2010, 22:4794-4808.
Fineman et al., "Linear Method for Determining Monomer Reactivity Ratios in Copolymerization", Journal of Polymer Science, 1999, 5: 259-262.

Fink et al., "Block Copolymers as Photonic Bandgap Materials", J. of Lightwave Technology, 1999, 17(11):1963-1969.
Fu et al., "Volatilisation of Ferrocene from Ionic Liquids: Kinetics and Mechanism", Chem. Commun., 2011, 47:7083-7085.
Fuller et al., "Ionic Liquid-Polymer Gel Electrolytes", J. Electrochem. Soc., 1997, 144:L67-L70.
Gai et al., "Polystyrene-block-poly(ethylene oxide) Bottlebrush Block Copolymer Morphology Transitions: Influence of Side Chain Length and Volume Fraction", Macromolecules, 2017, 50(4), 1503-1511.
Galisteo-Lopez et al., "Self-Assembled Photonic Structures", Adv. Mater., 2011, 23:30-69.
Ganesan et al., "Mechanisms Underlying Ion Transport in Lamellar Block Copolymer Membranes", ACS Macro Letters, 2012, 1(4):513-518.
Gao et al., "Synthesis of Molecular Brushes by "Grafting onto" Method: Combination of ATRP and Click Reactions", J. Am. Chem. Soc. 2007, 129, 20, 6633-6639.
Ge et al., "Responsive photonic crystals", Angew. Chem. Int. Ed., Feb. 11, 2011, vol. 50, pp. 1492-1522.
Gerle et al., "Main Chain Conformation and Anomalous Elution Behavior of Cylindrical Brushes as Revealed by GPC/MALLS, Light Scattering, and SFM", Macromolecules 1999, 32(8), 2629-2637.
Gomez et al., "Effect of Ion Distribution on Conductivity of Block Copolymer Electrolytes", Nano Letters, 2009, 9(3):1212-1216.
Grayer et al., "A Comparative Experimental and Theoretical Study between Heteroarm Star and Diblock Copolymers in the Microphase Separated State", Macromolecules, 2000, 33(17): 6330-6339.
Grills et al., "Electrocatalytic CO2 Reduction with a Homogeneous Catalyst in Ionic Liquid: High Catalytic Activity at Low Overpotential", J. Phys. Chem. Lett., 2014, 5:2033-2038.
Grills et al., "Mechanism of the Formation of a Mn-Based CO2 Reduction Catalyst Revealed by Pulse Radiolysis with Time-Resolved Infrared Detection", J. Am. Chem. Soc., 2014, 136:5563-5566.
Grimm et al., "Global Change and the Ecology of Cities", Science, 2008, 319:756-760.
Gu et al., "ABA-Triblock Copolymer Ion Gels for CO2 Separation Applications", J. Membr. Sci., 2012, 423-424:20-26.
Hadjichristidis et al., "Polymers with Complex Architecture by Living Anionic Polymerization", Chem. Rev., 2001, 101:3747-3792.
Hamley, "Nanostructure Fabrication Using Block Copolymers", Nanotechnology, 2003, 14:R39.
Hawecker et al., "Electrocatalytic Reduction of Carbon Dioxide Mediated by Re(bipy)(CO)&I (bipy=2,2'-bipyridine)", J. Chem. Soc. Chem. Commun., 1984, 6:328-330.
Hawker et al., "Block Copolymer Lithography: Merging 'Bottom-Up' with Top-Down' Processes", MRS Bull., 2005, 30:952-966.
Hayes et al., "Structure and Nanostructure in Ionic Liquids", Chemical Reviews, 2015, 115(13):6357-6426.
Hepp et al., "A Chemical Approach to Carbon Dioxide Utilization on Mars", In; The Proceedings of the In Situ Resource Utilization (ISRU) Technical Interchange Meeting 1997, p. 27 (Feb. 4-5, 1997).
Hickey et al., "Synthesis and Evaluation of Cationic Norbornanes as Peptidomimetic Antibacterial Agents", Organic & Biomolecular Chemistry, 2015, 13:6225-6241.
Hogan et al., "Facile Analysis of EC Cyclic Voltammograms", Anal. Chem., 2004, 76:2256-2260.
Hong et al., "Large deformation and electrochemistry of polyelectrolyte gels", J. Mechan. Phys. Solids., 2010, 58:558-577.
Hsu et al., "Characteristic Length Scales and Radial Monomer Density Profiles of Molecular Bottle-Brushes: Simulation and Experiment", Macromolecules, 2010, 43(3): 1592-1601.
Hsu et al., "Highly Conductive, Crosslinked Ionomers Based on Poly(Styrene-co-Maleic Anhydride) for Water Electrolysis", J. of Materials Chemistry A., 2013, 1:8093-8096.
Hu et al., "Directed Self-Assembly of Block Copolymers: A Tutorial Review of Strategies for Enabling Nanotechnology with Soft Matter", Soft Matter, 2014, 10: 3867-3889.

(56) References Cited

OTHER PUBLICATIONS

Jang et al., "Synthesis of Cis, syndiotactic A-alt-B Copolymers from Two Enantiomerically Pure Trans-2,3-Disubstituted-5,6-Norbornenes", ACS Central Science; 2016, 2: 631-636.
Jeon et al., "Fabricating Complex Three-Dimensional Nanostructures with High-Resolution Conformable Phase Masks", Proc. Natl. Acad. Sci. USA, 2004, 101:12428-12433.
Jeon et al., "Patterned Polymer Growth on Silicon Surfaces Using Microcontact Printing and Surface-Initiated Polymerization", Applied Physics Letters, 1999, 75(26):4201-4203.
Jha et al., "Synthesis of Ultralarge Molecular Weight Bottlebrush Polymers Using Grubbs' Catalysts", Macromolecules, 2004, 37(12): 4365-4374.
Johnson et al., "Core-Clickable PEG-Branch-Azide Bivalent-Bottle-Brush Polymers by ROMP: Grafting-Through and Clicking-To", J Am Chem Soc. Jan. 26, 2011; 133(3): 559-566.
Johnson et al., "Drug-Loaded, Bivalent-Bottle-Brush Polymers by Graft-through ROMP", Macromolecules 2010, 43, 24, 10326-10335.
Johnson et al., "Electrocatalytic Reduction of $CO_2$ Using the Complexes [Re(bpy)(CO)3L]n (n=+1, L=P(OEt)3, $CH_3CN$; n=0, L=Cl–, Otf–; bpy=2,2'-Bipyridine; Otf–=$CF_3SO_3$) as Catalyst Precursors: Infrared Spectroelectrochemical Investigation", Organometallics 1996, 15, 15, 3374-3387.
Jordan et al., "Biodegradation of Ionic Liquids—A Critical Review", Chem. Soc. Rev., 2015, 44:8200-8237.
International Preliminary Report on Patentability for International Application PCT/US2020/015928, Report issued Jul. 27, 2021, Mailed on Aug. 12, 2021, 6 pgs.
Abbasi et al., "Linear and Extensional Rheology of Model Branched Polystyrenes: From Loosely Grafted Combs to Bottlebrushes", Macromolecules, vol. 50, No. 15, 2017, pp. 5964-5977.
Adlhart et al., "Mechanism and Activity of Ruthenium Olefin Metathesis Catalysts: The Role of Ligands and Substrates from a Theoretical Perspective", Journal of the American Chemical Society, vol. 126, No. 11, 2004, pp. 3496-3510.
Agarwal et al., "Design of a Catalytic Active Site for Electrochemical $CO_2$ Reduction with Mn(I)-Tricarbonyl Species", Inorganic Chemistry, vol. 54, No. 11, 2015, pp. 5285-5294
Agarwal et al., "Mechanisms for CO Production from $CO_2$ Using Reduced Rhenium Tricarbonyl Catalysts", Journal of the American Chemical Society, vol. 134, No. 11, 2012, pp. 5180-5186.
Aharoni et al., "Rigid Backbone Polymers. 2. Polyisocyanates and Their Liquid-Crystal Behavior", Macromolecules, vol. 12, No. 1, 1979, pp. 94-103.
Babarao et al., "Understanding the High Solubility of $CO_2$ in an Ionic Liquid with the Tetracyanoborate Anion", Journal of Physical Chemistry B, vol. 115, No. 32, 2011, pp. 9789-9794.
Bang et al., "Block Copolymer Nanolithography: Translation of Molecular Level Control to Nanoscale Patterns", Advanced Materials, vol. 21, No. 47, 2009, pp. 4769-4792.
Bates et al., "Brush Polymer Ion Gels", Journal of Polymer Science, Part B: Polymer Physics, vol. 54, No. 2, 2016, pp. 292-300.
Bennett et al., "Modelling of the Urban Heat Island and of its Interaction with Pollutant Dispersal", Atmospheric Environment, vol. 16, No. 8, 1982, pp. 1797-1822.
Benson et al., "Structural Investigations into the Deactivation Pathway of the $CO_2$ Reduction Electrocatalyst Re(bpy)(CO)3Cl", Chemical Communications, vol. 48, No. 59, 2012, pp. 7374-7376.
Bhattarai et al., "PEG-Grafted Chitosan as an Injectable Thermosensitve Hydrogel for Sustained Protein Release", Journal of Controlled Release, vol. 103, No. 3, 2005, pp. 609-624.
Black, "Self-Aligned Self Assembly of Multi-Nanowire Silicon Field Effect Transistors", Applied Physics Letters, vol. 87, No. 16, 2005, pp. 163116-1-163116-3.
Black et al., "Integration of Self-Assembled Diblock Copolymers for Semiconductor Capacitor Fabrication", Applied Physics Letters, vol. 79, No. 3, Jul. 16, 2001, pp. 409-411.
Blakemore et al., "Noncovalent Immobilization of Electrocatalysts on Carbon Electrodes for Fuel Production", Journal of the American Chemical Society, vol. 135, No. 49, 2013, pp. 18288-18291.
Bockstaller et al., "Block Copolymer Nanocomposites: Perspectives for Tailored Functional Materials", Advanced Materials, vol. 17, No. 11, 2005, pp. 1331-1349.
Bolton et al., "Synthesis and Melt Self-Assembly of PS-PMMA-PLA Triblock Bottlebrush Copolymers", Macromolecules, vol. 47, No. 9, 2014, pp. 2864-2874.
Bourrez et al., "[Mn(bipyridyl)(CO)3Br]: an Abundant Metal Carbonyl Complex as Efficient Electrocatalyst for $CO_2$ Reduction", Angewandte Chemie International Edition, vol. 50, No. 42, 2011, pp. 9903-9906.
Braun et al., "Microporous Materials: Electrochemically Grown Photonic Crystals", Nature, vol. 40, No. 26762, 1999, pp. 603-604.
Cabral et al., "Electrochemistry of tris(2,2'-bipyridyl) cobalt(II) in Ionic Liquids and Aprotic Molecular Solvents on Glassy Carbon and Platinum Electrodes", Electrochimica Acta, vol. 180, 2015, pp. 419-426.
Carney et al., "Intramolecular Hydroamination of Aminoalkynes with Silver-Phenanthroline Catalysts", Organic Letters, vol. 10, No. 17, 2008, pp. 3903-3906.
Chang et al., "Sequence-Controlled Polymers by Ruthenium-Mediated Ring-Opening Metathesis Polymerization", Sequence-Controlled Polymers: Synthesis, Self-Assembly, and Properties, American Chemical Society, vol. 1170, 2014, pp. 161-188.
Cheng et al., "Facile One-pot Synthesis of Brush Polymers through Tandem Catalysis Using Grubbs' Catalyst for Both Ring-Opening Metathesis and Atom Transfer Radical Polymerizations", Nano Letters, vol. 6, No. 8, 2006, pp. 1741-1746.
Cheng et al., "Formation of a Cobalt Magnetic Dot Array via Block Copolymer Lithography", Advanced Materials, vol. 13, No. 15, 2001, pp. 1174-1178.
Cheng et al., "Synthesis of Core-Crosslinked Nanoparticles with Controlled Cylindrical Shape and Narrowly-Dispersed Size via Core-Shell Brush Block Copolymer Templates", Advanced Materials, vol. 19, No. 19, 2007, pp. 2830-2835.
Cheng et al., "Templated Self-Assembly of Block Copolymers: Top-Down Helps Bottom-Up", Advanced Materials, vol. 18, No. 19, 2006, pp. 2505-2521.
Costentin et al., "A Local Proton Source Enhances $CO_2$ Electroreduction to CO by a Molecular Fe Catalyst", Science, vol. 338, No. 6103, 2012, pp. 90-94.
Costentin et al., "Benchmarking of Homogeneous Electrocatalysts: Overpotential, Turnover Frequency, Limiting Turnover Number", Journal of the American Chemical Society, vol. 137, No. 16, 2015, pp. 5461-5467.
Cowie et al., "Effect of Side Chain Length and Crosslinking on the AC Conductivity of Oligo (Ethyleneoxide) Comb-Branch Polymer-Salt Mixtures", Solid State Ionics, vol. 42, No. 3-4, 1990, pp. 243-249.
Crutzen, "New Directions: The Growing Urban Heat and Pollution "Island" Effect—Impact on Chemistry and Climate", Atmospheric Environment, vol. 38, No. 21, 2004, pp. 3539-3540.
Cushen et al., "Oligosaccharide/Silicon-Containing Block Copolymers with 5 nm Features for Lithographic Applications", ACS Nano, vol. 6, No. 4, 2012, pp. 3424-3433.
Daigle et al., "Lithium Battery with Solid Polymer Electrolyte Based on Comb-Like Copolymers", Journal of Power Sources, vol. 279, 2015, pp. 372-383.
Dalsin et al., "Molecular Weight Dependence of Zero-Shear Viscosity in Atactic Polypropylene Bottlebrush Polymers", ACS Macro Letters, vol. 3, No. 5, 2014, pp. 423-427.
Daniels et al., "Molecular Rheology of Comb Polymer Melts. 1. Linear Viscoelastic Response", Macromolecules, vol. 34, No. 20, 2001, pp. 7025-7033.
Del Valle et al., "Empirical Parameters for Solvent Acidity, Basicity, Dipolarity, and Polarizability of the Ionic Liquids [BMIM][BF4] and [BMIM][PF6]", Journal of Physical Chemistry B, vol. 119, No. 13, 2015, pp. 4683-4692.
Deshmukh et al., "Molecular Design of Liquid Crystalline Brush-Like Block Copolymers for Magnetic Field Directed Self-Assembly: A Platform for Functional Materials", ACS Macro Letters, vol. 3, No. 5, 2014, pp. 462-466.

(56) References Cited

OTHER PUBLICATIONS

Dettmer et al., "Synthesis and Functionalization of ROMP-Based Gradient Copolymers of 5-Substituted Norbornenes", Macromolecules, vol. 37, No. 15, 2004, pp. 5504-5512.
Deutsch et al., "Interdiffusion and Self-Diffusion in Polymer Mixtures: A Monte Carlo Study", The Journal of Chemical Physics, vol. 94, No. 3, 1991, pp. 2294-2304.
Elling et al., "Living Alternating Ring-Opening Metathesis Polymerization Based on Single Monomer Additions", Journal of the American Chemical Society, vol. 137, No. 31, 2015, pp. 9922-9926.
Evans et al., "A Comparative Electrochemical Study of Diffusion in Room Temperature Ionic Liquid Solvents versus Acetonitrile", Chem. Phys. Chem., 2005, vol. 6, No. 3, pp. 523-533
Fenyves et al., "Aqueous Self-Assembly of Giant Bottlebrush Block Copolymer Surfactants as Shape-Tunable Building Blocks", J. Am. Chem. Soc, 2014, vol. 136, No. 21, pp. 7762-7770.
Fetters et al., "Connection between Polymer Molecular Weight, Density, Chain Dimensions, and Melt Viscoelastic Properties", Macromolecules, 1994, vol. 27, No. 17, pp. 4639-4647.
Fineman et al., "Linear Method for Determining Monomer Reactivity Ratios in Copolymerization", Journal of Polymer Science, 1999, Vol. 5, No. 2, pp. 259-262.
Finn et al., "Molecular Approaches to the Electrochemical Reduction of Carbon Dioxide", Chem. Commun., 2011, Vol. 48, No. 10, pp. 1392-1399.
Fiset et al., "Synthesis, Characterization and Modification of Azide-Containing Dendronjzed Diblock Copolymers", Polymer, 2009, vol. 50, No. 6, pp. 1369-1377.
Franco et al., "A Local Proton Source in a [Mn(Bpy-R)(Co)3br]-Type Redox Catalyst Enables Co2 Reduction Even in the absence of Bronsted Acids", Chem. Commun., 2014, vol. 50, No. 93, pp. 14670-14673.
Fredrickson, "Surfactant-Induced Lyotropic Behavior of Flexible Polymer Solutions", Macromolecules, 1993, vol. 26, No. 11, pp. 2825-2831.
Fredrickson et al., "Dynamics of Block Copolymers: Theory and Experiment", Annu. Rev. Mater. Sci., 1996, vol. 26, No. 1, pp. 501-550.
Fullerton-Shirey et al., "Effect of LiClO4 on the Structure and Mobility of PEO-Based Solid Polymer Electrolytes", Macromolecules, 2009, vol. 42, No. 6, pp. 2142-2156.
Furstner et al., "Study Concerning the Effects of Chelation on the Structure and Catalytic Activity of Ruthenium Carbene Complexes", Organometallics, 2002, vol. 21, No. 2, pp. 331-335.
Galinski et al., "Ionic Liquids as Electrolytes", Electrochem. Acta., 2006, vol. 51, No. 26, pp. 5567-5580.
Gavelin et al., "Amphiphilic Polymer Gel Electrolytes. I. Preparation of Gels Based on Poly(Ethylene Oxide) Graft Copolymers Containing Different Ionophobic Groups", J. of Polymer Science Part A: Polymer Chemistry, 2001, vol. 39, No. 13, pp. 2223-2232.
Grason, "The Packing of Soft Materials: Molecular Asymmetry, Geometric Frustration and Optimal Lattices in Block Copolymer Melts", Phys. Rep., 2006, vol. 433, No. 1, pp. 1-64.
Green et al., "Macromolecular Stereochemistry: the Out-of-Proportion Influence of Optically Active Comonomers on the Conformational Characteristics of Polyisocyanates. The Sergeants and Soldiers Experiment", J. Am. Chem. Soc. 1989, vol. 111, No. 16, pp. 6452-6454.
Green et al., "The Macromolecular Route to Chiral Amplification", Angew. Chem. Int. Ed., 1999, vol. 38, No. 21, pp. 3138-3154.
Grice et al., "Recent Studies of Rhenium and Manganese Bipyridine Carbonyl Catalysts for the Electrochemical Reduction of CO2", Advances in Inorganic Chemistry, Elsevier, 2014, 66, pp. 163-188.
Grills et al., "New Directions for the Photocatalytic Reduction of CO2: Supramolecular, scCO2 or Biphasic Ionic Liquid-scCO2 Systems", J. Phys. Chem. Lett., 2010, vol. 1, No. 18, pp. 2709-2718.
Grubbs et al., "A Tandem Approach to Graft and Dendritic Graft Copolymers Based on "Living" Free Radical Polymerizations", J. Angew. Chem., Int. Ed., 1997, vol. 36, No. 3, pp. 270-272.

Gu et al., "High Toughness, High Conductivity Ion Gels by Sequential Triblock Copolymer Self-Assembly and Chemical Cross-Linking", J. Am. Chem. Soc. 2013, vol. 135, No. 26, pp. 9652-9655.
Gu et al., "Self-Assembly of Symmetric Brush Diblock Copolymers", ACS Nano, 2013, vol. 7, No. 3, pp. 2551-2558.
Hadjichristidis et al., "The Strength of the Macromonomer Strategy for Complex Macromolecular Architecture: Molecular Characterization, Properties and Applications of Polymacromonomers", Macromol. Rapid Commun., 2003, vol. 24, No. 17, pp. 979-1013.
Hallinan et al., "Polymer Electrolytes", Annual Review of Materials Research, 2013, vol. 43, No. 1, pp. 503-525.
Hapiot et al., "Electrochemical Reactivity in Room-Temperature Ionic Liquids", Chem. Rev. 2008, vol. 108, No. 7, pp. 2238-2264.
Hashimoto et al., "Gelation Mechanism of Tetra-armed Poly(ethylene glycol) in Aprotic Ionic Liquid Containing Nonvolatile Proton Source, Protic Ionic Liquid", J. Phys. Chem. B 2015, vol. 119, No. 13, pp. 4795-4801.
Hashimoto et al., "Ordered structure in blends of block copolymers. 1. Miscibility criterion for lamellar block copolymers", Macromolecules, 1993, vol. 26, No. 11, pp. 2895-2904.
Hatakeyama et al., "Coarse-Grained Simulations of ABA Amphiphilic Triblock Copolymer Solutions in thin Films", Phys. Chem. Chem. Phys., 2007, vol. 9, No. 33, pp. 4662-4672.
Hawecker et al., "Photochemical and Electrochemical Reduction of Carbon Dioxide to Carbon Monoxide Mediated by (2,2'-Bipyridine)tricarbonylchlororhenium(I) and Related Complexes as Homogeneous Catalysts", Helvetica Chimica Acta., 1986, vol. 69, No. 8, pp. 1990-2012.
Hayashi et al., "Involvement of a Binuclear Species with the Re—C(O)O—Re Moiety in CO2 Reduction Catalyzed by Tricarbonyl Rhenium(I) Complexes with Diimine Ligands: Strikingly Slow Formation of the Re—Re and Re—C(O)O—Re Species from Re(dmb)(CO)3S (dmb =4,4'-Dimethyl-2,2'-bipyridine, S ) Solvent)", J. Am. Chem. Soc., 2003, vol. 125, No. 39, pp. 11976-11987.
He et al., "Ion Gels by Self-Assembly of a Triblock Copolymer in an Ionic Liquid", J. Phys. Chem. B., 2007, vol. 111, No. 118, pp. 4645-4652.
Heroguez et al., "Synthesis of α-Norbornenylpoly(ethylene oxide) Macromonomers and Their Ring-Opening Metathesis Polymerization", Macromolecules, 1996, vol. 29, No. 13, pp. 4459-4464.
Hong et al., "On the Self-Assembly of Brush Block Copolymers in Thin Films", ACS Nano, 2013, vol. 7, No. 11, pp. 9684-9692.
Hong et al., "Photocatalytic reduction of CO2: a brief review on product analysis and systematic methods", Anal. Methods, 2012, vol. 5, No. 5, pp. 1086-1097.
Hou et al., "The Effect of Different Lithium Salts on Conductivity of Comb-Like Polymer Electrolyte with Chelating Functional Group", Electrochimica Acta., 2003, vol. 48, No. 6, pp. 679-690.
Hu et al., "Linear Rheological Response of a Series of Densely Branched Brush Polymers", Macromolecules, 2011, vol. 44, No. 17, pp. 6935-6943.
Hu et al., "Transformation of Atmospheric CO2 Catalyzed by Protic Ionic Liquids: Efficient Synthesis of 2-Oxazolidinones", Angew. Chem., Int. Ed., 2015, vol. 54, No. 18, pp. 5399-5403.
Hultgren et al., "Reference Potential Calibration and Voltammetry at Macrodisk Electrodes of Metallocene Derivatives in the Ionic Liquid [Bmim][PF6]", Anal. Chem., 2002, vol. 74, No. 13, pp. 3151-3156.
Hustad et al., "Photonic Polyethylene from Self-Assembled Mesophases of Polydisperse Olefin Block Copolymers", Macromolecules, 2009, vol. 42, No. 11, pp. 3788-3794.
Imaizumi et al., "Driving Mechanisms of Ionic Polymer Actuators Having Electric Double Layer Capacitor Structures", J. Phys. Chem. B, 2012, vol. 116, No. 16, pp. 5080-5089.
Inglis et al., "Electrocatalytic Pathways Towards Sustainable Fuel Production from Water and CO2", Coord. Chem. Rev., 2012, vol. 256, No. 21-22, pp. 2571-2600.
Izuhara et al., "Electroactive Block Copolymer Brushes on Multiwalled Carbon Nanotubes", Macromolecules, 2009, vol. 42, No. 15, pp. 5416-5418.
Jaacks, "A Novel Method of Determination of Reactivity Ratios in Binary and Ternary Copolymerizations", Macromolecular Chemistry and Physics, 1972, vol. 161, No. 1, pp. 161-172.

(56) References Cited

OTHER PUBLICATIONS

Jeong et al., "Formation of Alternating trans-A-alt-B Copolymers through Ring-Opening Metathesis Polymerization Initiated by Molybdenum Imido Alkylidene Complexes", Organometallics, 2015, vol. 34, No. 20, pp. 5136-5145.

Jeong et al., "Rheological Influence of Short-Chain Branching for Polymeric Materials under Shear with Variable Branch Density and Branching Architecture", Macromolecules, 2017, vol. 50, No. 11, pp. 4491-4500.

Jiang et al., "A Novel Architecture toward Third-Generation Thermoplastic Elastomers by a Grafting Strategy", Macromolecules, 2013, vol. 46, No. 12, pp. 4772-4780.

Jiang et al., "Microphase Separation of Short Wormlike Diblock Copolymers with a Finite Interaction Range", Soft Matter, 2016, vol. 12, No. 8, pp. 2481-2490.

Juris et al., "Synthesis and Photophysical and Electrochemical Properties of New Halotricarbonyl(Polypyridine)Rhenium(I) Complexes", Inorg. Chem. 1988, vol. 27, No. 22, pp. 4007-4011.

Kalnay et al., "Impact of Urban and Land-Use Change on Climate", Nature, 2003, vol. 423, pp. 528-531.

Kane et al., "Phase Behavior and Morphological Characteristics of Compositionally Symmetric Diblock Copolymer Blends", Macromolecules, 1996, vol. 29, No. 27, pp. 8862-8870.

Kang et al., "Full Color Stop Bands in Hybrid Organic/Inorganic Block Copolymer Photonic Gels by Swelling-Freezing", J. Am. Chem. Soc., 2009, vol. 131, No. 22, pp. 7538-7539.

Kang et al., "Ultrafast Cyclopolymerization for Polyene Synthesis: Living Polymerization to Dendronized Polymers", J. Am. Chem. Soc., 2011, vol. 133, No. 31, pp. 11904-11907.

Kapnistos et al., "Linear Rheology of Architecturally Complex Macromolecules: Comb Polymers with Linear Backbones", Macromolecules, 2005, vol. 38, No. 18, pp. 7852-7862.

Kawamoto et al., "Graft-through Synthesis and Assembly of Janus Bottlebrush Polymers from A-Branch-B Diblock Macromonomers", J. Am. Chem. Soc., 2016, vol. 138, No. 36, pp. 11501-11504.

Keith et al., "Elucidation of the Selectivity of Proton-Dependent Electrocatalytic CO2 Reduction by fac-Re(bpy)(CO)3Cl", J. Am. Chem. Soc., 2013, vol. 135, No. 42, pp. 15823-15829.

Kelen et al., "Analysis of the Linear Methods for Determining Copolymerization Reactivity Ratios. I. A New Improved Linear Graphic Method", Journal of Macromolecular Science, Part A—Chemistry, 1975, vol. 9, No. 1, pp. 1-27.

Kikuchi et al., "Conformational Properties of Cylindrical Rod Brushes Consisting of a Polystyrene Main Chain and Poly(n-hexyl isocyanate) Side Chains", Macromolecules, 2008, vol. 41, No. 17, pp. 6564-6572.

Kikuchi et al., "Graft Density Dependence of Main Chain Stiffness in Molecular Rod Brushes", Macromolecules, 2015, vol. 48, No. 16, pp. 5878-5886.

Kim et al., "A Route to Nanoscopic SiO2 Posts via Block Copolymer Templates", Adv. Mater., 2001, vol. 13, pp. 795-797.

Kinning et al., "Hard-Sphere Interactions Between Spherical Domains in Diblock Copolymers", Macromolecules, 1984, vol. 17, No. 9, pp. 1712-1718.

Klahn et al., "What Determines CO2 Solubility in Ionic Liquids? A Molecular Simulation Study", J. Phys. Chem. B., 2015, vol. 119, pp. 10066-10078.

Kobayashi et al., "Ionically High Conductive Solid Electrolytes Composed of Graft Copolymer-Lithium Salt Hybrids", The Journal of Physical Chemistry, 1985, vol. 89, pp. 987-991.

Kovach et al., "Completely Engulfed Olive/Silicone Oil Janus Emulsions with Gelatin and Chitosan", Colloid and Polymer Science, 2016, vol. 294, pp. 705-713.

Kumar et al., "Factors Relevant for the Regioselective Cyclopolymerization of 1,6-Heptadiynes, N,N-Dipropargylamines, N,N-Dipropargylammonium Salts, and Dipropargyl Ethers by RuIV-Alkylidene-Based Metathesis Initiators", Journal of the American Chemical Society, 2009, vol. 131, pp. 387-395.

Lam et al., "A Mn Bipyrimidine Catalyst Predicted To Reduce CO2 at Lower Overpotential", ACS Catal., 2015, vol. 5, pp. 2521-2528.

Lanson et al., "Poly(styrene)comb-b-Poly(ethylene oxide)comb Copolymers: Synthesis and AFM Investigation of Intra- and Supramolecular Organization as Thin Deposits", Macromolecules, 2007, vol. 40, pp. 9503-9509.

Lanson et al., "Synthesis of (Poly(chloroethyl vinyl ether)-g-polystyrene)comb-b-(poly(chloropyran ethoxy vinyl ether)-g-polyisoprene)comb Copolymers and Study of Hyper-Branched Micelle Formation in Dilute Solutions", Macromolecules, 2007, vol. 40, pp. 5559-5565.

Larson, "Predicting the Flow of Real Polymers", Science, 2011, vol. 333, No. 6051, pp. 1834-1835.

Lascaud et al., "Phase Diagrams and Conductivity Behavior of Poly(ethylene oxide)-Molten Salt Rubbery Electrolytes", Macromolecules, 1994, vol. 27, No. 25, pp. 7469-7477.

Lecommandoux et al., "Effect of Dense Grafting on the Backbone Conformation of Bottlebrush Polymers: Determination of the Persistence Length in Solution", Macromolecules, 2002, vol. 35, pp. 8878-8881.

Lee et al., "Electrical Impedance of Spin-Coatable Ion Gel Films", The Journal of Physical Chemistry B, vol. 115, 2011, pp. 3315-3321.

Lee et al., "Hetero-Grafted Block Brushes with PCL and PBA Side Chains", Macromolecules, vol. 41, 2008, pp. 6073-6080.

Lee et al., "Molecular Brushes with Spontaneous Gradient by Atom Transfer Radical Polymerization", Macromolecules, vol. 38, No. 20, 2005, pp. 8264-8271.

Lee et al., "Quasi-Amorphous Colloidal Structures for Electrically Tunable Full-Color Photonic Pixels with Angle-Independency", Adv. Mater., 2010, vol. 22, pp. 4973-4977.

Lee et al., "Stimuli-Responsive Molecular Brushes", Prog. Polym. Sci., 2010, vol. 35, No. 1-2, pp. 24-44.

Leibler, "Theory of Microphase Separation in Block Copolymers", Macromolecules, 1980, vol. 13, pp. 1602-1617.

Li et al., "Dense Arrays of Ordered GaAs Nanostructures by Selective Area Growth on Substrates Patterned by Block Copolymer Lithography", Appl. Phys. Lett., 2000, vol. 76, pp. 1689-1691.

Liang et al., "Combs and Bottlebrushes in a Melt", Macromolecules, 2017, vol. 50, No. 8, pp. 3430-3437.

Lipson, "A Monte Carlo Simulation Study on Long-Chain Combs", Macromolecules, 1991, vol. 24, No. 6, pp. 1327-1333.

Liu et al., "Computational Studies of Ruthenium-Catalyzed Olefin Metathesis", In Handbook of Metathesis Wley-VCH Verlag GmbH & Co. KGaA, 2015, pp. 199-252.

Liu et al., "Theoretical Study of Phase Behavior of Frustrated ABC Linear Triblock Copolymers", Macromolecules, 2012, vol. 45, No. 23, pp. 9522-9530.

Lodge, "A Unique Platform for Materials Design", Science, 2008, vol. 321, No. 5885, pp. 50-51.

Love et al., "A Practical and Highly Active Ruthenium-Based Catalyst that Effects the Cross Metathesis of Acrylonitrile", Angew. Chem. Int. Ed., 2002, vol. 41, pp. 4035-4037.

Lu et al., "Advanced Applications of Ionic Liquids in Polymer Science", Prog. Polym. Sci., 2009, vol. 34, No. 5, pp. 431-448.

Lu et al., "Synthesis and characterization of a novel ABA triblock copolymer via 4,4'-bis(trifluorovinyloxy)biphenyl and methyl methacrylate", J. of Polymer Science Part A: Polymer Chemistry, 2006, vol. 44, pp. 5438-5444.

Lutz et al., "Sequence-Controlled Polymers", Science, 2013, vol. 341, No. 646, pp. 1238149-1-1238149-8.

Lzgorodina et al., "Physical Absorption of CO2 in Protic and Aprotic Ionic Liquids: An Interaction Perspective", J. Phys. Chem. B., 2015, vol. 119, pp. 11748-11759.

Ma et al., "Synthesis of Bottlebrush Polystyrenes with Uniform, Alternating, and Gradient Distributions of Brushes Via Living Anionic Polymerization and Hydrosilylation", Macromol. Rapid Commun., 2015, vol. 36, pp. 726-732.

Machan et al., "Electrocatalytic Reduction of Carbon Dioxide by Mn(CN)(2,2'-bipyridine)(CO)3: CN Coordination Alters Mechanism", J. Inorg. Chem., 2015, vol. 54, pp. 8849-8856.

Machan et al., "Supramolecular Assembly Promotes the Electrocatalytic Reduction of Carbon Dioxide by Re(I) Bipyridine Catalysts at a Lower Overpotential", J. Am. Chem. Soc., 2014, vol. 136, pp. 14598-14607.

(56) References Cited

OTHER PUBLICATIONS

Mapas et al., "Ultrahigh Molecular Weight Linear Block Copolymers: Rapid Access by Reversible-Deactivation Radical Polymerization and Self-Assembly into Large Domain Nanostructures", Macromolecules, 2016, vol. 49, pp. 3733-3738.
Marencic et al., "Controlling Order in Block Copolymer Thin Films for Nanopatterning Applications", Annu. Rev. Chem. Bimol. Eng., 2010, Vo. 1, pp. 277-297.
Martinez et al., "Ring-opening metathesis polymerization of 8-membered cyclic olefins", Polymer Chemistry, 2014, vol. 5, pp. 3507-3532.
Masuda et al., "Photonic Crystal Using Anodic Porous Alumina", Jpn. J. Appl. Phys. 1999, vol. 38, pp. L1403-L1405.
Matsen et al., "Unifying Weak-and Strong-Segregation Block Copolymer Theories", Macromolecules, 1996, vol. 29, No. 4, pp. 1091-1098.
Matson et al., "Synthesis of Fluorine-18 Functionalized Nanoparticles for use as in vivo Molecular Imaging Agents", J. Am. Chem. Soc., 2008, vol. 130, pp. 6731-6733.
Matsubara et al., "Reactivity of a fac-ReCl($\alpha$-diimine)(CO)$_3$ complex with an NAD+ model ligand toward $CO_2$ reduction", Chem. Commun., 2013, vol. 50, pp. 728-730.
Matsuda et al., "Periodically Functionalized and Grafted Copolymers via 1:2- Sequence-Regulated Radical Copolymerization of Naturally Occurring Functional Limonene and Maleimide Derivatives", Macromolecules, 2013, vol. 46, No. 14, pp. 5473-5482.
Matyjaszewski et al., "Architecturally Complex Polymers with Controlled Heterogeneity", Science, 2011, vol. 333, No. 6046, pp. 1104-1105.
Matyjaszewski et al., "Gradient Copolymers by Atom Transfer Radical Copolymerization", J. Phys. Org. Chem., 2000, vol. 13, No. 12, pp. 775-786.
Matyjaszewski et al., "Nanostructured Functional Materials Prepared by Atom Transfer Radical Polymerization", Nature Chem., 2009, vol. 1, pp. 276-288.
Maxein et al., "Opalescent Cholesteric Networks from Chiral Polyisocyanates in Polystyrene", Adv. Mater., 1998, vol. 10, pp. 341-345.
Maxein et al., "Structure-Property Relations in Cholesteric Networks from Chiral Polyisocyanates", Macromolecules, 1999, vol. 32, pp. 5747-5754.
Mayer et al., "Chiral Polyisocyanates, a Special class of Helical Polymers", Prog. Polym. Sci., 2001, vol. 26, pp. 1973-2013.
Mayershofer et al., "Bi-and Trinuclear Ruthenium Alkylidene Triggered Cyclopolymerization of 1,6-Heptadiynes: Access to An-X-An Block and (An)3X Tristar Copolymers", Macromolecules 2006, vol. 39, No. 10, pp. 3484-3493.
Mayo et al., "Copolymerization", Chem. Rev., 1950, vol. 46, pp. 191-287.
Mayo et al., "Copolymerization. I. A Basis for Comparing the Behavior of Monomers in Copolymerization; The Copolymerization of Styrene and Methyl Methacrylate", J. Am. Chem. Soc. 1944, vol. 66, No. 9, pp. 1594-1601.
Meijs et al., "Reactivity of Macromonomers In Free Radical Polymerization", J. Macromol. Sci., Part C, Polym. Rev., 1990, vol. 30, pp. 305-377.
Meyer, "Polymer Electrolytes for Lithium-Ion Batteries", Advanced Materials. 1998, vol. 10, No. 6, pp. 439-448.
Milner et al., "Theory of the Grafted Polymer Brush", Macromolecules, 1988, vol. 21, No. 8, pp. 2610-2619.
Miyake et al., "Precisely Tunable Photonic Crystals from Rapidly Self-Assembling Brush Block Copolymer Blends", Angew. Chem. Int. Ed., 2012, vol. 51, pp. 11246-11248.
Miyake et al., "Stereospecific Polymerization of Chiral Oxazolidinone-Functionalized Alkenes", Macromolecules 2010, vol. 43, No. 18, pp. 7504-7514.
Moon et al., "Solution-Processable Electrochemiluminescent Ion Gels for Flexible, Low-Voltage, Emissive Displays on Plastic", J. Am. Chem. Soc., 2014, vol. 136, No. 9, pp. 3705-3712.
Mortensen et al., "Structural Study on the Micelle Formation of Poly(Ethylene Oxide)-Poly(Propylene Oxide)-Poly(Ethylene Oxide) Triblock Copolymer in Aqueous Solution", Macromolecules, 1993, vol. 26, No. 4, pp. 805-812.
Neese, "Software update: the ORCA program system, version 4.0", Wiley Interdiscip. Rev.: WIREs Comput. Mol. Sci., 2017, vol. 8, No. 1, e1327, pp. 1-6.
Neiser et al., "Polymerization of Macromonomers to Cylindrical Brushes Initiated by Organolanthanides", Macromolecules, 2003, vol. 36, pp. 5437-5439.
Neugebauer et al., "How Dense Are Cylindrical Brushes Grafted from a Multifunctional Macroinitiator?", Polymer, 2004, vol. 45, pp. 8173-8179.
Nguyen et al., "Nanostructured Ion Gels from Liquid Crystalline Block Copolymers and Gold Nanoparticles in Ionic Liquids: Manifestation of Mechanical and Electrochemical Properties", J. of Materials Chemistry C., 2014, vol. 3, pp. 399-408.
Niitani et al., "Characteristics of New-Type Solid Polymer Electrolyte Controlling Nano-Structure", J. of Power Sources., 2005, vol. 146, Issues 1-2, pp. 386-390.
Ohno et al., "Controlling Grafting Density and Side Chain Length in Poly(n-Butyl Acrylate) By ATRP Copolymerization of Macromonomers", J. Polym. Sci., Part A:Polym. Chem., 2006, vol. 44, Issue 19, pp. 5454-5467.
Olvera De La Cruz et al., "Theory Of Microphase Separation in Graft and Star Copolymers", Macromolecules, 1986, vol. 19, No. 10, pp. 2501-2508.
Oono et al., "⅔-Power Law for Copolymer Lamellar Thickness Implies a ⅓-Power Law for Spinodal Decomposition", Phys. Rev. Lett., 1988, vol. 61, pp. 1109-1111.
O'Toole et al., "Electrocatalytic Reduction of CO2 at a Chemically Modified Electrode", J. Chem. Soc. Chem. Commun., 1985, vol. 20, pp. 1416-1417.
Pakula et al., "Molecular Brushes as Super-Soft Elastomers", Polymer, 2006, vol. 47, No. 20, pp. 7198-7206.
Panday et al., "Effect of Molecular Weight and Salt Concentration on Conductivity of Block Copolymer Electrolytes", Macromolecules, 2009, vol. 42, No. 13, pp. 4632-4637.
Park et al., "Synthesis of Norbornene Derivative Using Diels-Alder Reaction", Advanced Materials Research (Durnten-Zurich, Switzerland), 2012, vol. 421, pp. 136-139.
Patten et al., ""Living" titanium(IV) catalyzed coordination polymerizations of isocyanates", J. Am. Chem. Soc. 1991, vol. 113, No. 13, pp. 5065-5066.
Patten et al., "Living Organotitanium(IV)-Catalyzed Polymerizations of Isocyanates", J. Am. Chem. Soc. 1996, vol. 118, pp. 1906-1916.
Peng et al., "Smart Polymer Brushes and Their Emerging Applications", RSC Advances, 2012, vol. 2, pp. 8557-8578.
Ping et al., "Microphase Separation and High Ionic Conductivity at High Temperatures of Lithium Salt-Doped Amphiphilic Alternating Copolymer Brush with Rigid Side Chains", Macromolecules, 2015, vol. 48, No. 23, pp. 8557-8564.
Piunova et al., "Highly Ordered Dielectric Mirrors via the Self-Assembly of Dendronized Block Copolymers", Journal of the American Chemical Society, 2013, vol. 135, No. 41, pp. 15609-15616.
Poelma et al., "Cyclic Block Copolymers for Controlling Feature Sizes in Block Copolymer Lithography", ACS Nano., 2012, vol. 6, pp. 10845-10854.
Pollino et al., "Living ROMP of exo-Norbornene Esters Possessing Pd" SCS Pincer Complexes or Diaminopyridines", Macromolecules, 2003, vol. 36, No. 7, pp. 2230-2234.
Prudnikova et al., "Biomimetic Proteoglycans Mimic Macromolecular Architecture and Water Uptake of Natural Proteoglycans", Biomacromolecules, 2017, vol. 18, No. 6, pp. 1713-1723.
Qiao et al., "A Review of Catalysts for the Electroreduction of Carbon Dioxide to Produce Low-Carbon Fuels", J. Chem. Soc. Rev., 2013, vol. 43, pp. 631-675.
Quartarone et al., "Electrolytes for Solid-State Lithium Rechargeable Batteries: Recent Advances and Perspectives", Chem. Soc. Rev., 2011, vol. 40, pp. 2525-2540.

(56) References Cited

OTHER PUBLICATIONS

Read et al., "Linking Models of Polymerization and Dynamics to Predict Branched Polymer Structure and Flow", Science, 2011, vol. 333, No. 6051, pp. 1871-1874.
Rosso et al., "Removal of Palladium from Organic Reaction Mixtures by Trimercaptotriazine", Org. Process Res. Dev., 1997, vol. 1, No. 4, pp. 311-314.
Rouault et al., "Comb-Branched Polymers: Monte Carlo Simulation and Scaling", Macromolecules, 1996, vol. 29, No. 7, pp. 2605-2611.
Runge et al., "Investigation of the Assembly of Comb Block Copolymers in the Solid State", Macromolecules, 2008, vol. 41, pp. 7687-7694.
Sampson et al., "Manganese Catalysts with Bulky Bipyridine Ligands for the Electrocatalytic Reduction of Carbon Dioxide: Eliminating Dimerization and Altering Catalysis", J. Am. Chem. Soc., 2014, vol. 136, pp. 5460-5471.
Sanford et al., "Mechanism and Activity of Ruthenium Olefin Metathesis Catalysts", J. Am. Chem. Soc., 2001, vol. 123, pp. 6543-6554.
Saveant, "Molecular Catalysis of Electrochemical Reactions. Mechanistic Aspects", Chem. Rev., 2008, vol. 108, pp. 2348-2378.
Schappacher et al., "From Combs to Comb-g-Comb Centipedes", Macromolecules, 2005, vol. 38, pp. 7209-7213.
Schulze et al., "High-Modulus, High-Conductivity Nanostructured Polymer Electrolyte Membranes via Polymerization-Induced Phase Separation", Nano Lett., 2013, vol. 14, No. 1, pp. 122-126.
Seehof et al., "Selective Reaction with Exo-Isomers In Ring-Opening Olefin Metathesis Polymerization (ROMP) of Fluoroalkyl-Substituted Norbornene Derivatives", Macromolecules, 1993, vol. 26, No. 4, pp. 695-700.
Seel et al., "Electrochemical Intercalation of PF 6 into Graphite", J. Electrochem. Soc., 2000, vol. 147, No. 3, pp. 892-898.
Seitz et al., "Self-Assembly and Stress Relaxation in Acrylic Triblock Copolymer Gels", Macromolecules, 2007, vol. 40, No. 4, pp. 1218-1226.
Seki et al., "Distinct Difference in Ionic Transport Behavior in Polymer Electrolytes Depending on the Matrix Polymers and Incorporated Salts", The J. of Physical Chemistry B., 2005, vol. 109, No. 9, pp. 3886-3892.
Seo et al., "Effect of Cation on Physical Properties and CO2 Solubility for Phosphonium-Based Ionic Liquids with 2-Cyanopyrrolide Anions", J. Phys. Chem. B., 2015, vol. 119, pp. 11807-11814.
Shah et al., "Chiroptical Properties of Graft Copolymers Containing Chiral Poly(n- hexyl isocyanate) as a Side Chain", Macromolecules, 2011, vol. 44, pp. 7917-7925.
Sheiko et al., "Cylindrical Molecular Brushes: Synthesis, Characterization, and Properties", Prog. Polym. Sci., 2008, vol. 33, No. 7, pp. 759-785.
Sheiko et al., "Visualization of Macromolecules—A First Step to Manipulation and Controlled Response", Chem. Rev., 2001, vol. 101, pp. 4099-4123.
Shinoda et al., "Structural Control of Poly(Methyl Methacrylate)-g-poly(Lactic Acid) Graft Copolymers by Atom Transfer Radical Polymerization (ATRP)", Macromolecules, 2001, vol. 34, No. 18, pp. 6243-6248.
Singh et al., "Manipulating Ordering Transitions in Interfacially Modified Block Copolymers", Soft Matter, 2009, vol. 5, No. 23, pp. 4757-4762.
Slugovc, "The Ring Opening Metathesis Polymerisation Toolbox", Macromol. Rapid Commun., 2004, vol. 25, pp. 1283-1297.
Smieja et al., "Manganese as a Substitute for Rhenium in CO2 Reduction Catalysts: The Importance of Acids", J. Am. Chem. Soc., 2013, vol. 52, pp. 2484-2491.
Smieja et al., "Re(bipy-tBu)(CO)$_3$Cl-improved Catalytic Activity for Reduction of Carbon Dioxide: IR-Spectroelectrochemical and Mechanistic Studies", Inorg. Chem., 2010, vol. 49, pp. 9283-9289.
South et al., "Modular and Dynamic Functionalization of Polymeric Scaffolds", Accounts of Chemical Research, 2007, vol. 40, No. 1, pp. 63-74.
Sullivan et al., "One-and Two-Electron Pathways in the Electrocatalytic Reduction of CO2 By Fac-Re(Bpy)(CO)3CI (Bpy=2,2'-Bipyridine)", J. Chem. Soc. Chem. Commun., 1985, vol. 20, pp. 1414-1416.
Sumerlin et al., "Initiation Efficiency in the Synthesis of Molecular Brushes by Grafting from via Atom Transfer Radical Polymerization", Macromolecules, 2005, vol. 38. pp. 702-708.
Sun et al., "Nanoscopic Cylindrical Dual Concentric and Lengthwise Block Brush Terpolymers as Covalent Preassembled High-Resolution and High-Sensitivity Negative-Tone Photoresist Materials", J. Am. Chem. Soc., 2013, vol. 135, No. 11, pp. 4203-4206.
Sun et al., "Semibatch RAFT polymerization for producing ST/BA copolymers with controlled gradient composition profiles", AIChE J., 2008, vol. 54, No. 4, pp. 1073-1087.
Sun et al., "Switching the Reaction Course of Electrochemical CO$_2$ Reduction with Ionic Liquids", Langmuir, 2014, 30, No. 21, pp. 6302-6308.
Sutthasupa et al., "Alternating Ring-Opening Metathesis Copolymerization of Amino Acid Derived Norbornene Monomers Carrying Nonprotected Carboxy and Amino Groups Based on Acid-Base Interaction", J. Am. Chem. Soc., 2009, vol. 131, No. 30, pp. 10546-10551.
Taheri et al., "An Iron Electrocatalyst for Selective Reduction of CO$_2$ to Formate in Water: Including Thermochemical Insights", ACS Catal., 2015, vol. 5, pp. 7140-7151.
Tan et al., "Gels of Ionic Liquid [C4mim]PF$_6$ Formed by Self-Assembly of Gelators and their Electrochemical Properties", Electrochem. Commun., 2009, vol. 11, pp. 933-936.
Tang et al., "Synergistic Increase in Ionic Conductivity and Modulus of Triblock Copolymer Ion Gels", Macromolecules, 2015, vol. 48, No. 14, pp. 4942-4950.
Tang et al., "Synthesis and Morphology of Molecular Brushes with Polyacrylonitrile Block Copolymer Side Chains and Their Conversion into Nanostructured Carbons", Macromolecules, 2007, vol. 40, pp. 6199-6205.
Thompson et al., "Solvent Accelerated Polymer Diffusion in Thin Films", Macromolecules, 2005, vol. 38, pp. 4339-4344.
Thurn-Albrecht et al., "High-Density Nanowire Arrays Grown in Self-Assembled Diblock Copolymer Templates", Science, 2000, vol. 290, pp. 2126-2129.
Trzaskowski et al., "Structural and Mechanistic Basis of the Fast Metathesis Initiation by a Six-Coordinated Ruthenium Catalyst", Organometallics 2013, vol. 32, No. 13, 3625-3630.
Tsurumaki et al., "Properties of polymer electrolytes composed of poly(ethylene oxide) and ionic liquids according to hard and soft acids and bases theory", Polym. Adv. Technol., 2011, vol. 22, pp. 1223-1228.
Ueki et al., "Photoreversible Gelation of a Triblock Copolymer in an Ionic Liquid", Angew. Chem., Int. Ed., 2015, vol. 54, pp. 3018-3022.
Underwood, "Industrial Synthesis of Hydrocarbons from Hydrogen and Carbon Monoxide", Ind. Eng. Chem., 1940, vol. 32, No. 4, pp. 449-454.
Vayer et al., "Perpendicular Orientation of Cylindrical Domains Upon Solvent Annealing Thin Films of Polystyrene-B-Polylactide", Thin Solid Films, 2010, vol. 518, Issue 14, pp. 3710-3715.
Vougioukalakis et al., "Ruthenium-Based Heterocyclic Carbene-Coordinated Olefin Metathesis Catalysts", Chem. Rev., 2010, vol. 110, pp. 1746-1787.
Vyboishchikov et al., "Mechanism of Olefin Metathesis with Catalysis by Ruthenium Carbene Complexes: Density Functional Studies on Model Systems", Chem. Eur. J., 2002, vol. 8, No. 17, pp. 3962-3975.
Walsh et al., "Kinetic Study of Living Ring-Opening Metathesis Polymerization with Third-Generation Grubbs Catalysts", J. Am. Chem. Soc., 2017, vol. 139, No. 39, pp. 13644-13647.
Wang et al., "Bioinspired Colloidal Photonic Crystals with Controllable Wettability", Acc. Chem. Res., 2011, vol. 44, No. 6, pp. 405-415.
Wang et al., "Control of Gradient Copolymer Composition in ATRP using Semibatch Feeding Policy", AIChe J., 2007, vol. 53, No. 1, pp. 174-186.

(56) References Cited

OTHER PUBLICATIONS

Wang et al., "Synthesis of Sequence-Determined Bottlebrush Polymers Based on Sequence Determination in Living Anionic Copolymerization of Styrene and Dimethyl(4-(1-Phenylvinyl)Phenyl)Silane", Polym. Chem., 2016, Vo. 7, No. 18, pp. 3090-3099.

Watanabe et al., "High Ionic Conductivity and Electrode Interface Properties of Polymer Electrolytes Based on High Molecular Weight Branched Polyether", J. Power Sources, 1999, vol. 81-82, pp. 786-789.

Welton, "Ionic Liquids in Catalysis", Coord. Chem. Rev., 2004, vol. 248, Issue 21-24, pp. 2459-2477.

Wolfe et al., "Investigation of Organoboronates in Metathesis Polymerization", Macromolecules, 1999, vol. 32, No. 24, pp. 7961-7967.

Xia et al., "Conductivities of Solid Polymer Electrolyte Complexes of Alkali Salts with Polymers of Methoxypolyethyleneglycol Methacrylates", Solid State Ionics, 1984, vol. 14, pp. 221-224.

Xia et al., "Efficient Synthesis of Narrowly Dispersed Brush Polymers via Living Ring-Opening Metathesis Polymerization of Macromonomers", Macromolecules, 2009, vol. 42, pp. 3761-3766.

Xiong et al., "Reversible Hydrophobic-Hydrophilic Transition of Ionic Liquids Driven by Carbon Dioxide", Angew. Chem., 2015, Int. Ed., vol. 54, pp. 7265-7269.

Xu et al., "ABC Triblock Copolymer Particles with Tunable Shape and Internal Structure through 3D Confined Assembly", Macromolecules, 2015, vol. 48, No. 8, pp. 2628-2636.

Xu et al., "Theoretical Simulations of Nanostructures Self-Assembled from Copolymer Systems", Polymer Chemistry, 2016, vol. 7, pp. 3783-3811.

Yamaguchi et al., "A Phase Diagram for the Binary Blends of Nearly Symmetric Diblock Copolymers. 1. Parameter Space of Molecular Weight Ratio and Blend Composition", Macromolecules, 2001, vol. 34, pp. 6495-6505.

Yang et al., "Supramolecular ABC Triblock Copolymers via One-Pot, Orthogonal Self-Assembly", J. Am. Chem Soc., 2010, vol. 132, No. 5, pp. 1637-1645.

Yashima et al., "Helical Polymers: Synthesis, Structures, and Functions", Chem. Rev., 2009, vol. 109, No. 11, pp. 6102-6211. (Presented in 2 Parts).

Ye et al., "Ionic Liquid Polymer Electrolytes", J. Mater. Chem. A., 2012, vol. 1, No. 8, pp. 2719-2743.

Yoon et al., "Thermochromic Block Copolymer Photonic Gel", Macromolecules, 2008, vol. 41, pp. 4582-4584.

Young et al., "Mixed-Salt Effects on the Ionic Conductivity of Lithium-Doped PEO-Containing Block Copolymers", Macromolecules, 2011, vol. 44, No. 20, pp. 8116-8123.

Zalusky et al., "Ordered Nanoporous Polymers from Polystyrene-Polylactide Block Copolymers", J. Am. Chem. Soc., 2002, vol. 124, No. 43, pp. 12761-12773.

Zhang et al., "Conformation of Cylindrical Brushes in Solution: Effect of Side Chain Length", Macromolecules, 2006, vol. 39, No. 24, 8440-8450.

Zhang et al., "Electrochemical Behaviors and Spectral Studies of Ionic Liquid (1-Butyl-3-Methylimidazolium Tetrafluoroborate) based Sol-Gel Electrode", J. Electroanal. Chem., 2007, vol. 603, No. 2, pp. 243-248.

Zhang et al., "Ionic Conductivity, Capacitance, and Viscoelastic Properties of Block Copolymer-Based Ion Gels", Macromolecules, 2011, vol. 44, No. 4, pp. 940-949.

Zhang et al., "Super Soft Elastomers as Ionic Conductors", Polymer, 2004, vol. 45, No. 18, pp. 6333-6339.

Zhang et al., "Viscoelastic Properties, Ionic Conductivity, and Materials Design Considerations for Poly(styrene-b-ethylene oxide-b-styrene)-Based Ion Gel Electrolytes", Macromolecules, 2011, vol. 44, No. 22, pp. 8981-8989.

Zhao et al., "Crystallization and Thermal Properties of PLLA Comb Polymer", J. of Polymer Science Part B: Polymer Physics, 2008, vol. 46, No. 6, pp. 589-598.

Zhao et al., "Electrochemistry of Room Temperature Protic Ionic Liquids", J. Phys. Chem. B., 2008, vol. 112, No. 23, pp. 6923-6936.

Zhao et al., "Ionic Liquids: Applications in Catalysis", Catal. Today., 2002, vol. 74, Issue 1-2, pp. 157-189.

Zheng et al., "Morphology of ABC Triblock Copolymers", Macromolecules, 1995, vol. 28, pp. 7215-7223.

\* cited by examiner

POLYMER COMPOSITE PHOTONIC CRYSTAL COATINGS

RELATED APPLICATIONS

This application is a continuation-in-part under 35 U.S.C. 111(a) of International Application No. PCT/US2020/015927 filed Jan. 30, 2020 and published in English as WO 2020/180427 on Sep. 10, 2020, which claims priority from U.S. Provisional Patent Application Nos. 62/798,760 filed Jan. 30, 2019; 62/846,127 filed May 10, 2019; and 62/887,186 filed Aug. 15, 2019, which applications and publication are each incorporated herein by reference.

GOVERNMENT SUPPORT

This invention was made with government support under Grant No. DE-AR0000881 and DE-AE0001261 awarded by the Department of Energy. The government has certain rights in the invention.

BACKGROUND OF THE INVENTION

Challenges exist in the production of nanostructured materials that can selectively reflect or transmit specific ranges of the electromagnetic spectrum while not significantly altering the reflection or transmission in other ranges. For example, there is a need for materials with high near-infrared (NIR, 700-2000 nm) reflection in the absence of significant absorption, while allowing the high transmission (>60%) of visible-light (Vis, 400-700 nm) and/or ultraviolet (UV, <400 nm) radiation (*J. Am. Chem. Soc.* 2014, 136, 17374). Specifically, access to these materials using facile fabrication procedures has yet to be realized; traditional production involved extruding multilayered films (*Polymer Engineering and Science,* 1969, 9, 393), and the current state of the art requires intensive fabrication processes such as lithography and layer-by-layer assembly. Bottom-up processes such as block polymer self-assembly enable access to nanostructured materials from paint brush, draw down, wire bar, doctor blade, bird bar, roller application, screen print, spray brush, or spray gun application without the need for energy intensive fabrication and/or designer materials such as noble metal oxides as the primary component. The ability to apply selectively reflective coatings via facile application methods opens up exciting possibilities for application on rough and curved surfaces where films and other top-down manufacturing processes cannot be used.

The current state of the art is represented by multilayer extruded thin films (U.S. Pat. Nos. 6,208,466 and 6,696,142) or layer-by-layer deposited metal oxide nanoparticles or polyelectrolytes (Bioinspir. Biomim. 2013, 8, 045005 and US Patent Application Publication No. 2014/0218792). Both of these approaches require significant investment in advanced manufacturing instrumentation/infrastructure and techniques, in addition to potential high material costs.

Current approaches for the preparation of reflective materials require significant investment in advanced manufacturing instrumentation and techniques and high material costs. Accordingly, there is a need for alternative compositions that allow for more cost-effective preparation of reflective materials.

SUMMARY

The disclosure relates to the discovery that the use of inorganic/organic composite materials composed of brush block copolymers (BBCPs) and either inorganic, organic, or some combination of the two, families of additives can allow for modification of the optical features of photonic crystal materials, such as but not limited to: percent reflection (% R), wavelength (nm) of maximum reflection ($\lambda_{max}$), and full width at half maximum (FWHM) of the reflection peaks, and haze (% haze) of the overall material. Here, the optical features are capable of being modulated for the first-order reflection, and all higher-order reflections; the relations of which are derived from the Bragg equation: $\lambda m = 2 (n_1 d_1 + n_2 d_2)$. Specifically, BBCPs composed of a variety of monomeric units are blended with either inorganic particles or organic polymeric additives to modulate the relative intensities of the higher-order reflection peaks, resulting in high NIR reflection and low Vis reflection. The use of exogenous additives to directly modulate the relative intensities of the higher order reflection peaks for BBCP derived photonic crystal materials is unique and allows for the deployment of these materials in applications necessitating selective NIR reflection and Vis transmission.

The reflective properties of the photonic crystal composition coatings can be established in a bottom-up process through the self-assembly of block copolymers (BCPs) that occur rapidly under easily accessible conditions, i.e., ambient or slightly elevated temperature, atmospheric pressure, and in the presence of oxygen. The self-assembly process avoids the need for specialized manufacturing techniques such as nano-imprint or electron-beam lithography, and layer-by-layer deposition. The polymeric building blocks, polymeric additives, and non-polymeric additives employed in the coating are inexpensive, and in preferred embodiments can be "commodity" materials, maintaining low material cost.

Accordingly, this disclosure provides a photonic crystal composition comprising brush block copolymer (BBCP) of Formula IA or Formula IB:

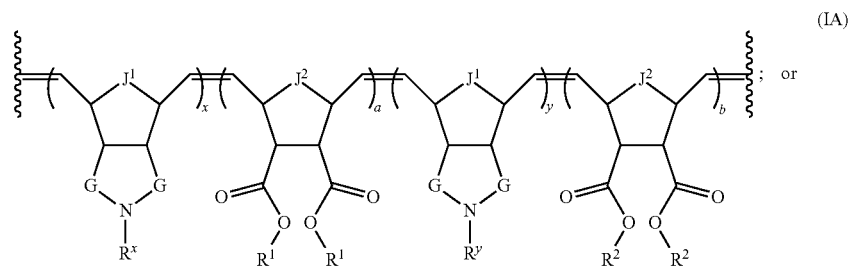

-continued

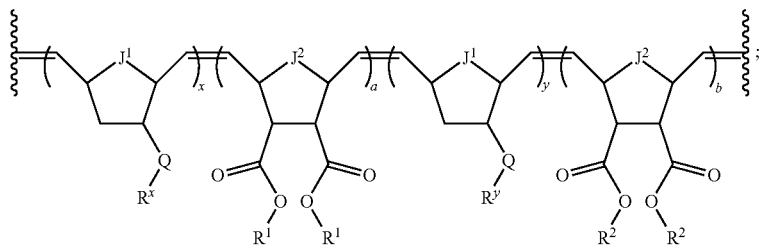
(IB)

optionally a pigment;
wherein
$R^x$ is —$(C_2-C_6)$alkyl-$OC(=O)G^1$ wherein $G^1$ comprises polyacrylate, polymethacrylate or polylactic acid; or —$(C_1-C_5)$alkyl-$G^2$-$G^3$ wherein $G^2$ is —$C(=O)O$— or a nitrogen heterocycle and $G^3$ comprises polystyrene, polyacrylate, polydimethylsiloxane, polyether, polymethacrylate, or polylactic acid;
$R^y$ is —$(C_2-C_6)$alkyl-$OC(=O)G^1$ wherein $G^1$ comprises polyacrylate, polymethacrylate or polylactic acid; or —$(C_1-C_5)$alkyl-$G^2$-$G^3$ wherein $G^2$ is —$C(=O)O$— or a nitrogen heterocycle and $G^3$ comprises polystyrene, polyacrylate, polydimethylsiloxane, polyether, polymethacrylate, or polylactic acid;
$R^1$ is unbranched alkyl;
$R^2$ is branched alkyl;
each G is each independently $CH_2$ or $C=O$;
each $J^1$ is independently $CH_2$, $C=O$, or O;
each $J^2$ is independently $CH_2$, $C=O$, or O;
each Q is independently alkyl, cycloalkyl, heterocycloalkyl, carbonyl, silyl, aryl, or heteroaryl;
a and b are each independently 0 to about 1000; and
x and y are each independently 1 to about 1000;
wherein blocks a, b, x and y are in any order, the ratio of x:a is 1:0 to about 1:3, and the ratio of y:b is 1:0 to about 1:3.

This disclosure also provides a method of modulating an electromagnetic radiation reflectance, absorbance and transmission profile of a substrate comprising coating a substrate with a film of a photonic crystal composition described above, wherein the pigment in the photonic crystal composition modulates the reflectance, absorbance and transmission profile of the substrate and at least 5% more electromagnetic radiation is reflected by the coated substrate than for a corresponding uncoated substrate.

Additionally, this disclosure provides a method for forming a photonic coating comprising:
a) combining a solvent, a pigment, and a brush block copolymer (BBCP) to form a mixture, wherein BBCP is a BBCP of Formula IA or Formula IB above, or Formula IC:

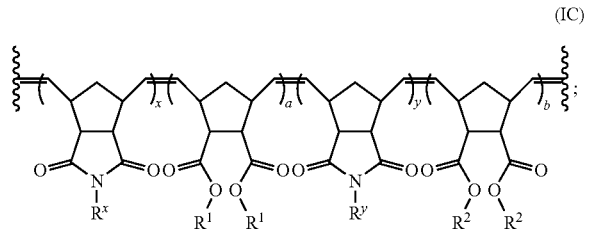
(IC)

wherein
$R^x$ is —$(C_2-C_6)$alkyl-$OC(=O)G^1$ wherein $G^1$ comprises polyacrylate, polymethacrylate or polylactic acid; or —$(C_1-C_5)$alkyl-$G^2$-$G^3$ wherein $G^2$ is —$C(=O)O$— or a nitrogen heterocycle and $G^3$ comprises polystyrene, polyacrylate, polydimethylsiloxane, polyether, polymethacrylate, or polylactic acid;
$R^y$ is —$(C_2-C_6)$alkyl-$OC(=O)G^1$ wherein $G^1$ comprises polyacrylate, polymethacrylate or polylactic acid; or —$(C_1-C_5)$alkyl-$G^2$-$G^3$ wherein $G^2$ is —$C(=O)O$— or a nitrogen heterocycle and $G^3$ comprises polystyrene, polyacrylate, polydimethylsiloxane, polyether, polymethacrylate, or polylactic acid;
$R^1$ is unbranched alkyl;
$R^2$ is branched alkyl;
a and b are each independently 0 to about 1000; and
x and y are each independently 1 to about 1000;
wherein the ratio of x:a is 1:0 to about 1:3 and the ratio of y:b is 1:0 to about 1:3;
b) applying a layer of the mixture to a substrate; and
c) drying the layer to form a film;
wherein the film forms the photonic coating on the substrate.

The invention provides novel compositions comprising of Formulas I(A-F)-III disclosed herein, intermediates for the synthesis of polymers of Formulas I(A-F)-III, as well as methods of preparing compositions comprising polymers of Formulas I(A-F)-III. The invention also provides polymers of Formulas I(A-F)-III that are useful as intermediates for the synthesis of other useful polymers and compositions. The invention provides for the use of polymers of Formulas I(A-F)-III for the manufacture of reflective coatings.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
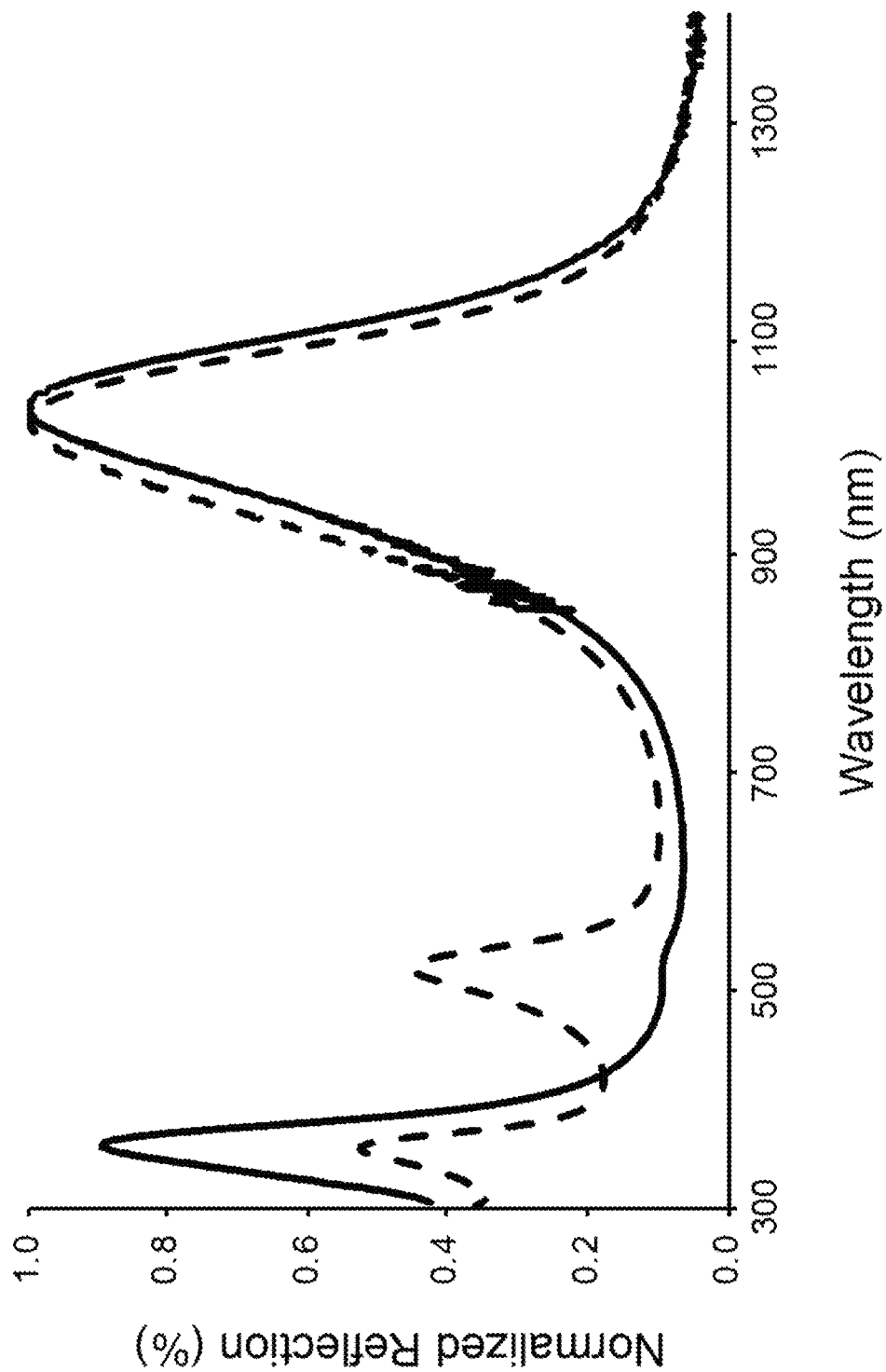
FIG. 1. Reflectance spectra for polymer composite coated glass substrates containing PLA-b-PS photonic crystal film with inorganic additive (solid line) and no inorganic additive.

This application relates to the discovery that the use of inorganic/organic composite materials composed of block copolymers (BCPs) and either inorganic, organic, or some combination of the two, families of additives can allow for modification of the optical features of photonic crystal materials, such as but not limited to: percent reflection (% R), wavelength (nm) of maximum reflection ($\lambda_{max}$), full width at half maximum (FWHM) of the reflection peaks, and haze (% haze) of the resulting photonic crystal material, which can be used for reflective coatings. Here, the optical features are modulated in terms of the first-order reflection and all higher-order reflections; the relations of which are derived from equation 1 (*Polymer Engineering and Science* 1973, 13, 216):

$$\lambda m = 2(n_1 d_1 + n_2 d_2) \quad \text{Equation 1:}$$

where m=order reflection; n=refractive index; and d=domain size.

Specifically, BCPs composed of a variety of monomeric units are blended with either inorganic additives, small molecule organic additives, and/or polymeric additives to modulate the relative intensities of the higher-order reflection peaks; in some instances, resulting in high NIR reflection and low vis reflection. The use of exogenous additives to directly modulate the relative intensities of the higher order reflection peaks for BCP derived photonic crystal materials is unique in its approach and allows for the deployment of these materials in applications necessitating selective reflection and transmission in different ranges of the electromagnetic spectrum.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14' Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

This disclosure provides ranges, limits, and deviations to variables such as volume, mass, percentages, ratios, etc. It is understood by an ordinary person skilled in the art that a range, such as "number 1" to "number 2", implies a continuous range of numbers that includes the whole numbers and fractional numbers. For example, 1 to 10 means 1, 2, 3, 4, 5, . . . 9, 10. It also means 1.0, 1.1, 1.2, 1.3, . . . , 9.8, 9.9, 10.0, and also means 1.01, 1.02, 1.03, and so on. If the variable disclosed is a number less than "number 10", it implies a continuous range that includes whole numbers and fractional numbers less than number 10, as discussed above. Similarly, if the variable disclosed is a number greater than "number 10", it implies a continuous range that includes whole numbers and fractional numbers greater than number 10. These ranges can be modified by the term "about", whose meaning has been described above.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

Wherever the term "comprising" is used herein, options are contemplated wherein the terms "consisting of" or "consisting essentially of" are used instead. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the aspect element. As used herein, "consisting essentially of" does not exclude materials or steps that do not materially affect the basic and novel characteristics of the aspect. In each instance herein any of the terms "comprising", "consisting essentially of" and "consisting of" may be replaced with either of the other two terms. The disclosure illustratively described herein may be suitably practiced in the absence of any element or elements, limitation or limitations which is not specifically disclosed herein.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983).

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J.

Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

As used herein, the term "substituted" or "substituent" is intended to indicate that one or more (for example., 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano. Additionally, non-limiting examples of substituents that can be bonded to a substituted carbon (or other) atom include F, Cl, Br, I, OR', OC(O)N(R')$_2$, CN, CF$_3$, OCF$_3$, R', 0, S, C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include both alkenyl and alkynyl groups. The alkyl can be a monovalent hydrocarbon radical, as described and exemplified above, or it can be a divalent hydrocarbon radical (i.e., an alkylene).

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "heterocycloalkyl" refers to a saturated or partially saturated monocyclic, bicyclic, or polycyclic ring containing at least one heteroatom selected from nitrogen, sulfur, oxygen, preferably from 1 to 3 heteroatoms in at least one ring. Each ring is preferably from to 10 membered, more preferably 4 to 7 membered. Examples of suitable heterocycloalkyl substituents include pyrrolidyl, tetrahydrofuryl, tetrahydrothiofuranyl, piperidyl, piperazyl, tetrahydropyranyl, morpholino, 1,3-diazapane, 1,4-diazapane, 1,4-oxazepane, and 1,4-oxathiapane. The group may be a terminal group or a bridging group.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. In other embodiments, the aryl group can have 6 to 60 carbons atoms, 6 to 120 carbon atoms, or 6 to 240 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted.

The term "heteroaryl" refers to a monocyclic, bicyclic, or tricyclic ring system containing one, two, or three aromatic rings and containing at least one nitrogen, oxygen, or sulfur atom in an aromatic ring. The heteroaryl can be unsubstituted or substituted, for example, with one or more, and in particular one to three, substituents, as described in the definition of "substituted". Typical heteroaryl groups contain 2-20 carbon atoms in the ring skeleton in addition to the one or more heteroatoms. Examples of heteroaryl groups include, but are not limited to, 2H-pyrrolyl, 3H-indolyl, 4H-quinolizinyl, acridinyl, benzo[b]thienyl, benzothiazolyl, β-carbolinyl, carbazolyl, chromenyl, cinnolinyl, dibenzo[b, d]furanyl, furazanyl, furyl, imidazolyl, imidizolyl, indazolyl, indolisinyl, indolyl, isobenzofuranyl, isoindolyl, isoquinolyl, isothiazolyl, isoxazolyl, naphthyridinyl, oxazolyl, perimidinyl, phenanthridinyl, phenanthrolinyl, phenarsazinyl, phenazinyl, phenothiazinyl, phenoxathiinyl, phenoxazinyl, phthalazinyl, pteridinyl, purinyl, pyranyl, pyrazinyl, pyrazolyl, pyridazinyl, pyridyl, pyrimidinyl, pyrrolyl, quinazolinyl, quinolyl, quinoxalinyl, thiadiazolyl, thianthrenyl, thiazolyl, thienyl, triazolyl, tetrazolyl, and xanthenyl. In one embodiment the term "heteroaryl" denotes a monocyclic aromatic ring containing five or six ring atoms containing carbon and 1, 2, 3, or 4 heteroatoms independently selected from non-peroxide oxygen, sulfur, and N(Z) wherein Z is absent or is H, O, alkyl, aryl, or $(C_1$-$C_6)$alkylaryl. In some embodiments, heteroaryl denotes an ortho-fused bicyclic heterocycle of about eight to ten ring atoms derived therefrom, particularly a benz-derivative or one derived by fusing a propylene, trimethylene, or tetramethylene diradical thereto.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Other examples of a solvent include a halogenated aromatic compound or halogenated phenyl compound such as a fluorinated or polyfluorinated phenyl compound, for example 4-chlorobenzotrifluoride. Solvents may be used alone or two or more of them may be mixed for use to provide a "solvent system".

The phrase "one or more" is readily understood by one of skill in the art, particularly when read in context of its usage. For example, one or more substituents on a phenyl ring refers to one to five, or one to up to four, for example if the phenyl ring is disubstituted. One or more subunits (i.e., repeat units or blocks) of a polymer can refer to about 5 to about 100,000, or any number of subunits.

Substituents of the compounds and polymers described herein may be present to a recursive degree. In this context, "recursive substituent" means that a substituent may recite another instance of itself. Because of the recursive nature of such substituents, theoretically, a large number may be present in any given claim. One of ordinary skill in the art of organic chemistry understands that the total number of such substituents is reasonably limited by the desired properties of the compound intended. Such properties include, by of example and not limitation, physical properties such as molecular weight, solubility or log P, application properties such as activity against the intended target, and practical properties such as ease of synthesis. Recursive substituents are an intended aspect of the invention. One of ordinary skill in the art of organic chemistry understands the versatility of such substituents. To the degree that recursive substituents are present in a claim of the invention, the total number in the repeating unit of a polymer example can be, for example, about 1-50, about 1-40, about 1-30, about 1-20, about 1-10, or about 1-5.

The term, "repeat unit", "repeating unit", or "block" as used herein refers to the moiety of a polymer that is repetitive. The repeat unit may comprise one or more repeat units, labeled as, for example, repeat unit x, repeat unit y, repeat unit a, repeat unit b, etc. Repeat units x, y, a, and b, for example, may be linked in any order and covalently bound together to form a combined repeat unit. Monomers or a combination of one or more different monomers can be combined to form a (combined) repeat unit of a polymer or copolymer.

The term "molecular weight" for the copolymers disclosed herein refers to the average number molecular weight (Mn). The corresponding weight average molecular weight (Mw) can be determined from other disclosed parameters by methods (e.g., by calculation) known to the skilled artisan.

The copolymers disclosed herein can comprise random or block copolymers. A random copolymer can be shown by "r" over bonds between repeat units of the copolymer. Thus, the arrangement of the x units and x-a units is random throughout the length of the copolymer (e.g., Formula I, II, or III), and the total number of x units and x-a units is defined by x and a of the relevant formula, randomly arranged along the length of the copolymer.

In various embodiments, the ends of the copolymer (i.e., the initiator end or terminal end), is a low molecular weight moiety (e.g. under 500 Da), such as, H, OH, OOH, $CH_2OH$, CN, $NH_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

Self-assembly is a process in which a disordered system of pre-existing components forms an organized structure or pattern because of specific, local interactions among the components themselves, without external direction. For molecular self-assembly, initially, at small molecular density on the surface, adsorbate molecules form either a disordered mass of molecules or form an ordered two-dimensional "lying down phase", and at higher molecular coverage, over a period of minutes to hours, begin to form three-dimensional morphologies on the substrate surface. The "head groups" assemble on the substrate, while the tail groups assemble far from the substrate. Areas of close-packed molecules nucleate and grow until the surface of the substrate is covered.

A brush block copolymer molecule is a special form of a branched polymer that comprises a main chain with linear, unbranched side chains. The brushes are often characterized by the high density of grafted chains. The limited space then leads to a strong extension of the chains. Branching occurs by the replacement of a substituent, e.g., a hydrogen atom, on a monomer subunit, by another covalently bonded chain of that polymer; or, in the case of a graft copolymer, by a chain of another type. Branching may result from the formation of carbon-carbon or various other types of covalent bonds. Branching by ester and amide bonds is typically by a condensation reaction.

The term "pigment" is used interchangeably with dye or colorant. A pigment is a material such as a solid, solution or liquid that changes the color of reflected or transmitted light as the result of wavelength-selective absorption. The pigment or dye is an organic compound, organometallic compound or inorganic compound, and a pigment can be an exogenous additive that gives color.

A substrate can be any material which is coated with the composition disclosed herein. For example, a substrate can be a glass, metal, alloy, polymer, composite, wood, dried paint, or a surface of any kind.

The following abbreviations have their usual meaning to the skilled artisan: Đ=dispersity, kDa=kilodalton, $M_n$=number-average molecular weight, Mw=weight average molecular weight.

Embodiments of the Invention

This disclosure provides a photonic crystal composition comprising brush block copolymer (BBCP) of Formula IA or Formula IB:

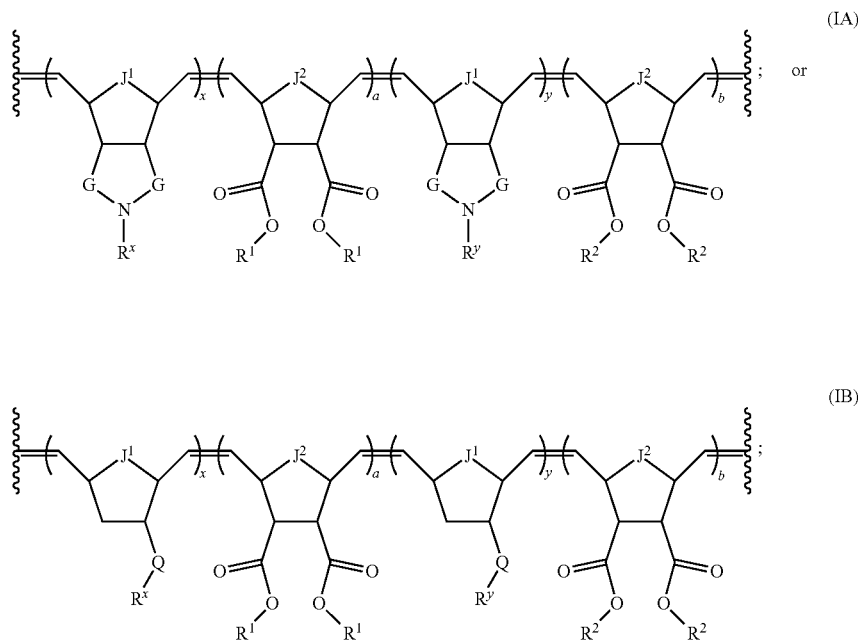

and optionally a pigment
wherein
  $R^x$ is —$(C_2-C_6)$alkyl-OC(=O)$G^1$ wherein $G^1$ comprises polyacrylate, polymethacrylate or polylactic acid; or —$(C_1-C_6)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
  $R^y$ is —$(C_2-C_6)$alkyl-OC(=O)$G^1$ wherein $G^1$ comprises polyacrylate, polymethacrylate or polylactic acid; or —$(C_1-C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
  $R^1$ is branched or unbranched alkyl;
  $R^2$ is branched or unbranched alkyl;
  each G is each independently $CH_2$ or C=O;
  each $J^1$ is independently $CH_2$, C=O, or O;
  each $J^2$ is independently $CH_2$, C=O, or O;
  each Q is independently alkyl, cycloalkyl, heterocycloalkyl, carbonyl, silyl, aryl, or heteroaryl;
  a and b are each independently 0 to about 1000; and
  x and y are each independently 1 to about 1000;
    wherein blocks a, b, x and y are in any order, the ratio of x:a is 1:0 to about 1:3, and the ratio of y:b is 1:0 to about 1:3.

In various embodiments, the nitrogen heterocycle is a triazole or a heterocycle disclosed herein. In various additional embodiments, the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof. In some embodiments, the pigment or dye is, but is not limited to, acridine, bromothymol, carmine, Eosin Y, Guaiazulene, perylene, or a combination thereof.

In other embodiments, a and b are each independently 1-300, 5-50, 50-100, 100-150, 150-200, 200-250, 250-300, 300-400, 400-500, 500-600, 600-700, 700-800, 800-900, 900-1000, or 1000-2000. In other embodiments, x and y are each independently 1-300, 5-50, 50-100, 100-150, 150-200, 200-250, 250-300, 300-400, 400-500, 500-600, 600-700, 700-800, 800-900, 900-1000, or 1000-2000. In additional embodiments, the ratio of x:a is about 1:0.5 to about 1:1, 1:1.5, 1:2, or 1:2.5. In yet other embodiments, the ratio of y:b is about 1:0.5 to about 1:1, 1:1.5, 1:2, or 1:2.5.

In further embodiments, the composition reflects a blue color, green, orange color, red color, or reflects wavelengths at near infrared. In various embodiments, BBCP has a number average molecular weight of about 500 kDa to about 4000 kDa.

In some embodiments, the compositions are characterized by the blue color in compositions comprising Formulas I or II when $M_n$=1110.3 kDa, Mw=1196.1 kDa, Đ=1.08, and a=x=y=b=about 164. Preferably a=x=y=b=140-180 in some embodiments. More preferably a=x=y=b=150-170 in other embodiments.

In some embodiments, the compositions are characterized by the green color in compositions comprising Formulas I or II when $M_n$=1275.7 kDa, Mw=1403.2 kDa, Đ=1.10, and a=x=y=b=about 179. Preferably a=x=y=b=160-190 in some embodiments. More preferably a=x=y=b=165-185 in other embodiments.

In some embodiments, the compositions are characterized by the orange color in compositions comprising Formulas I or II when $M_n$=1795.3 kDa, Mw=2010.4 kDa, Đ=1.12, and a=x=y=b=about 252. Preferably a=x=y=b=230-270 in some embodiments. More preferably a=x=y=b=240-260 in other embodiments.

In some embodiments, the compositions are characterized by the wavelengths reflected at near infrared in compositions comprising Formulas I or II when $M_n$=2063.1 kDa, Mw=2384.8 kDa, Đ=1.16, and a=x=y=b=about 289. Preferably a=x=y=b=270-300 in some embodiments. More preferably a=x=y=b=275-295 in other embodiments.

In various other embodiments, the weight percent of BBCP in the resulting coating is about 25% to about 99.9% and the weight percent of the pigment or dye is about 0.1% to about 10%. In some embodiments, the weight percent of BBCP is about 85%. 91%, 92%, 93%, 94%, 95%, 96%, 97%, 98% or 99%, or any range in-between. In yet other embodiments, the weight percent of the pigment or dye is about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10% or 15%, or a range in between any two of these recited values.

In additional embodiments, the composition further comprises a metal oxide, a polymer additive, a linear polymer additive, or a combination thereof. In some embodiments, the linear polymer additive is linear poly(methacrylate), linear polylactic acid, linear polystyrene, or a combination thereof. In yet some other embodiments, the composition further comprises zirconium dioxide nanocrystals, titanium oxide nanocrystals, or hafnium oxide nanocrystals.

In further embodiments, the BBCP of Formula IA is a BBCP of Formula IC or Formula II:

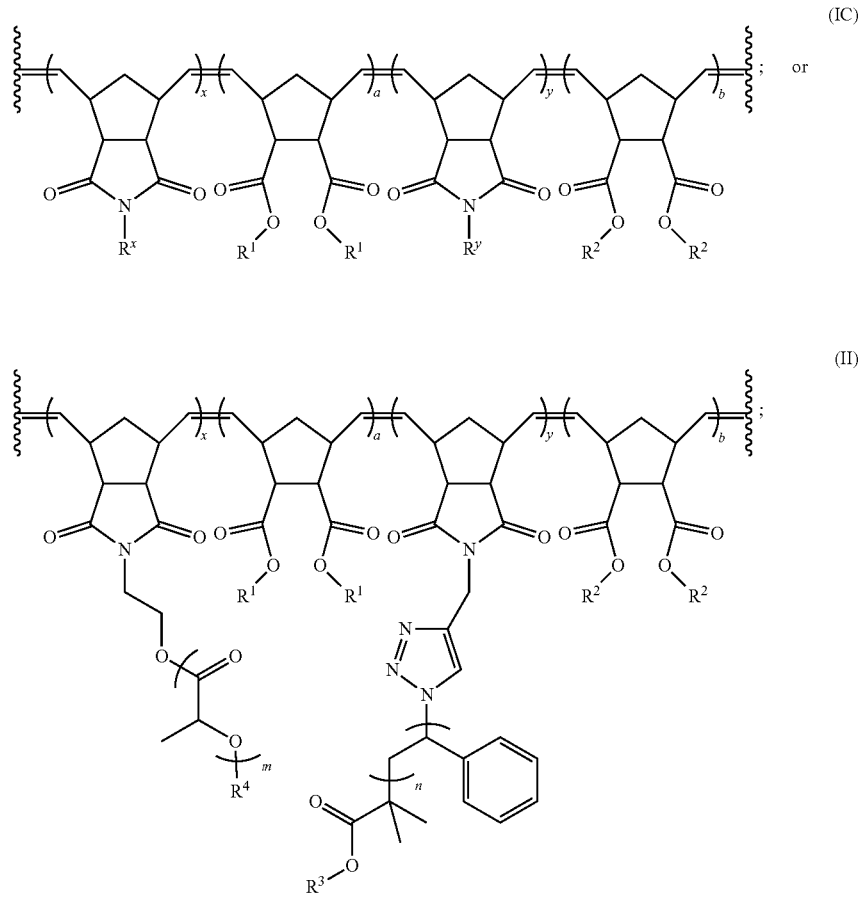

wherein
$R^3$ and $R^4$ are each independently H or unbranched or branched—$(C_1-C_6)$alkyl; and m and n are each independently 1-100.

In other embodiments, m and n are each independently 1-10, 10-50, 10-20, 20-30, 30-40, 40-50, or 50-100.

In additional embodiments, the BBCP of Formula I is a BBCP of Formula III:
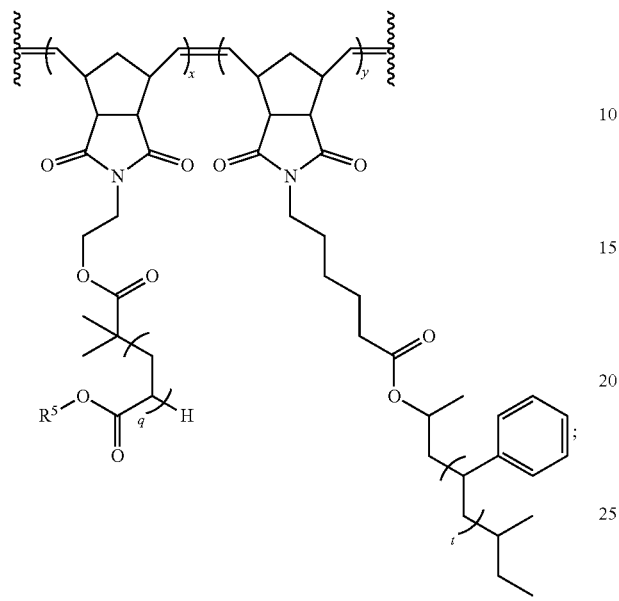
(III)
wherein
R⁵ is H or unbranched or branched—(C₁-C₆)alkyl; and
q and t are each independently 1-100.
In some embodiments, q and t are each independently 1-10, 10-50, 10-20, 20-30, 30-40, 40-50, or 50-100.
In other embodiments, the brush block copolymer (BBCP) is represented by Formula
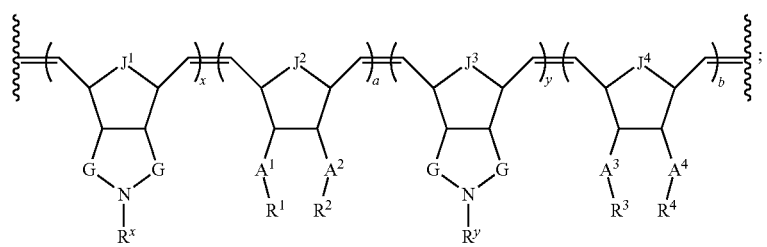
(ID)
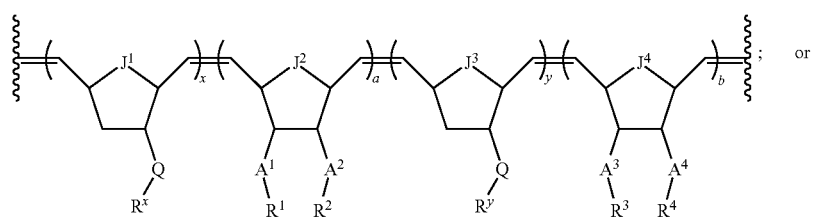
(IE) or -continued

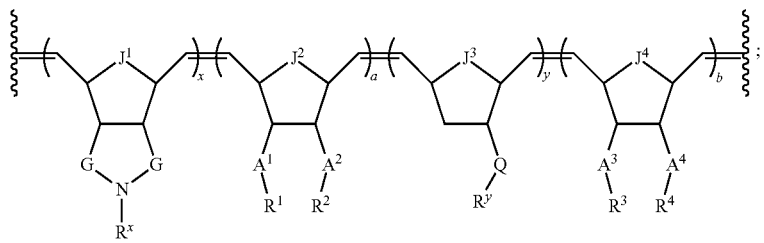
(IF)

wherein
  $R^x$ is —$(C_2$-$C_6)$alkyl-OC(=O)$G^1$ wherein $G^1$ comprises polyacrylate, polymethacrylate or polylactic acid; or —$(C_1$-$C_5)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
  $R^y$ is —$(C_2$-$C_6)$alkyl-OC(=O)$G^1$ wherein $G^1$ comprises polyacrylate, polymethacrylate or polylactic acid; or —$(C_1$-$C_5)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
  $R^1$ is unbranched or unbranched alkyl;
  $R^2$ is branched or unbranched alkyl;
  $R^3$ is branched or unbranched alkyl;
  $R^4$ is branched or unbranched alkyl;
  each G is each independently $CH_2$ or C=O;
  $J^1$ is $CH_2$, C=O, or O;
  $J^2$ is $CH_2$, C=O, or O;
  $J^3$ is $CH_2$, C=O, or O;
  $J^4$ is $CH_2$, C=O, or O;
  $A^1$, $A^2$, $A^3$, and $A^4$ are each independently

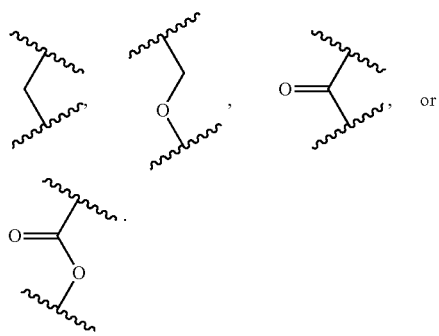

each Q is independently alkyl, cycloalkyl, heterocycloalkyl, carbonyl, silyl, aryl, or heteroaryl;
a and b are each independently 0 to about 1000; and
x and y are each independently 1 to about 1000;
  wherein blocks a, b, x and y are in any order, the ratio of x:a is 1:0 to about 1:3, and the ratio of y:b is 1:0 to about 1:3.
In various embodiments the BBPCs disclosed herein comprise an additive such as a pigment, dye, or colorant.

This disclosure also provides a method of modulating an electromagnetic radiation reflectance, absorbance and transmission profile of a substrate comprising coating a substrate with a film of a photonic crystal composition disclosed herein, wherein the pigment or dye in the photonic crystal composition modulates the reflectance, absorbance and transmission profile of the substrate and at least 5% more electromagnetic radiation is reflected by the coated substrate than for a corresponding uncoated substrate.

In some embodiments, about 5% to about 25%, about 25% to about 50%, about 50% to about 75%, or about 75% to about 95%, more electromagnetic radiation is reflected by the coated substrate than for a corresponding uncoated substrate.

In various embodiments, the film has an optical thickness f-ratio of about 0.25 to about 0.55, or an f-ratio of about 0.1, 0.2, 0.3, 0.4, 0.5, 0.6, 0.7, 0.8, or 0.9, or any range in-between.

In some embodiments, the reflectance, absorbance and transmission profile of the substrate comprises reflected electromagnetic radiation at wavelengths of about 280 nanometers to about 400 nanometers. In other embodiments, the reflectance, absorbance and transmission profile of the substrate comprises reflected electromagnetic radiation at wavelengths of about 400 nanometers to about 700 nanometers. In yet other embodiments, the reflectance, absorbance and transmission profile of the substrate comprises reflected electromagnetic radiation at wavelengths of about 700 nanometers to about 1550 nanometers.

In further embodiments, the reflectance, absorbance and transmission profile of the substrate comprises reflected electromagnetic radiation at wavelengths of about 200 nm to about 300 nm, about 300 nm to about 400 nm, about 400 nm to about 500 nm, about 500 nm to about 600 nm, about 600 nm to about 700 nm, about 700 nm to about 800 nm, about 800 nm to about 900 nm, about 900 nm to about 1000 nm, about 1000 nm to about 1100 nm, about 1100 nm to about 1200 nm, about 1200 nm to about 1300 nm, about 1300 nm to about nm, or about 1400 nm to about 1600 nm.

Additionally, this disclosure provides a method for forming a photonic coating comprising:
  a) combining a solvent, a pigment or dye, and a brush block copolymer (BBCP) to form a mixture, wherein BBCP is a BBCP of Formula IA, Formula IB, Formula ID, Formula IE, Formula IF, Formula II, or Formula III above, or Formula IC:

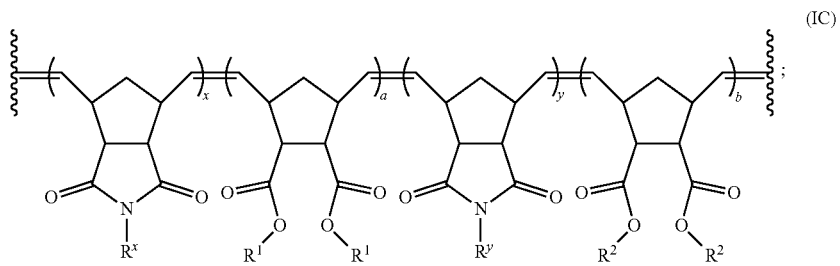

wherein
- $R^x$ is —$(C_2$-$C_6)$alkyl-OC(=O)$G^1$ wherein $G^1$ comprises polyacrylate, polymethacrylate or polylactic acid; or —$(C_1$-$C_5)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
- $R^y$ is —$(C_2$-$C_6)$alkyl-OC(=O)$G^1$ wherein $G^1$ comprises polyacrylate, polymethacrylate or polylactic acid; or —$(C_1$-$C_5)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
- $R^1$ is unbranched alkyl;
- $R^2$ is branched alkyl;
- a and b are each independently 0-1000; and
- x and y are each independently 1-1000;

wherein the ratio of x:a is 1:0 to about 1:3 and the ratio of y:b is 1:0 to about 1:3;
b) applying a layer of the mixture to a substrate; and
c) drying the layer to form a film;
wherein the film forms the photonic coating on the substrate.

In some embodiments, the solvent is 4-chlorobenzotrifluoride. In various embodiments, the method comprises a BBCP of Formula II or Formula III as described above. In further embodiments, the pigment or dye is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof. In additional embodiments, the pigment or dye is, but is not limited to, acridine, bromothymol, carmine, Eosin Y, Guaiazulene, perylene, or a combination thereof.

In further embodiments, the pigment or dye has a weight percent of about 0.1% to about 3% in the mixture, or about 0.1%, 0.2%, 0.3%, 0.4%, 0.5%, 0.6%, 0.7&, 0.8%, 0.9%, 1%, 1.5%, 2.0%, 2.5%, 3.0%, 4%, 5% or 10%, or any range in-between, in the mixture. In other embodiments, BBCP has a weight percent of about 2.5% to about 50% in the mixture, or about 1%, 5%, 10%, 15%, 20%, 25%, 30% or 40%, or any range in-between, in the mixture.

In various other embodiments of the composition and method, BBCP has a number average molecular weight of about 500 kDa to about 4000 kDa, or about 900 kDa to about kDa. In other embodiments, BBCP has a number average molecular weight of about kDa, 200 kDa, 300 kDa, 400 kDa, 500 kDa, 600 kDa, 700 kDa, 800 kDa, 900 kDa, 1000 kDa, 1100 kDa, 1200 kDa, 1300 kDa, 1400 kDa, 1500 kDa, 1600 kDa, 1700 kDa, 1800 kDa, 1900 kDa, 2000 kDa, 2100 kDa, 2200 kDa, 2300 kDa, 2400 kDa, 2500 kDa, 2600 kDa, 2700 kDa, 2800 kDa, 2900 kDa, 3000 kDa, 3500 kDa, 4000 kDa, 4500 kDa or 5000 kDa, or any range in-between.

In yet other embodiments of the above method, step a) further comprises addition to the mixture of a metal oxide, a polymer additive, a linear polymer additive, or a combination thereof. In various embodiments, the linear polymer additive is linear poly(methacrylate), linear polylactic acid, linear polystyrene, or a combination thereof. In additional embodiments of the above method, applying a layer of the mixture to a substrate comprises, but is not limited to, spray deposition of the mixture to the substrate, or other methods of deposition disclosed herein, for example, draw-down coating, slot die coating, screen printing, spray deposition, or paintbrush/roller of the mixture to the substrate.

Various aspects of this disclosure include embodiments wherein:

Photonic crystal materials containing either an inorganic or organic additive(s), involving the addition of at least one inorganic or organic component to a polymer-based photonic crystal or an organic additive composed of a different monomeric unit compared to the composition of the polymeric components.

The photonic crystal is formed from a linear block polymer, brush block polymer, star polymer, polymeric colloidal crystalline array, or any repeating dielectric structure.

The polymer is assembled or manufactured into spheres, cylinders, gyroids, lamellae or any periodic structure accessible by polymer self-assembly.

The polymer composite photonic crystal material, or solely the brush block copolymer is deposited via draw down, wire bar, doctor blade, or bird bar.

The polymer composite photonic crystal material, or solely the brush block copolymer is deposited via by paint brush or roller application.

The polymer composite photonic crystal material, or solely the brush block copolymer is deposited via screen printing.

The polymer composite photonic crystal material, or solely the brush block copolymer is deposited via dip coating.

The polymer composite photonic crystal material, or solely the brush block copolymer is deposited via hydrographic printing.

The polymer composite photonic crystal material, or solely the brush block copolymer is deposited via spray brush, spray gun, rotary bell atomizer, or other spray application methods including but not limited to air-atomized, airless, electrostatic, high-volume, low-pressure.

The photonic crystal coating has high near-infrared reflection and low visible reflection.

The photonic crystal coating has high visible reflection and low ultraviolet reflection.

The inorganic component is a nano-scale form (including molecular complexes and particulates in general) of alkali (earth) metals.

The inorganic component is a nano-scale form (including molecular complexes and particulates in general) of Group IV metals such as titanium, zirconium, or hafnium, and/or their oxides, or combinations of any elements with Group IV metals and/or oxides.

The inorganic component is a nano-scale form (including molecular complexes and particulates in general) of Group V metals such as vanadium, niobium, and tantalum, and/or their oxides, or combinations of any elements with Group V metals and/or oxides.

The inorganic component is a nano-scale form (including molecular complexes and particulates in general) of Group VI metals such as chromium, molybdenum, and tungsten, and/or their oxides, or combinations of any elements with Group VI metals and/or oxides.

The inorganic component is a nano-scale form (including molecular complexes and particulates in general) of Group VII metals such as manganese, technetium, and rhenium, and/or their oxides, or combinations of any elements with Group VII metals and/or oxides.

The inorganic component is a nano-scale form (including molecular complexes and particulates in general) of Group VIII metals such as iron, ruthenium, and osmium, and/or their oxides, or combinations of any elements with Group VIII metals and/or oxides.

The inorganic component is a nano-scale form (including molecular complexes and particulates in general) of Group IX metals such as cobalt, rhodium, and iridium, and/or their oxides, or combinations of any elements with Group IX metals and/or oxides.

The inorganic component is a nano-scale form (including molecular complexes and particulates in general) of Group X metals such as nickel, palladium, and platinum, and/or their oxides, or combinations of any elements with Group X metals and/or oxides.

The inorganic component is a nano-scale form (including molecular complexes and particulates in general) of Group XI metals such as copper, silver, and gold, and/or their oxides, or combinations of any elements with Group XI metals and/or oxides.

The inorganic component is a nano-scale form (including molecular complexes and particulates in general) of Group XII metals such as zinc, cadmium, and mercury, and/or their oxides, or combinations of any elements with Group XII metals and/or oxides.

The inorganic component is functionalized with a surface ligand. If the inorganic component is functionalized with a surface ligand, the inorganic component can be functionalized with a surface polymer-based ligand.

The organic or inorganic additive component has a refractive index greater or less than 0.05 from the homopolymer that would be derived from the monomeric unit(s) that compose the BCP.

The organic or inorganic additive component is used to change the f value of the composition to 0.50±0.03.

The organic or inorganic additive component is used to change the f value of the composition to 0.33±0.03.

The inorganic or organic additive is a dye.

The inorganic or organic additive is a pigment.

The inorganic or organic additive absorbs ultra-violet A or B light (280-400 nm).

The inorganic or organic additive changes the absorption or transmission profile of the photonic crystal in the ultra-violet A or B light range (280-400 nm).

The inorganic or organic additive absorbs visible light (400-700 nm).

The inorganic or organic additive changes the absorption or transmission profile of the photonic crystal in the visible light range (400-700 nm).

The inorganic or organic additive absorbs near infrared, IR-A, light range (700-1400 nm).

The inorganic or organic additive changes the absorption or transmission profile of the photonic crystal in the near infrared, IR-A, light range (700-1400 nm).

Results and Discussion

It was found that incorporation of inorganic material(s) in a specific weight percent had the effect of selectively decreasing the % R of (even numbered)-order reflections from a polymer-based photonic crystal, while maintaining or increasing % R of the first- and third-(odd numbered)-order reflections (FIG. 1). As observed in FIG. 1, by using an inorganic additive, the second-order % R is selectively decreased from 31% R at 519 nm, which is easily observed by the human eye as green color, to 4.7% R at 525 nm, not easily observed by the human eye.

Figure 2:
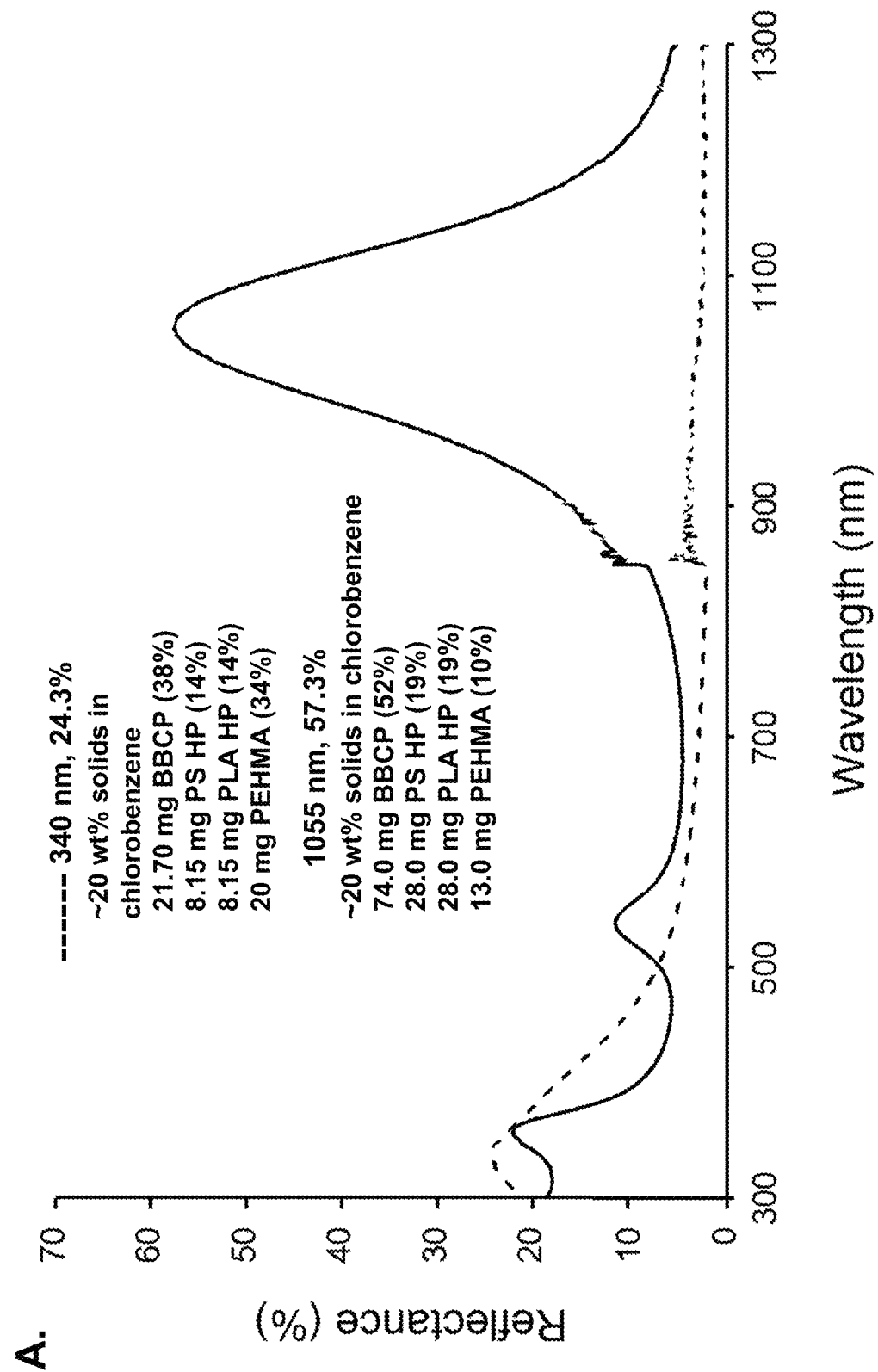
FIG. 2. A) Reflectance spectra for polymer composite coated glass substrates containing PLA-b-PS photonic crystal film with 10% (by weight) of a poly(2-ethylhexyl methacrylate) additive (solid line) and 34% (by weight) of the same (dashed line). B) Reflectance (solid line) and transmission (dashed line) spectra for of the 10% by weight poly(2-ethylhexyl methacrylate) containing self-assembled film (from FIG. 2A).
Figure 2:
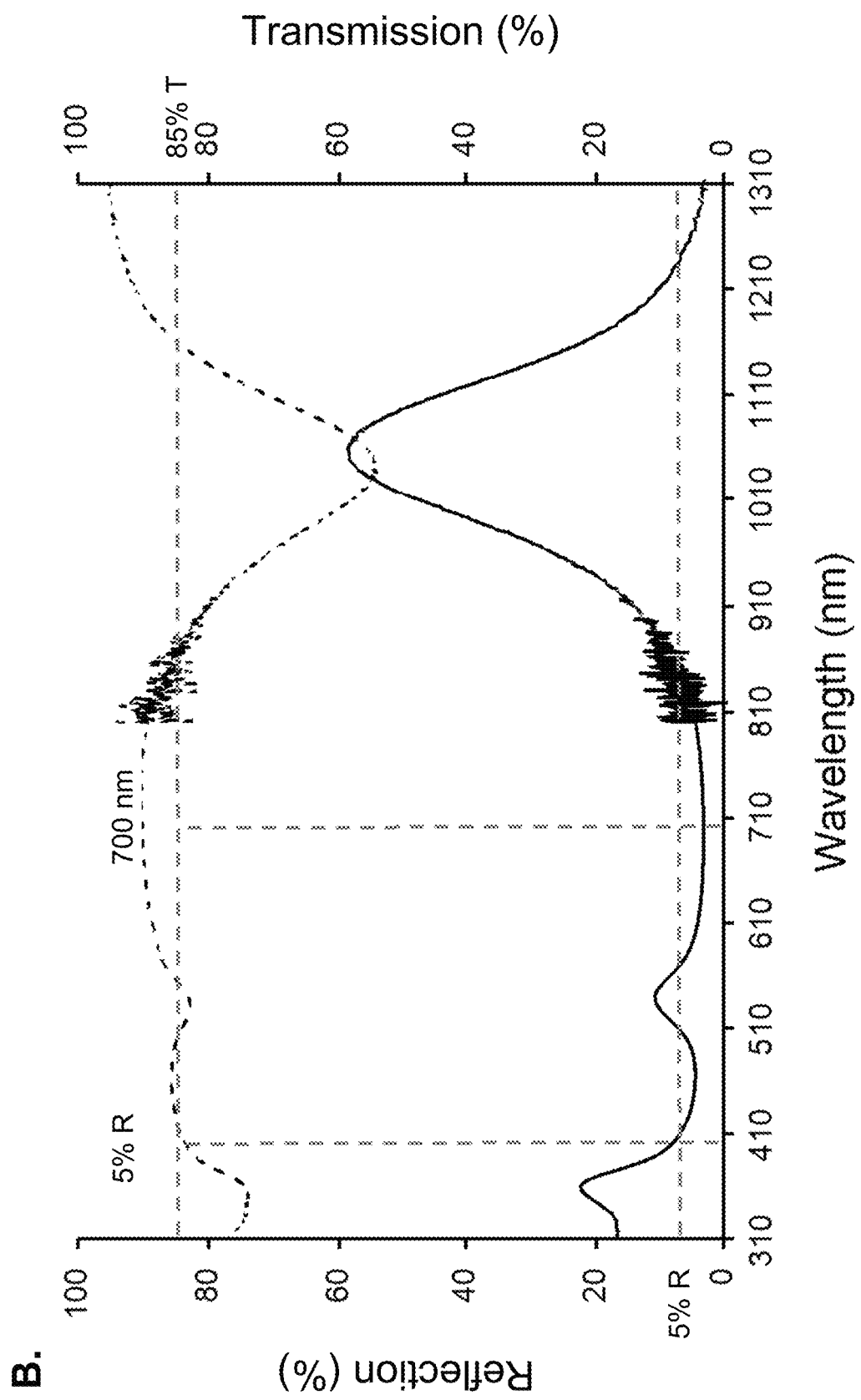

It was found that incorporation of specific organic material(s) in a specific weight percent had the effect of increasing the long-range order of the nanostructured material, as evidenced by the well-defined $1^{st}$, $2^{nd}$, $3^{rd}$ . . . etc. order reflections, and low % R outside of the main reflection peaks (FIG. 2). As observed in FIG. 2, by using an organic material additive, high NIR reflection (>60%), low Vis reflection (<10%), and high Vis transmission (>85%) can be achieved.

Both observations can be explained through the manipulation of optical thickness referred to as the "f-ratio" (f) and can be defined in equation 2 (*Polymer Engineering and Science* 1969, 9, 404):

$$f = \frac{n_1 d_1}{(n_1 d_1 + n_2 d_2)}. \qquad \text{Equation 2}$$

Wherein f values close or equal to 0.5 (equal optical thickness) suppress the even order reflections (m=2, 4, 6 . . . ), and f values close or equal to 0.33 suppresses the odd order reflections (m=1, 3, 5, 7 . . . ). By adding organic or inorganic components compatible with the BCP, we can target and adjust the % R in specific wavelength ranges (UV, Vis, NIR). In the case of visibly transparent UV and/or NIR reflective coatings, we can suppress the % R within the visible region.

Figure 3:
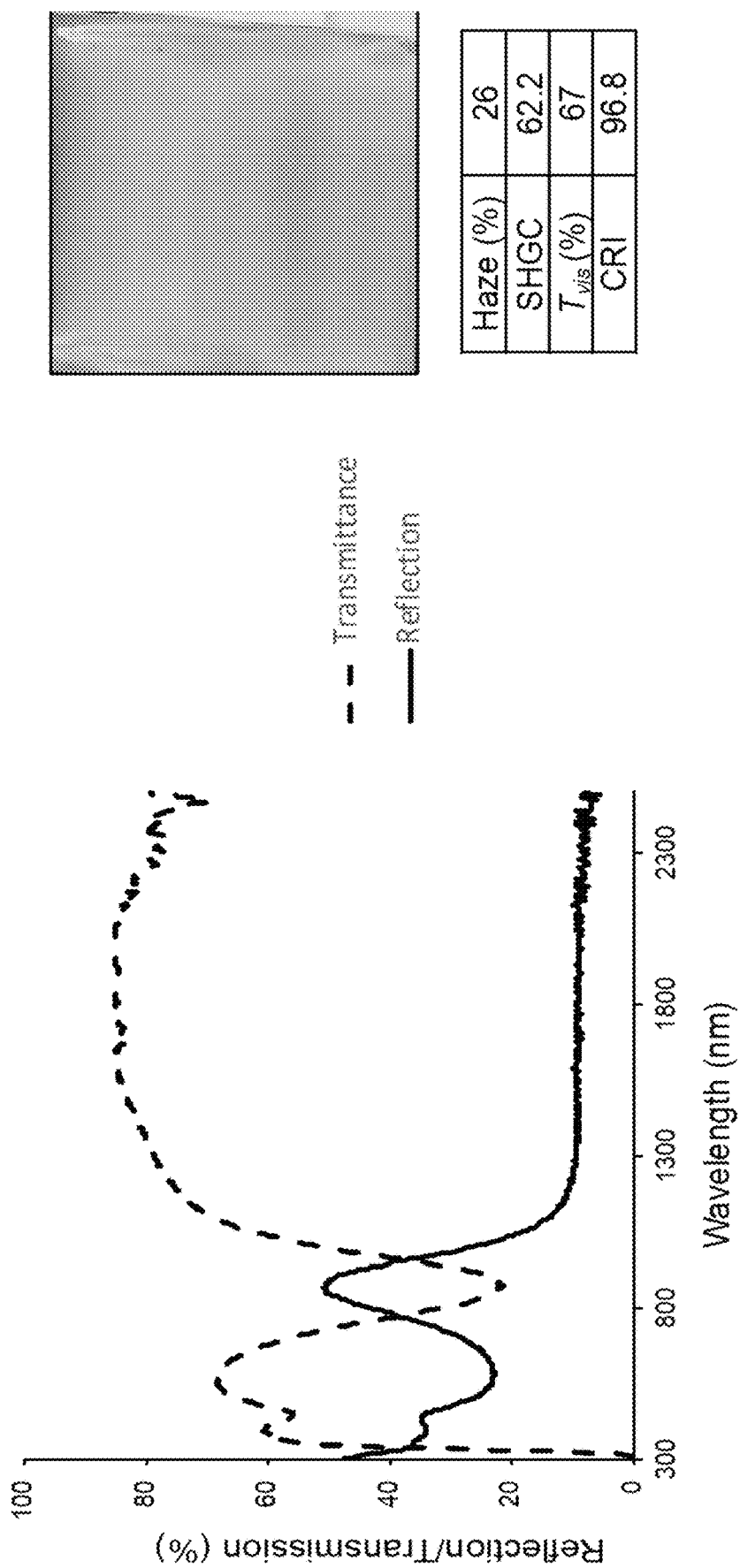
FIG. 3. Reflectance (solid line) and transmission (dashed line) spectra of a spray-deposited self-assembled PLA-b-PS photonic crystal film (left), a picture of the film (right, top), and the haze, visible light transmission, solar heat gain coefficient, and color rendering index values of the film (right, bottom).

Significant advantages over the state of the art are present due to innovations in the polymeric material itself, the polymer composite mixtures, and the facile process by which these materials self-assemble to form functional optical coatings, deposited via various methods such as: paint brush, draw down, wire bar, doctor blade, bird bar, roller application, screen print, spray brush, or spray gun application (FIG. 3).

FIG. 1 compares the reflection of two PLA-b-PS photonic crystal films; the solid trace with an inorganic additive and the dashed trace with no additive. Comparison of the intensities (% reflection) of the different peaks reveal that inclusion of the inorganic additive significantly alters the relative intensities for the $1^{st}$, $2_{nd}$ and $3^{rd}$ order reflections. Specifically, inclusion of the inorganic additive increases the $3^{rd}$ order reflection relative to the $1^{st}$ order, while decreasing the $2^{nd}$ order reflection relative to the first order. This result is significant, as visible reflection is selectively suppressed while maintaining the UV and NIR reflection. Compared to the closest prior art, similar optical features are accomplished by multilayer co-extrusion of different polymeric materials. Contrasted to co-extrusion, similar optical properties can now be accessed by simple formulation and painting.

FIG. 2 compares the reflection of two PLA-b-PS photonic crystal films; the dashed-line trace with a 34 wt % loading of PEHMA polymeric additive, and the black-line trace with 10 wt % loading of PEHMA polymeric additive. It is noted that if BBCP is removed from the composition, there would be no reflection. Similar to FIG. 1, FIG. 2 shows the alteration of optical properties in the polymer composite photonic crystal film by addition of additives. Specifically, addition of PEHMA can dramatically alter the reflection by increasing the loading from 10 wt % to 34 wt %.

FIG. 2A amount generalizations: 15-30 weight % solids in chlorobenzene. Solids breakdown: BBCP ~20-60%, poly(styrene) polymer additive ~10-20%, poly(lactic acid) polymer additive ~10-20%, poly(2-ethylhexyl methacrylate) polymer additive ~10-40%.

FIG. 2B shows the transmission in addition to the reflection.

FIG. 3 shows the transmission (dashed-line) and reflection (solid-line) traces of a spray deposited polymer composite PLA-b-PS photonic crystal film. This result is significant, as it represents the first spray-deposited brush block copolymer photonic crystal film.

Furthermore, this disclosure relates to the discovery that self-assembling polymeric photonic crystal coatings composed of a brush block copolymer (BBCP) and the use of exogenously added pigments or dyes can be used to modify the optical properties of the resulting coating.

Disclosed herein, polymer-based 1D PCs were made from a model system using poly(styrene)-block-poly(isobutyl methacrylate) brush block copolymers (BBCPs). The BBCPs were synthesized via a grafting-through approach with ring opening metathesis polymerization from norbornene based poly(styrene) and poly(isobutyl methacrylate) macromonomers. The BBCPs were fully dissolved in solution to 25 weight % solids wherein no additives, or 0.4 weight % of a pigment or dye relative to total solution mass was added (FIG. 4 to FIG. 11). The compositions of the formulations are shown in Table 1.

TABLE 1

Formulation Compositions.

| FIG. | BBCP (wt %) | Additive Identity | Additive (wt %) | Solvent* (wt %) |
|---|---|---|---|---|
| 4 | 20.0 | none | 0 | 80.0 |
| 5 | 19.9 | Acridine Base | 0.4 | 79.7 |
| 6 | 19.9 | Carmine | 0.4 | 79.7 |
| 7 | 19.9 | Perylene | 0.4 | 79.7 |
| 8 | 19.9 | Acridine Hydrate | 0.4 | 79.7 |
| 9 | 19.9 | Guaiazulene | 0.4 | 79.7 |
| 10 | 19.9 | Eosin Y | 0.4 | 79.7 |
| 11 | 19.9 | Bromothymol | 0.4 | 79.7 |

*Solvent is 4-chlorobenzotrifluoride.

Figure 4:
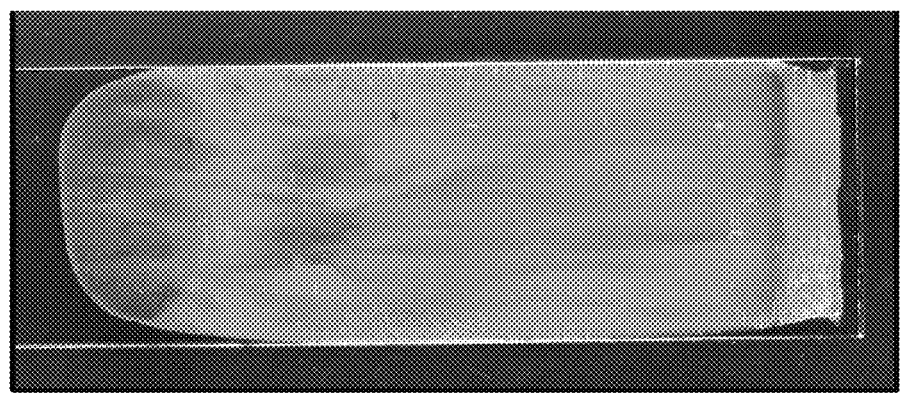
FIG. 4. Reflection (solid line) and transmission (dashed line) of a PS-b-iBuMA photonic crystal film.
Figure 4:
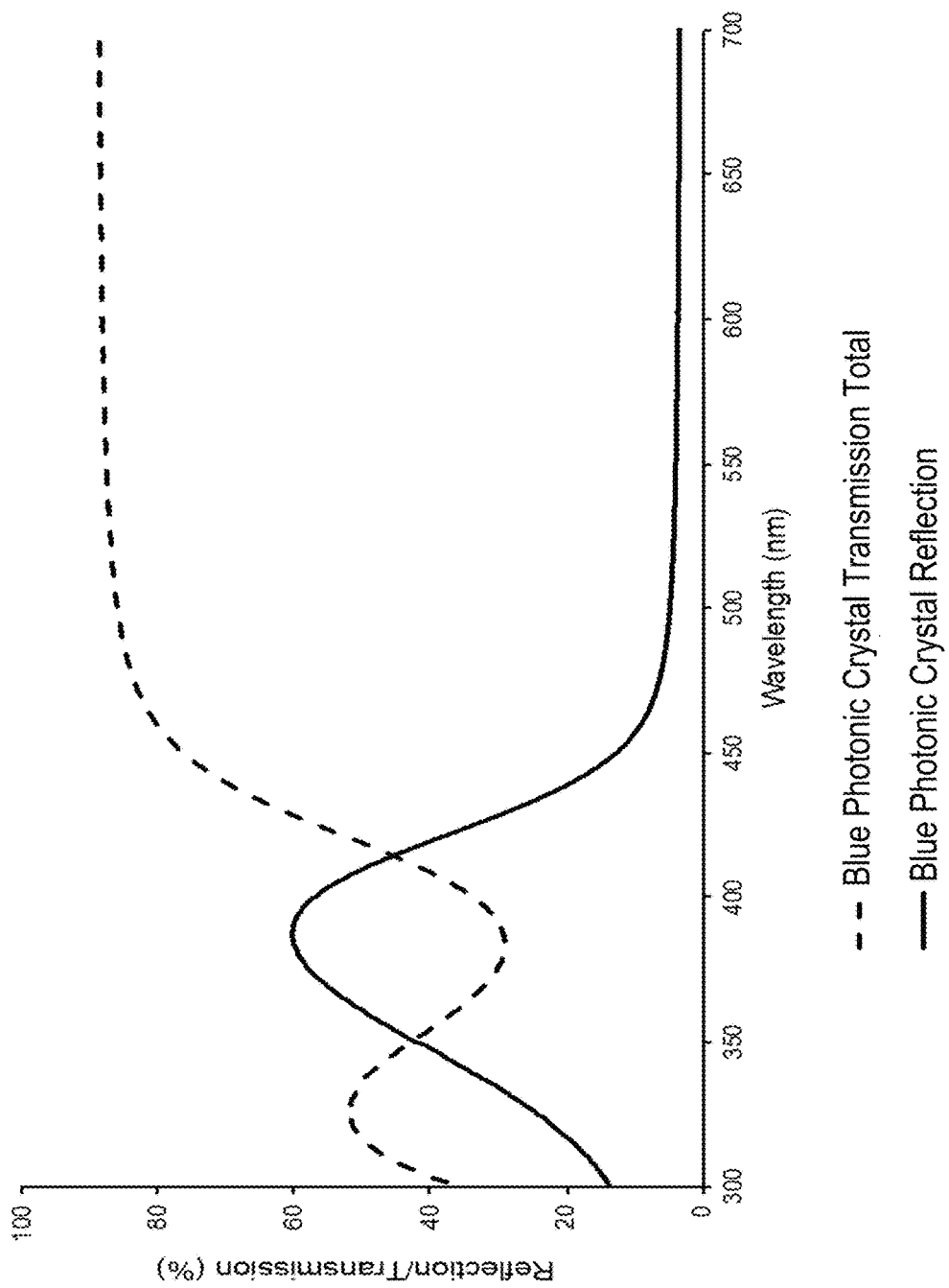
Figure 5:
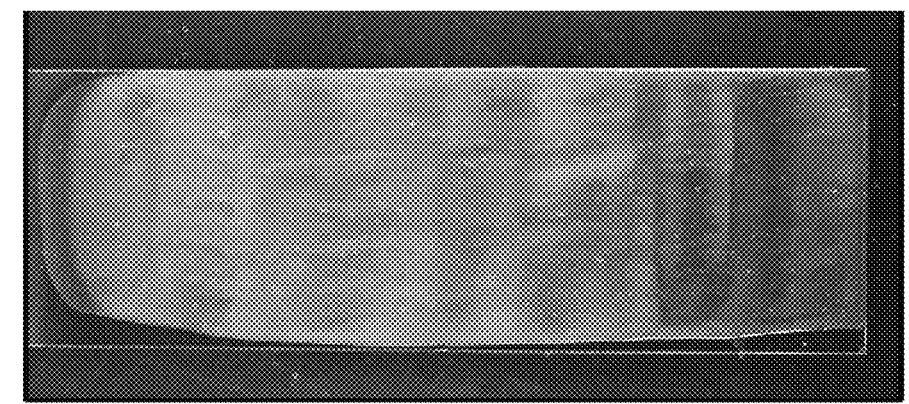
FIG. 5. Reflection and transmission spectra of a PS-b-iBuMA photonic crystal film, and a PS-b-iBuMA photonic crystal with added Acridine base.
Figure 5:
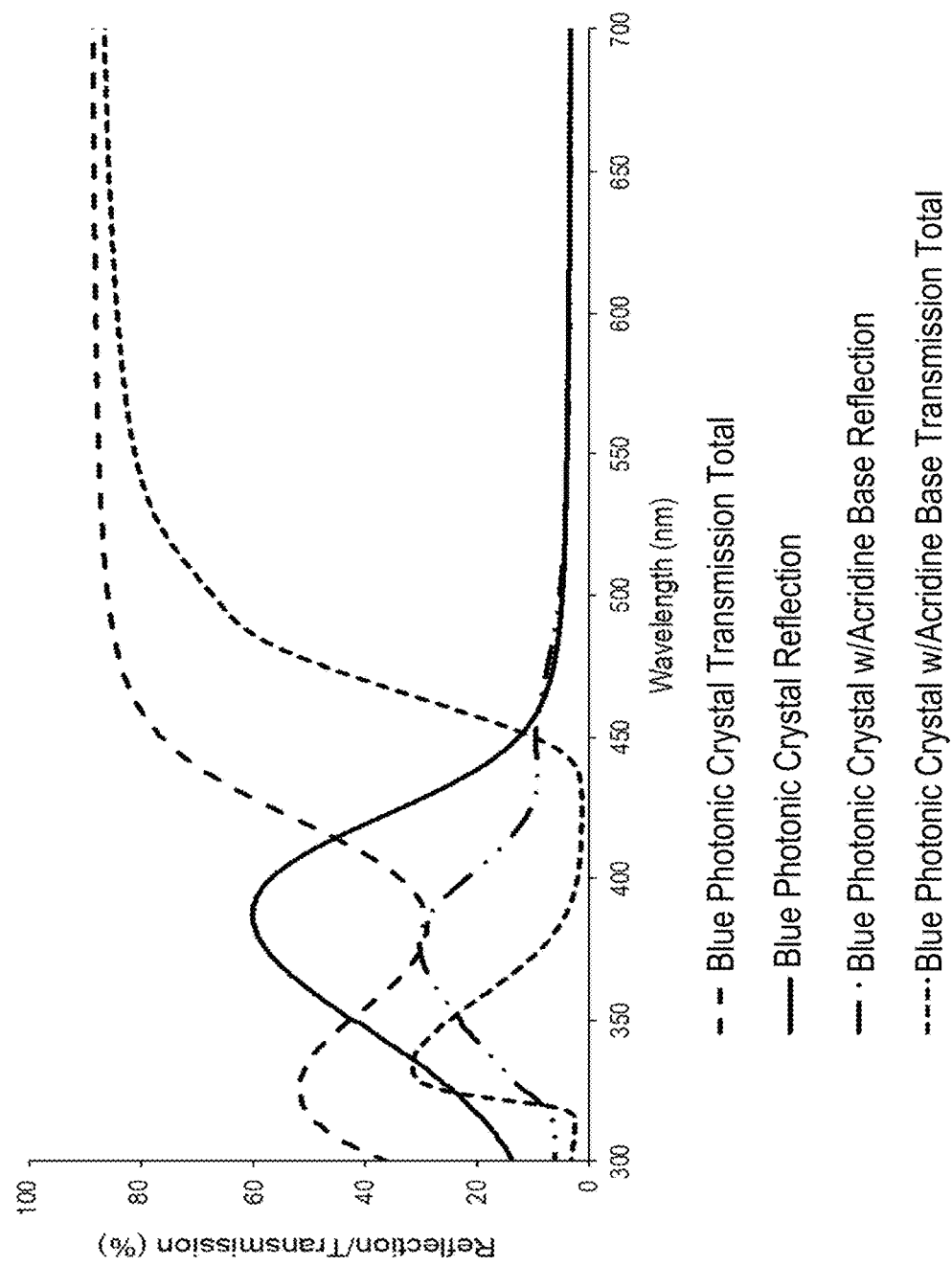
Figure 6:
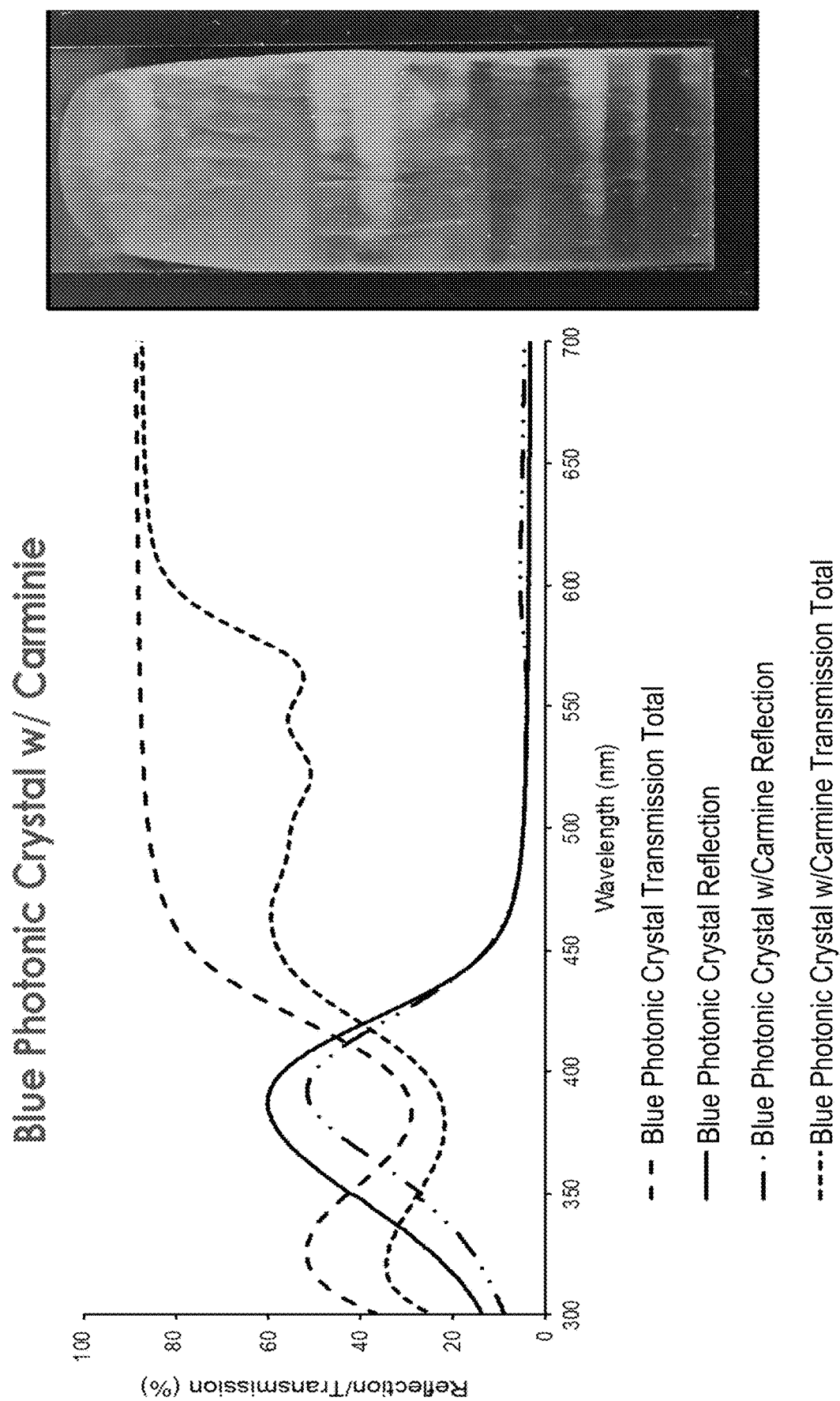
FIG. 6. Reflection and transmission spectra of a PS-b-iBuMA photonic crystal film, and a PS-b-iBuMA photonic crystal with added Carmine.
Figure 7:
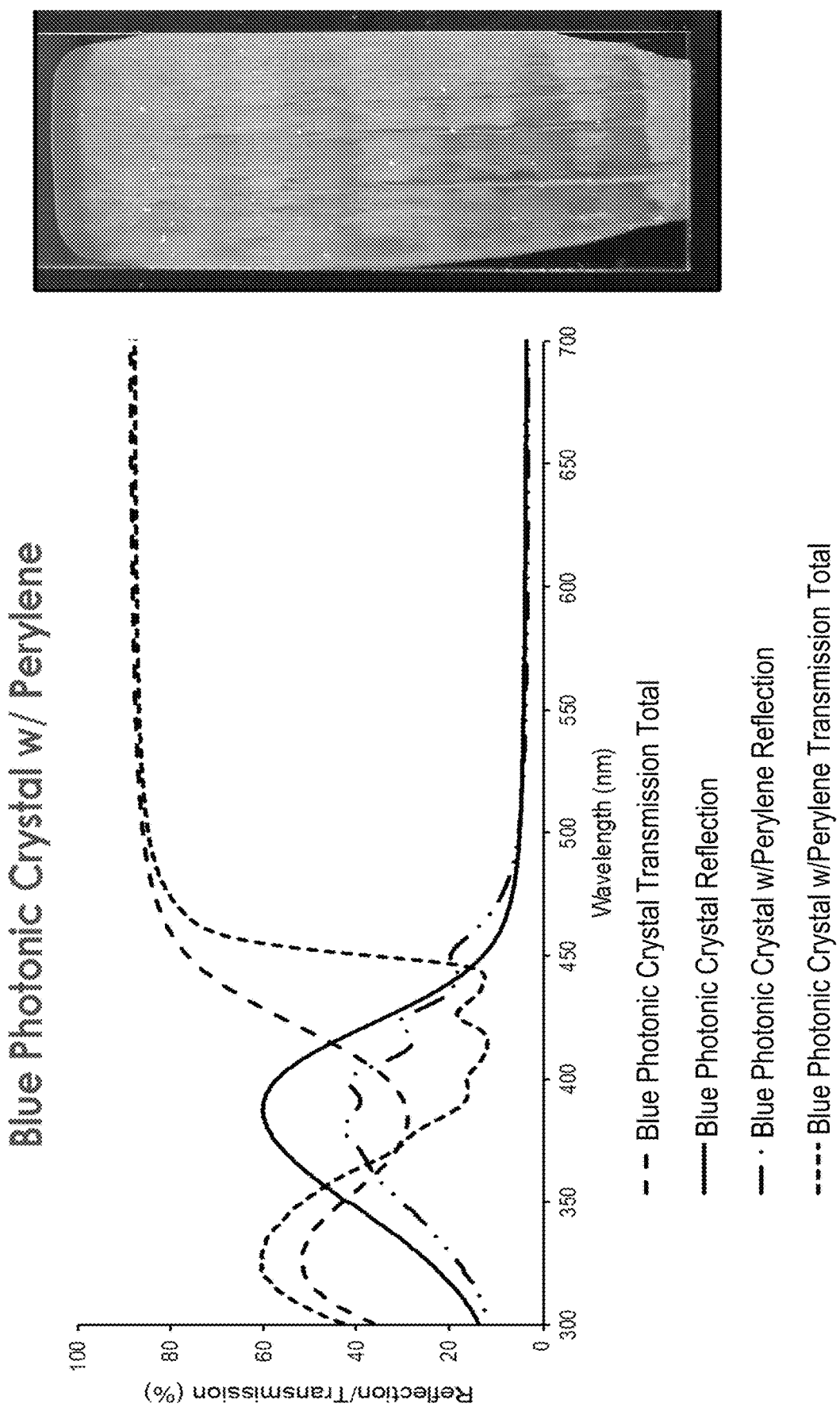
FIG. 7. Reflection and transmission spectra of a PS-b-iBuMA photonic crystal film, and a PS-b-iBuMA photonic crystal with added Perylene.
Figure 8:
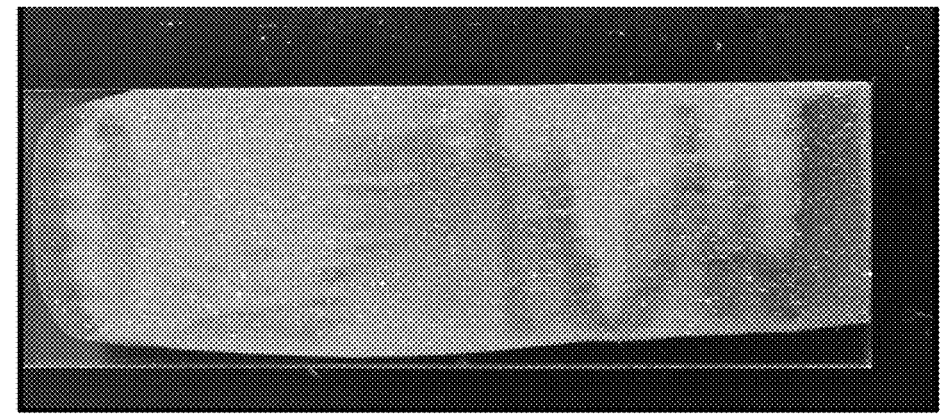
FIG. 8. Reflection and transmission spectra of a PS-b-iBuMA photonic crystal film, and a PS-b-iBuMA photonic crystal with added Acridine hydrate.
Figure 8:
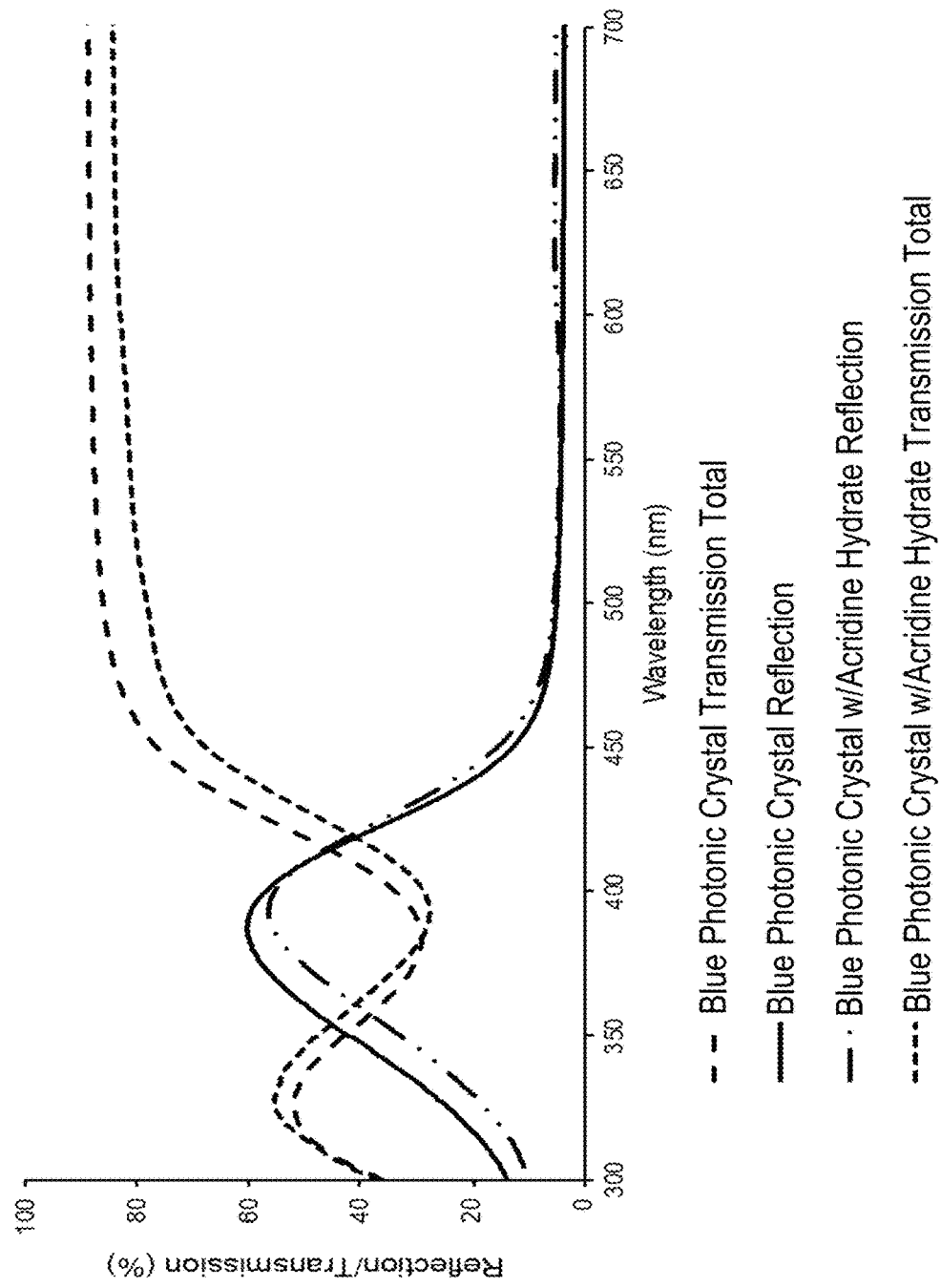
Figure 9:
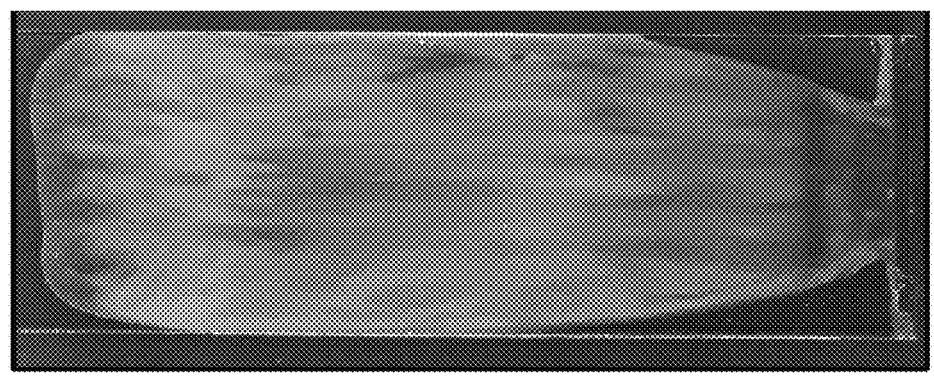
FIG. 9. Reflection and transmission spectra of a PS-b-iBuMA photonic crystal film, and a PS-b-iBuMA photonic crystal with added Guaiazulene.
Figure 9:
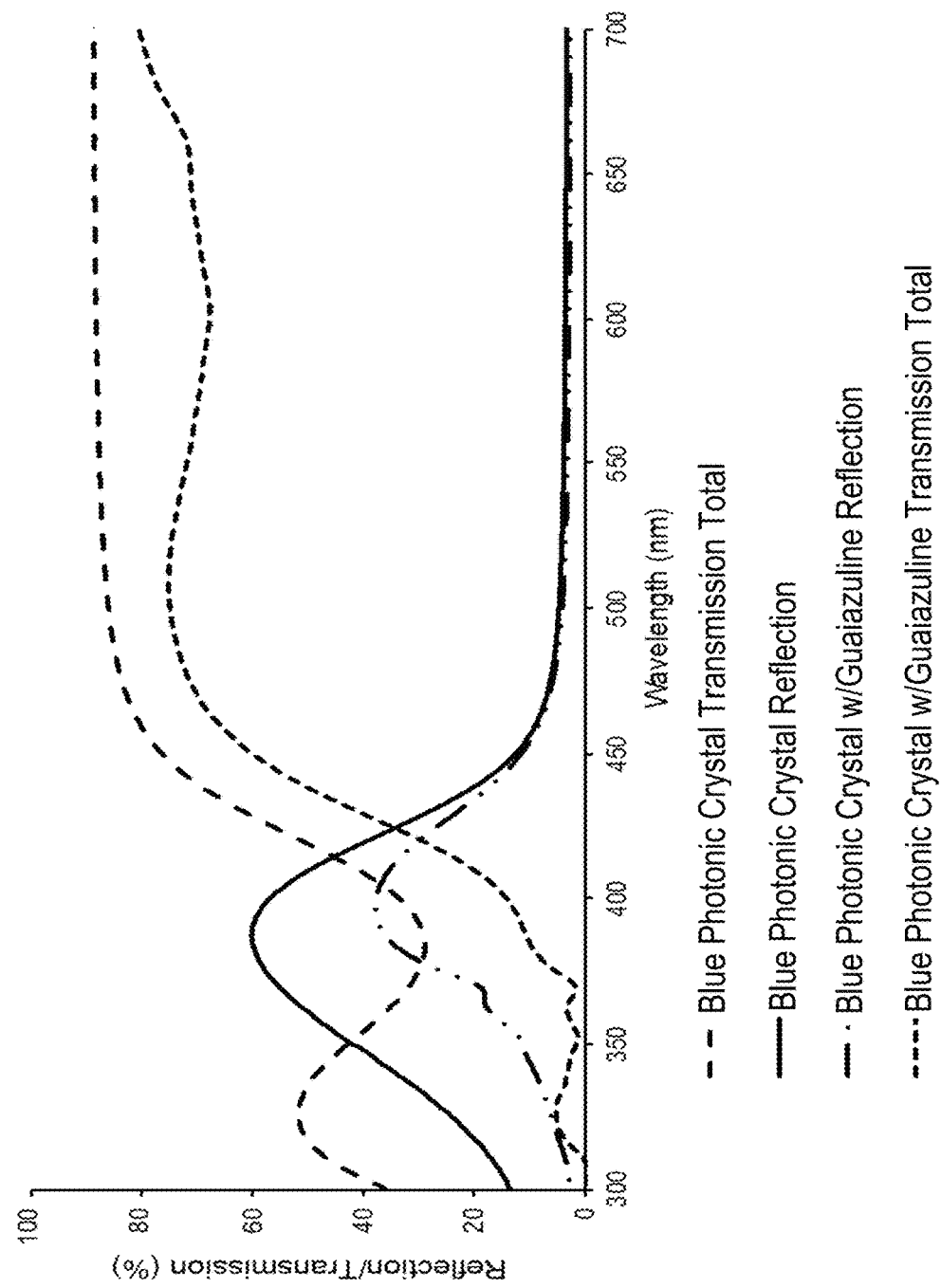
Figure 10:
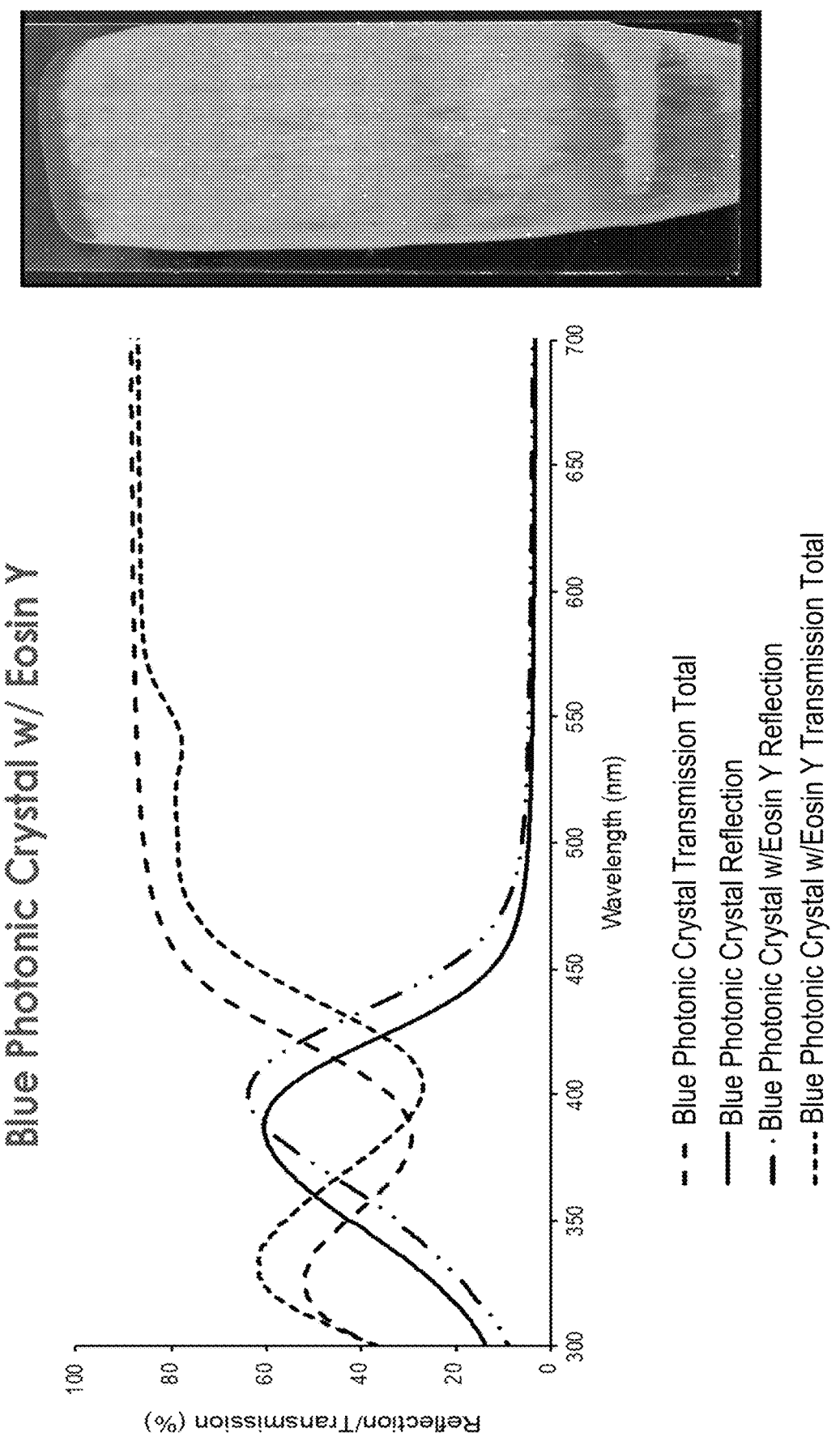
FIG. 10. Reflection and transmission spectra of a PS-b-iBuMA photonic crystal film, and a PS-b-iBuMA photonic crystal with added Eosin Y.
Figure 11:
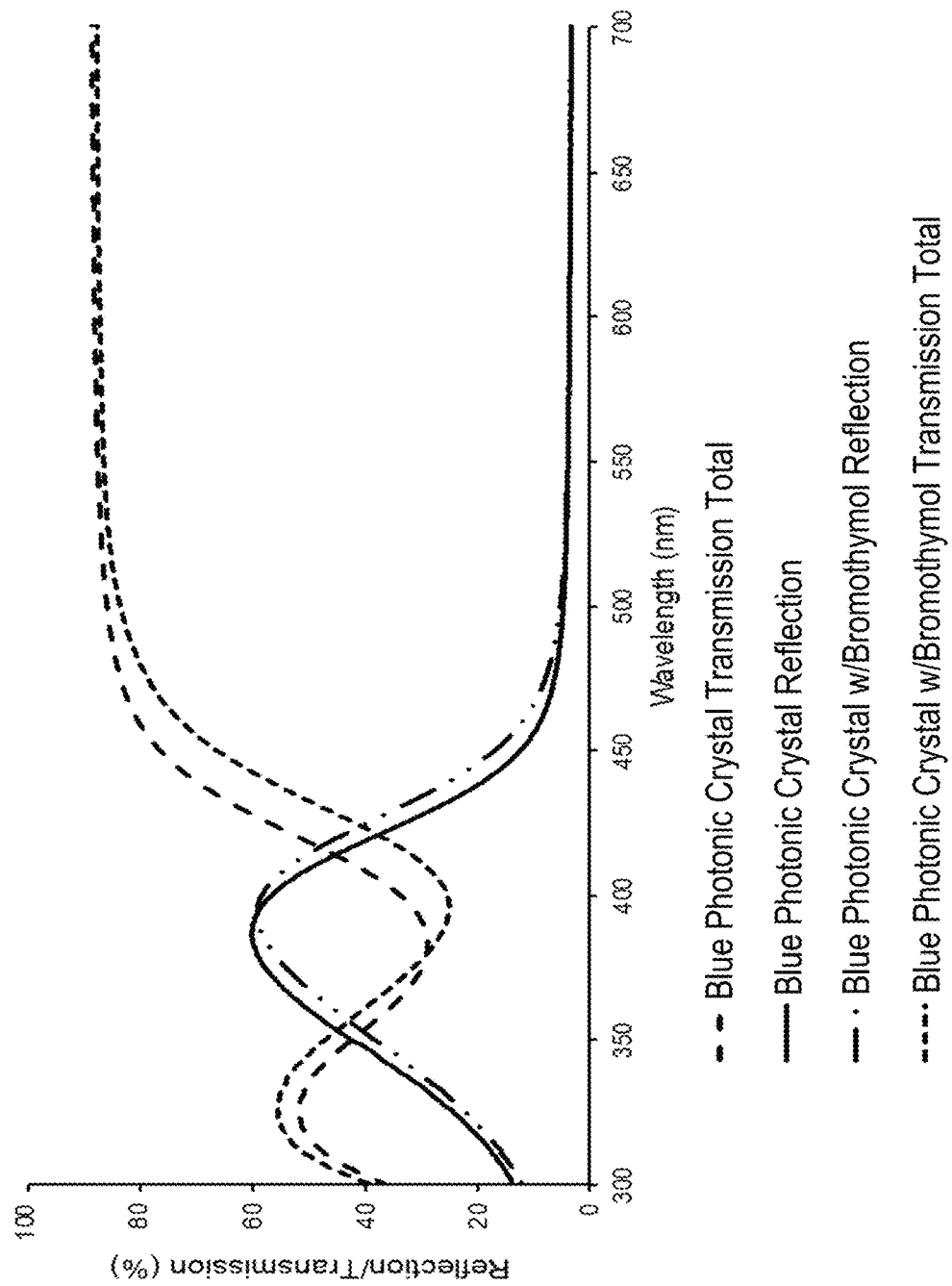
FIG. 11. Reflection and transmission spectra of a PS-b-iBuMA photonic crystal film, and a PS-b-iBuMA photonic crystal with added Bromothymol.

Films were cast at a 4.0 mil wet film thickness using a bird bar. FIG. 4 displays the reflection and transmission of a PC film on a microscope glass slide substrate. In FIGS. 5-11, films contain a dye or pigment and contrasted to the control in FIG. 4. In FIGS. 5-11, the dye or pigment changes the optical properties and therefore appearance of the coating on glass.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

Examples

Example 1. Materials and Methods

The compositions of the polymer composite materials were prepared from a brush block copolymer, a linear poly(lactic acid), a linear poly(styrene), linear poly(2-ethylhexyl methacrylate), zirconium dioxide nanocrystals (7 nm average diameter from Pixelligent Technologies LLC), or a combination thereof. Polymer films of the compositions were deposited on microscope glass slides, and reflectance and transmittance spectra were recorded on a Cary 5000 UV-Vis-NIR spectrophotometer with a diffuse reflectance accessory.

For examples of linear polymer additives that can be used in the compositions, see *J. Am. Chem. Soc.* 2014, 136, 17374. The disclosure of U.S. Publication No. 2018/0258230, which describes useful copolymers and relevant synthetic techniques, is incorporated herein by reference. Preparation of polymer composite material components can be carried out as follows.

Linear Poly(Lactic Acid):

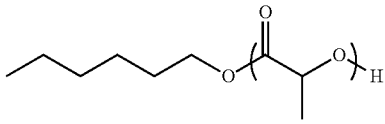

To a degassed, backfilled with nitrogen, and three times flame dried 200 mL Schlenk flask equipped with stir bar was added newly sublimed lactide (51.8 g), and tin(II) 2-ethylhexanoate, lastly anhydrous hexanol (1.948 mL) was syringed in. The reaction was heated to 135° C. As the reaction preceded lactide sublimed on the sidewalls of the flask which was melted with a heat gun back into solution to insure quantitative consumption of monomer. After 3.5 hours, the reaction was diluted with dichloromethane (DCM) and filtered through a celite plug and precipitated into methanol. Yield: 75%, $M_n$=3,050 Da, PDI=1.07.

Linear Poly(Styrene):

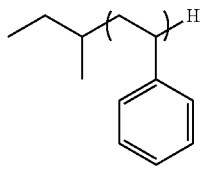

To a degassed, backfilled with nitrogen, and three times flame dried 1 L Schlenk flask equipped with stir bar was added dried and degassed Toluene (700 mL). The reaction flask was put in an ice bath and 1.4M sec-butyl lithium (25 mL, 2.24 g, 0.035 mol, 1 eq.) in cyclohexane was added to the stirring Toluene. After 20 minutes of the solution stirring, freshly dried over CaH$_2$ and distilled styrene (120 mL, 109 g, 1.05 mol, 29.9 eq.) was added by a 60 mL syringe in a fairly rapid fashion—no significant exotherm was observed, the solution immediately turned from clear to orange/red. After 2 hours ~50 mL of methanol was syringed in to quench the reaction.

Work up: The solution was concentrated in a rotary evaporator so that the remaining toluene, methanol, cyclohexane, and propylene oxide were removed. The polymer was dissolved in THF and precipitated at room temperature in a stirring methanol solution. Yield: 98%, $M_n$=3,100 Da, PDI=1.05.

Linear Poly(2-Ethylhexyl Methacrylate):

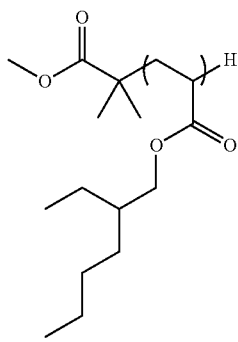

To a degassed, backfilled with nitrogen, and three times flame dried 100 mL Schlenk flask equipped with stir bar was added DCM solvent, 2-ethylhexyl methacrylate monomer, and methyl trimethylsilyl dimethylketene acetal. TMS-triflimide catalyst was added to initiate the polymerization. The polymerization proceeded at room temperature and quenched after 3 hr, when >99% conversion by $^1$H NMR was confirmed. After quenching with acidified methanol, the solution was filtered through an alumina plug to remove residual catalyst and decomposed catalyst products and concentrated under reduced pressure. Yield: 89%, $M_n$=3,100 Da, PDI=1.11.

Example 2. Polystyrene Macromonomer Synthesis

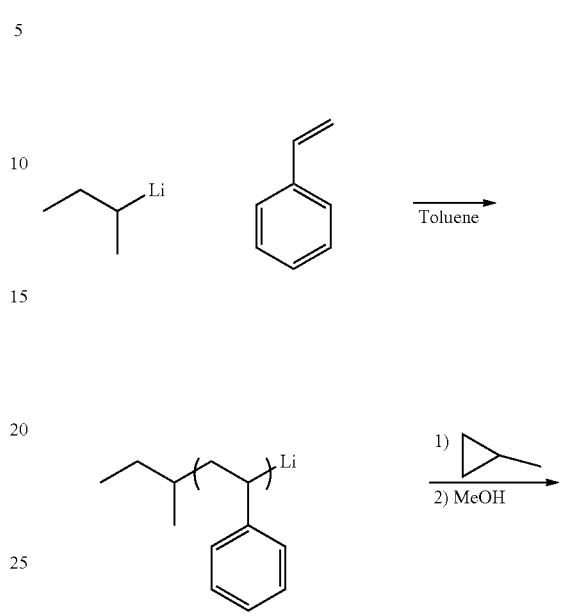

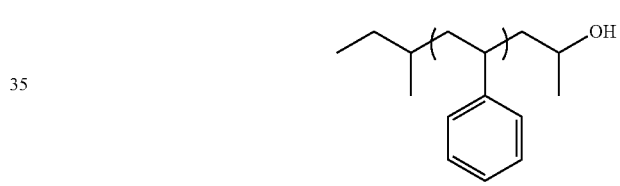

Alcohol terminated Polystyrene: To a degassed, backfilled with nitrogen, and three times flame dried 1 L Schlenk flask equipped with stir bar was added dried and degassed Toluene (700 mL). The reaction flask was put in an ice bath and 1.4M sec-butyl lithium (25 mL, 2.24 g, 0.035 mol, 1 eq.) in cyclohexane was added to the stirring Toluene. After 20 minutes of the solution stirring, freshly dried over CaH$_2$ and distilled styrene (120 mL, 109 g, 1.05 mol, 29.9 eq.) was added by a 60 mL syringe in a fairly rapid fashion—no significant exotherm was observed, the solution immediately turned from clear to orange/red. After 2 hours propylene oxide (2.816 mL, 0.0403 mol, 1.15 eq.) was added to terminate the polystyrene chain and provide the appropriate functionality. This reaction was stirred overnight, followed by ~50 mL of methanol was syringed in to quench the reaction. Work up: The solution was concentrated in a rotary evaporator so that the remaining toluene, methanol, cyclohexane, and propylene oxide were removed. The polymer was dissolved in THF and precipitated at room temperature in a stirring methanol solution. 98% Recovery, $M_n$=3,153 Da, PDI=1.05.

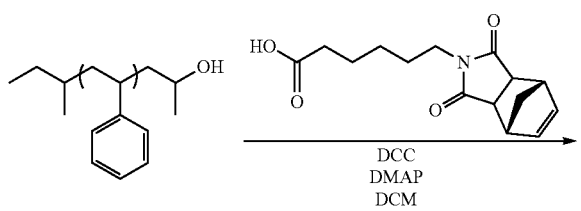

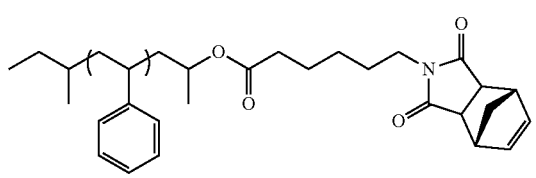

Coupling of Polystryene Alcohol and Norbornene Carboxylic Acid: To a degassed, backfilled with nitrogen, and three times flame dried 1 L Schlenk flask equipped with stir bar was added the propylene oxide terminated polystyrene (60.0 g, 0.019 mmol, 1 eq.), norbornene carboxylic acid A (6.24, 0.228 mmol, 1.2 eq.), and DMAP (2.32 g, 0.190 mmol, 1.0 eq.). The mixture was dissolved in dry DCM ~650 mL and allowed to stir over an ice bath for 30 minutes. After which, DCC (7.87 g, 0.038 mmol, 2.0 eq.) was added over 10 minutes to the solution under positive nitrogen flow. The reaction was allowed to react overnight.

Work up: After 24 hours the solution was re-cooled down to 0° C. and filtered through a medium frit to remove the dicyclohexyl urea. The filtered solution was then cooled down once more to −20° C. and filtered a second time for any remaining dicyclohexyl urea precipitate. Once filtered the solution was concentrated in the rotary evaporator, then dissolved in THF and precipitated at room temperature 5 times in a stirring methanol solution. Yield=75%.

Example 3. Isobutyl Methacrylate Macromonomer Synthesis

Synthesis of N-(ethylmethacrylate)-cis-5-norbornene-exo-2,3-dicarboximide: To a 1 L Schlenk flask which was flame dried and backfilled with nitrogen 3 times was added N—(Hydroxyethyl)-cis-5-norbornene-exo-2,3-dicarboximide (83.4 g, 403 mmol, 1.0 eq.), 4-(dimethylamino)pyridine (29.5 g, 241 mmol, 0.6 eq.), methacrylic acid (44.0 mL, 519 mmol, 1.3 eq.), and 650 mL of anhydrous DCM. The heterogenous solution was allowed to mix for 20 minutes over an ice bath, then, 1-ethyl-3-(d-dimethylaminopropyl) carbodiimide (93.8 g, 604 mmol, 1.5 eq.) was added slowly under positive nitrogen. The reaction was allowed to proceed for two days after which the organic layer was washed with 0.5M HCl, a saturated $NaHCO_3$ solution, water, brine, dried over $MgSO_4$, then passed through 200 g of alumina to scavenge any additional methacrylic acid. The organic layer was then concentrated in the dark due to the product being light sensitive in solution to give a white solid (46 g, 42% yield).

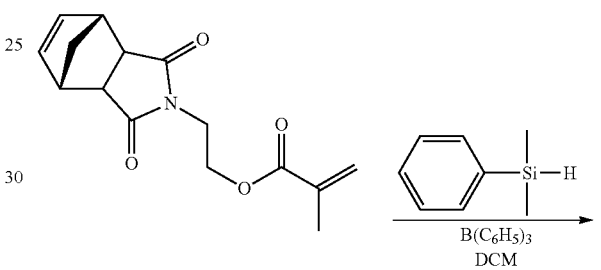

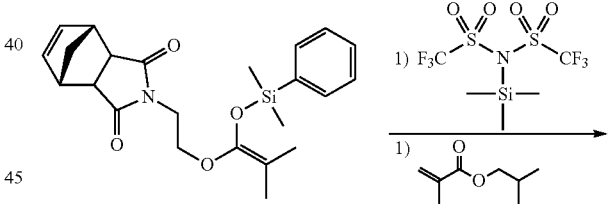

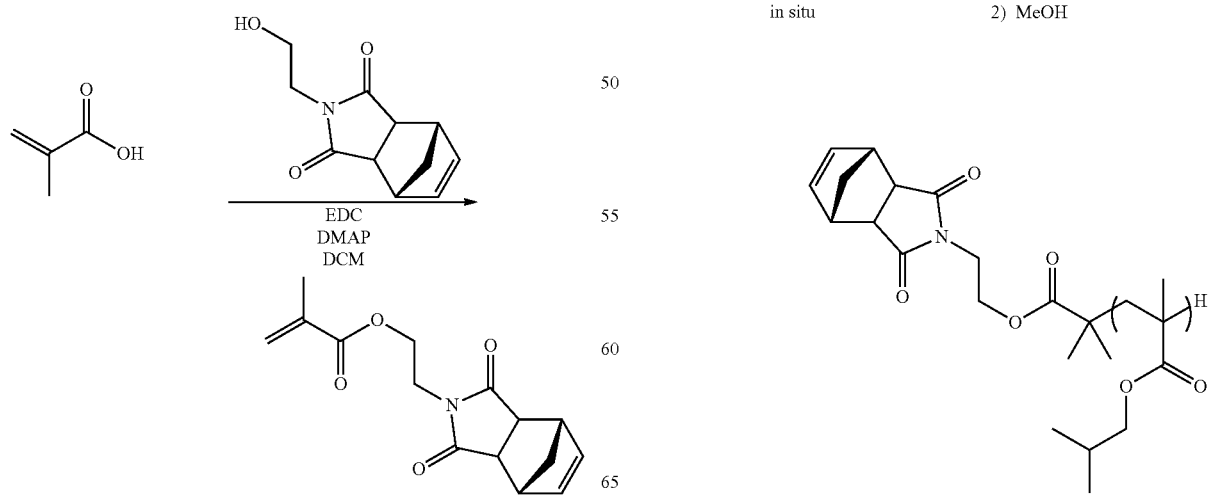

Group Transfer Polymerization: A 250 mL Erlynmeyer flask with a 24/40 adapter and stir bar was dried in an oven and loaded into the glovebox hot. In the glovebox was added 75 mL of anhydrous DCM from the solvent system. To this was added degassed dimethylphenylsilane (573 µL, 3.74 mmol, 1.03 eq.) followed by once sublimed tris(pentafluorophenyl) borane (18.6 mg, 0.0363 mmol, 0.01 eq.). After this solution was allowed to stir for 1 minute, a solution of N-(ethyl-methacrylate)-cis-5-norbornene-exo-2,3-dicarboximide (1.00 g, 3.36 mmol, 1.0 eq.) in 10 mL of DCM (0.5M) was added dropwise over 5 minutes (more than 100 drops total). This solution was stirred for an additional 15 minutes wherein ibutyl methacrylate (10.49 mL, 0.0653 mmol, 18 eq.), which was dried with $CaH_2$ and distilled, was syringed into the stirring solution. Lastly, N-(Trimethylsilyl) bis (trifluoromethanesulfonyl) imide (51 µL, 0.1456 mmol, 0.04 eq.) was added. $M_n$=2,940 Da, PDI=1.07.

Example 4. Brush Block Copolymer (BBCP) Synthesis

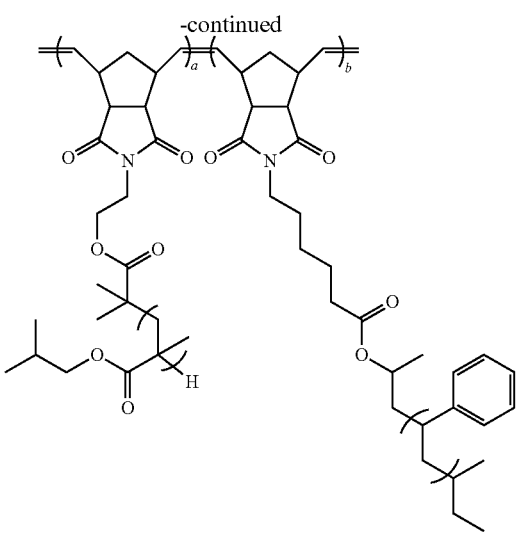

BBCP1

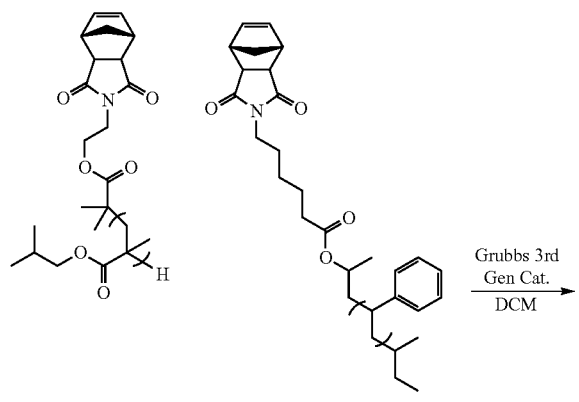

BBCP1: To a vial containing isobutyl methacrylate macromonomer (200 eq.) and a stir bar was added $CH_2Cl_2$ to give a 0.05 M solution. The polymerization was initiated by the addition of Grubbs $3^{rd}$ generation catalyst (1.0 eq.). After stirring for 1 hour at room temperature, a solution of $CH_2Cl_2$ and pyridine (1.0 mM, 5.0 eq.) was added. In a separate vial, a solution of the second block was prepared by addition of styrene macromonomer (200 eq.) to $CH_2Cl_2$ (0.05 M). The second block was introduced to the first block reaction mixture in one shot using a plastic syringe. The resulting mixture was allowed to stir at room temperature for an additional 5 h. The reaction was quenched by addition of excess ethyl vinyl ether, and the block copolymer was isolated by precipitating into methanol at −78° C.

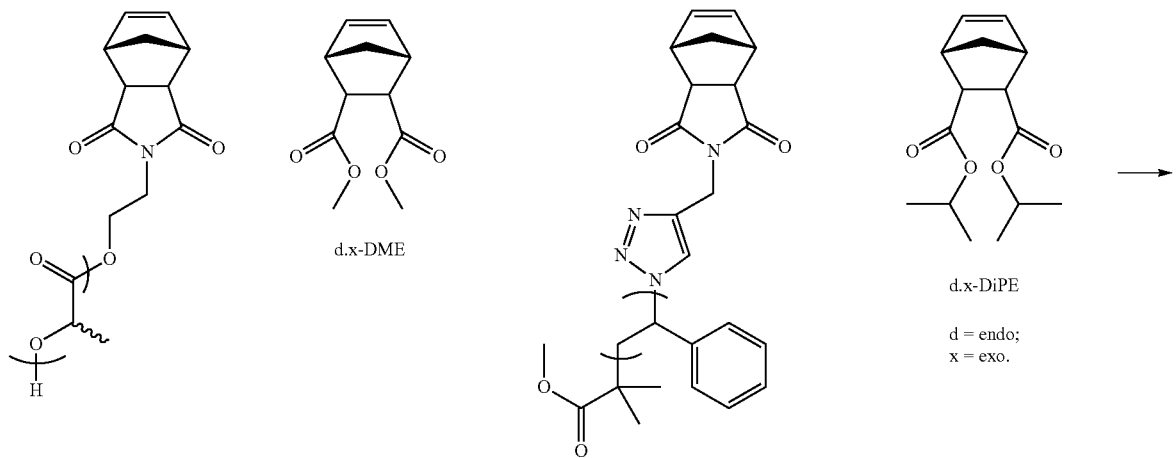

d = endo;
x = exo.

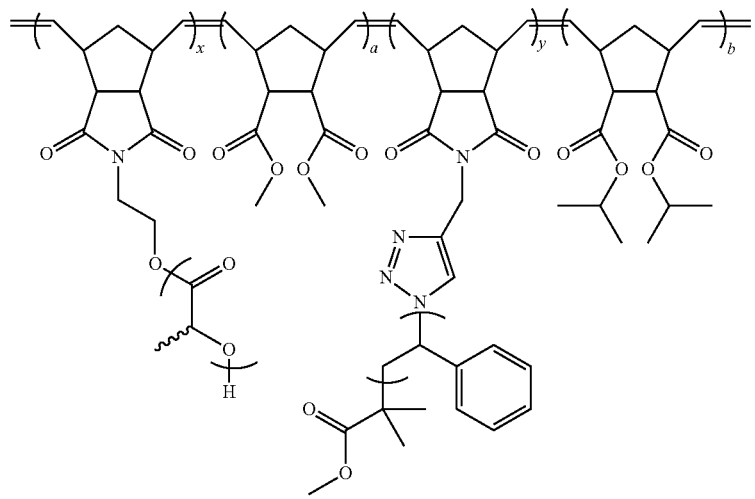

BBCP2

BBCP2 (see *J. Am. Chem. Soc.* 2017, 139, 17683): To a 30 mL brown vial containing PLA-MM (1173 mg, 0.325 mmol, $M_n$=3608 Da) and a stir bar was added a $CH_2Cl_2$ solution of d,x-DME (68.32 mg in 6.5 mL, 0.325 mmol, 0.05M). The copolymerization was initiated by addition of Grubbs' $3^{rd}$ generation catalyst $((H_2IMes)\text{-}(pyr)_2(Cl)_2RuCHPh$, 1.91 µmol) targeting $PLA_{170}\text{-r-}DME_{170}$. After stirring for 75 minutes at room temperature, an aliquot was extracted for analysis, and a $CH_2Cl_2$ solution of pyridine was added (3.8 mL, 1.0 mM). In a separate vial, the solution of the second block was prepared by dissolving PS-MM (1138 mg, 0.325 mmol, $M_n$=3500 Da) with a $CH_2Cl_2$ solution of d,x-DiPE (86.56 mg in 6.5 mL, 0.325 mmol, 0.05M). The second block was then introduced to the first block reaction mixture in one shot using a 12 mL plastic syringe. The resulting mixture was stirred at room temperature for an additional 12 h. The reaction was quenched by addition of 0.5 mL ethyl vinyl ether, and the block copolymer was isolated by precipitation into methanol at −78C. $M_n$=1,020,000 Da, PDI=1.09. Yield: 92%.

Example 5. Experimental Procedures for Films of FIGS. 4-11

The following procedure describes the assembly of a polymer composite photonic crystal coating including the coatings (films) used for development of FIGS. 4-11:

a) Weigh out the desired mass of solid materials to be included in the formulation, including the brush block copolymer, polymeric additives, and any further additives, into the appropriate mixing vessel.

b) Add the desired amount of solvent to the mixing vessel, and seal to prevent solvent evaporation. After the solids have fully dissolved in the solvent, remove the vessel from the chosen mixing method (centrifugal mixer, high shear mixer, magnetic stirrer, mechanical stirrer, or the like).

c) Deposit the formulation onto a substrate of choice using a 1.5 mil to 6 mil wet thickness bird bar applicator, or via other deposition method (spray coating, wire bar, or the like).

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A photonic crystal composition comprising brush block copolymer (BBCP) of Formula IA or Formula IB:

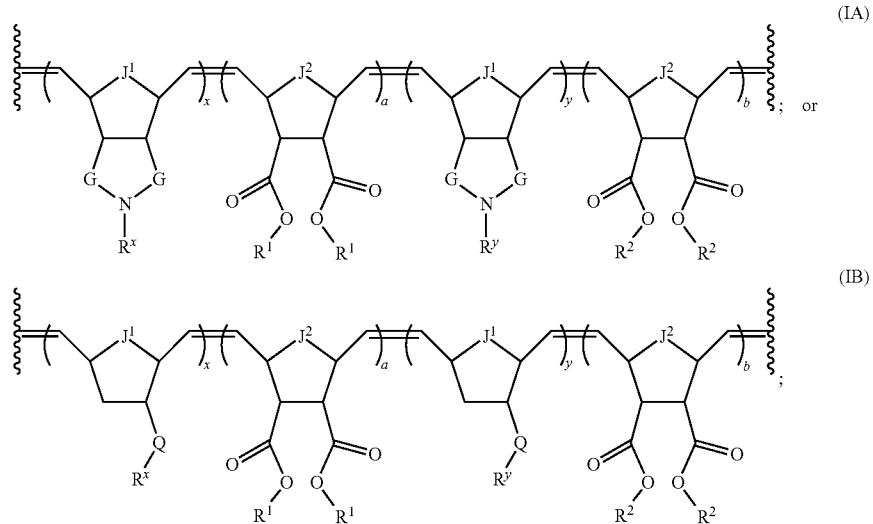

and optionally a pigment;
wherein
- $R^x$ is —$(C_2-C_6)$alkyl-OC(=O)$G^1$, wherein $G^1$ comprises polyacrylate, polymethacrylate or polylactic acid; or —$(C_1-C_8)$alkyl-$G^2$-$G^3$, wherein $G^2$ is —C(=O)O— or a nitrogen heterocycle and $G^3$ comprises polystyrene, polyacrylate, polydimethylsiloxane, polyether, polymethacrylate, or polylactic acid;
- $R^y$ is —$(C_2-C_6)$alkyl-OC(=O)$G^1$, wherein $G^1$ comprises polyacrylate, polymethacrylate or polylactic acid; or —$(C_1-C_8)$alkyl-$G^2$-$G^3$, wherein $G^2$ is —C(=O)O— or a nitrogen heterocycle and $G^3$ comprises polystyrene, polyacrylate, polydimethylsiloxane, polyether, polymethacrylate, or polylactic acid;
- $R^1$ is unbranched alkyl;
- $R^2$ is branched alkyl;
- each G is each independently $CH_2$ or C=O;
- each $J^1$ is independently $CH_2$, C=O, or O;
- each $J^2$ is independently $CH_2$, C=O, or O;
- each Q is independently alkyl, cycloalkyl, heterocycloalkyl, carbonyl, silyl, aryl, or heteroaryl;
- a and b are each independently 0 to 1000; and
- x and y are each independently 1 to 1000;
    wherein blocks a, b, x and y are in any order, a ratio of x:a is 1:0 to 1:3, and a ratio of y:b is 1:0 to 1:3.

2. The composition of claim 1, wherein composition comprises a pigment and the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof.

3. The composition of claim 2, wherein the pigment is acridine, bromothymol, carmine, Eosin Y, Guaiazulene, perylene, or a combination thereof.

4. The composition of claim 1, wherein a and b are each independently 1 to 300, or x and y are each independently 1 to 300.

5. The composition of claim 1, wherein the ratio of x:a is 1:0.5 to 1:1.

6. The composition of claim 1, wherein the ratio of y:b is 1:0.5 to 1:1.

7. The composition of claim 1, wherein a weight percent of the BBCP is 25% to 99.9% and the weight percent of the pigment is 0.1% to 10%.

8. The composition of claim 1, wherein the composition further comprises a metal oxide, a polymer additive, or a combination thereof.

9. The composition of claim 1, wherein the composition further comprises zirconium dioxide nanocrystals.

10. The composition of claim 1, wherein the BBCP of Formula IA is a BBCP of Formula IC or Formula II:

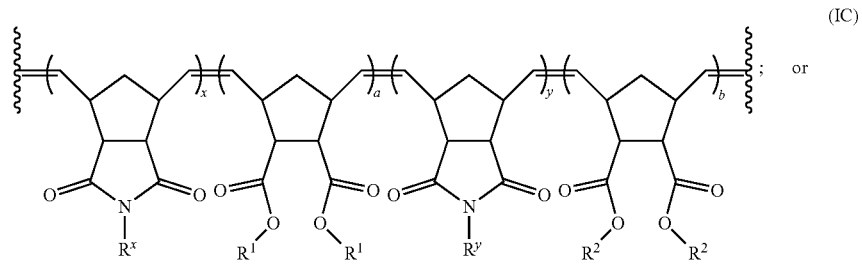

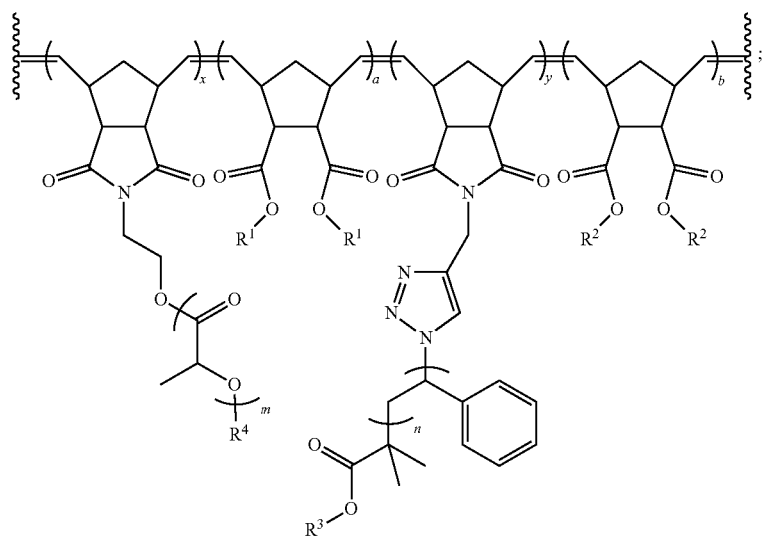

(II)

wherein $R^3$ and $R^4$ are each independently H or unbranched or branched—$(C_1\text{-}C_6)$alkyl; and m and n are each independently 1 to 100.

11. The composition of claim 10, wherein m and n are each independently 10 to 50.

12. The composition of claim 1, wherein the BBCP of Formula IA is a BBCP of Formula III:

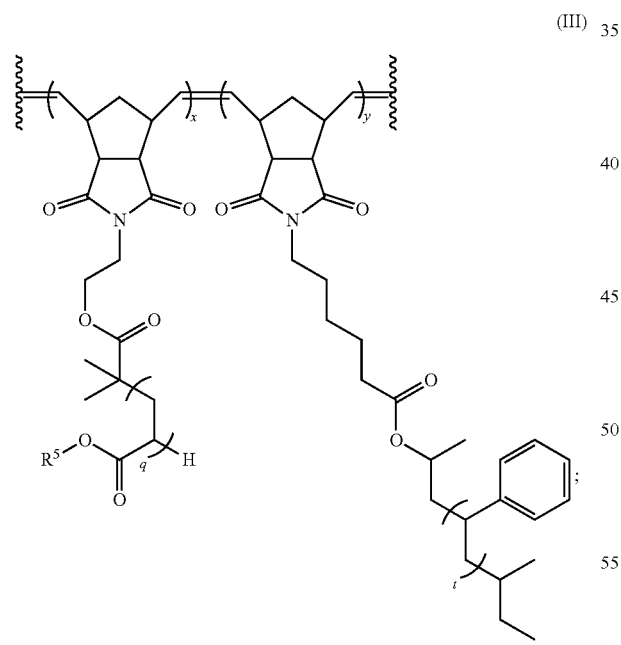

(III)

wherein $R^5$ is H or unbranched or branched—$(C_1\text{-}C_6)$alkyl; and q and t are each independently 1 to 100.

13. A method of modulating an electromagnetic radiation reflectance, absorbance and transmission profile of a substrate comprising coating a substrate with a film of a photonic crystal composition, wherein the photonic crystal composition comprises brush block copolymer (BBCP) of Formula IA or Formula IB:

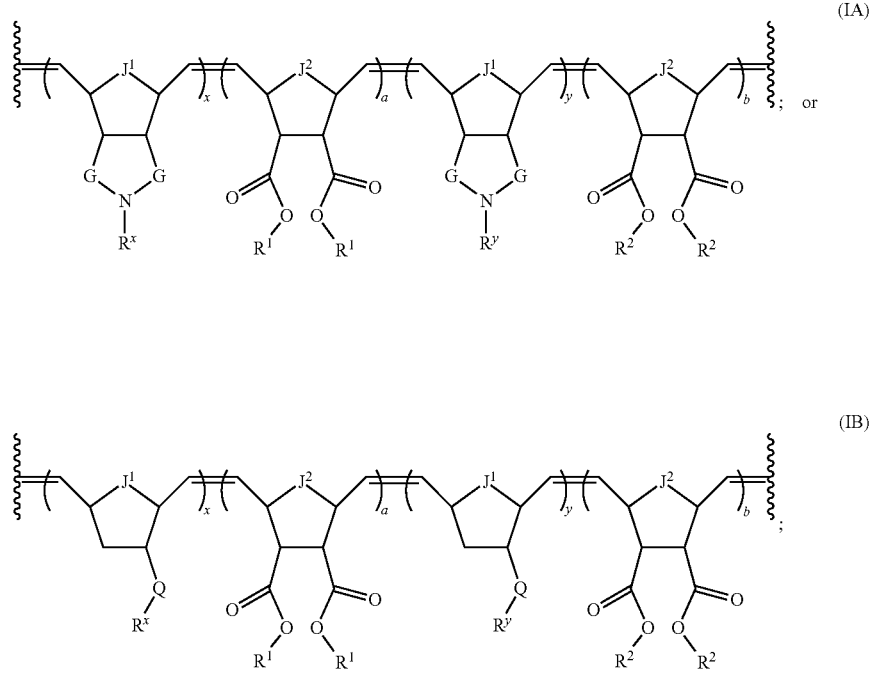

and a pigment;
wherein
R$^x$ is —(C$_2$-C$_6$)alkyl-OC(=O)G$^1$, wherein G$^1$ comprises polyacrylate, polymethacrylate or polylactic acid; or —(C$_1$-C$_8$)alkyl-G$^2$-G$^3$, wherein G$^2$ is —C(=O)O— or a nitrogen heterocycle and G$^3$ comprises polystyrene, polyacrylate, polydimethylsiloxane, polyether, polymethacrylate, or polylactic acid;
R$^y$ is —(C$_2$-C$_6$)alkyl-OC(=O)G$^1$, wherein G$^1$ comprises polyacrylate, polymethacrylate or polylactic acid; or —(C$_1$-C$_8$)alkyl-G$^2$-G$^3$, wherein G$^2$ is —C(=O)O— or a nitrogen heterocycle and G$^3$ comprises polystyrene, polyacrylate, polydimethylsiloxane, polyether, polymethacrylate, or polylactic acid;
R$^1$ is unbranched alkyl;
R$^2$ is branched alkyl;
each G is each independently CH$_2$ or C=O;
each J$^1$ is independently CH$_2$, C=O, or O;
each J$^2$ is independently CH$_2$, C=O, or O;
each Q is independently alkyl, cycloalkyl, heterocycloalkyl, carbonyl, silyl, aryl, or heteroaryl;
a and b are each independently 0 to 1000; and
x and y are each independently 1 to 1000;
wherein blocks a, b, x and y are in any order, a ratio of x:a is 1:0 to 1:3, and a ratio of y:b is 1:0 to 1:3;
wherein the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof; and wherein the pigment in the photonic crystal composition modulates the reflectance, absorbance and transmission profile of the substrate and at least 5% more electromagnetic radiation is reflected by the coated substrate than for a corresponding uncoated substrate.

14. The method of claim 13, wherein the film has an optical thickness f-ratio of 0.25 to 0.55.

15. The method of claim 13, wherein the reflectance, absorbance and transmission profile of the substrate comprises reflected electromagnetic radiation at wavelengths of 280 nanometers to 400 nanometers; or the reflectance, absorbance and transmission profile of the substrate comprises reflected electromagnetic radiation at wavelengths of 400 nanometers to 700 nanometers; or the reflectance, absorbance and transmission profile of the substrate comprises reflected electromagnetic radiation at wavelengths of 700 nanometers to 1600 nanometers.

16. A method for forming a photonic coating comprising:
a) combining a solvent, a pigment, and a brush block copolymer (BBCP) to form a mixture, wherein BBCP is a BBCP of Formula IC:

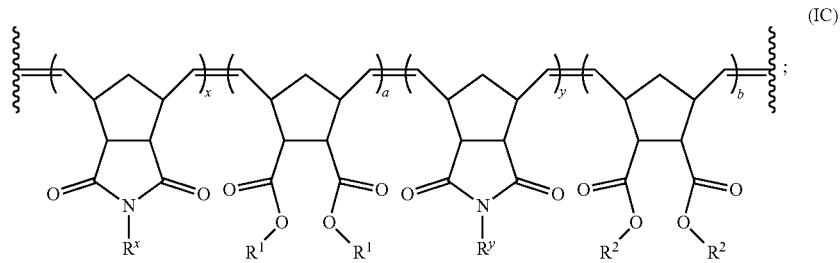

wherein
- $R^x$ is —$(C_2$-$C_6)$alkyl-OC(=O)$G^1$, wherein $G^1$ comprises polyacrylate, polymethacrylate or polylactic acid; or —$(C_1$-$C_5)$alkyl-$G^2$-$G^3$, wherein $G^2$ is —C(=O)O— or a nitrogen heterocycle and $G^3$ comprises polystyrene, polyacrylate, polydimethylsiloxane, polyether, polymethacrylate, or polylactic acid;
- $R^y$ is —$(C_2$-$C_6)$alkyl-OC(=O)$G^1$, wherein $G^1$ comprises polyacrylate, polymethacrylate or polylactic acid; or —$(C_1$-$C_5)$alkyl-$G^2$-$G^3$, wherein $G^2$ is —C(=O)O— or a nitrogen heterocycle and $G^3$ comprises polystyrene, polyacrylate, polydimethylsiloxane, polyether, polymethacrylate, or polylactic acid;
- $R^1$ is unbranched alkyl;
- $R^2$ is branched alkyl;
- a and b are each independently 0 to 1000; and
- x and y are each independently 1 to 1000;

wherein a ratio of x:a is 1:0 to 1:3 and a ratio of y:b is 1:0 to 1:3;

b) applying a layer of the mixture to a substrate; and
c) drying the layer to form a film;

wherein the film forms the photonic coating on the substrate.

17. The method of claim 16, wherein the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof.

18. The method of claim 16, wherein the mixture comprises the pigment in 0.1% to 3% by weight.

19. The method of claim 16, wherein the BBCP has a weight percent of 2.5% to 50% in the mixture; or BBCP has a number average molecular weight of 500 kDa to 4000 kDa.

20. The method of claim 16, wherein step a) further comprises adding to the mixture a metal oxide, a polymer additive, or a combination thereof.

21. The method of claim 16, wherein applying a layer of the mixture to a substrate comprises spray deposition, draw-down coating, slot die coating, screen printing, spray deposition, or paintbrush/roller of the mixture to the substrate.

22. A photonic crystal composition comprising brush block copolymer (BBCP) represented by Formula ID, IE, or IF:

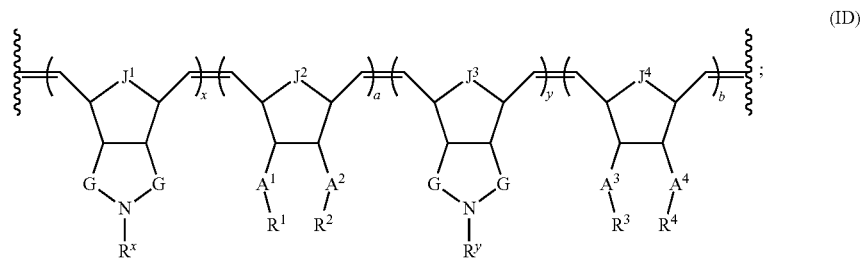

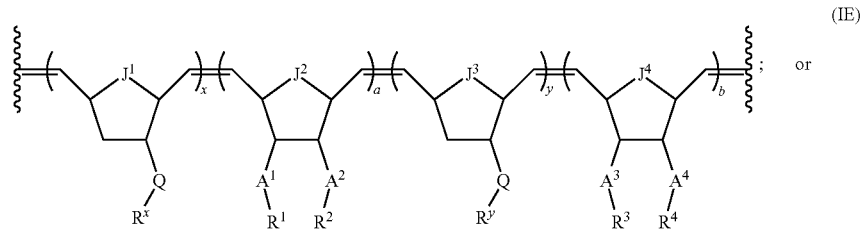

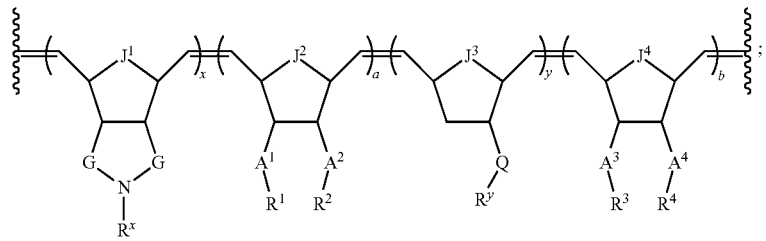

(IF)

and optionally a pigment;
wherein
  $R^x$ is —($C_2$-$C_6$)alkyl-OC(=O)$G^1$, wherein $G^1$ comprises polyacrylate, polymethacrylate or polylactic acid; or —($C_1$-$C_8$)alkyl-$G^2$-$G^3$, wherein $G^2$ is —C(=O)O— or a nitrogen heterocycle and $G^3$ comprises polystyrene, polyacrylate, polydimethylsiloxane, polyether, polymethacrylate, or polylactic acid;
  $R^y$ is —($C_2$-$C_6$)alkyl-OC(=O)$G^1$, wherein $G^1$ comprises polyacrylate, polymethacrylate or polylactic acid; or —($C_1$-$C_8$)alkyl-$G^2$-$G^3$, wherein $G^2$ is —C(=O)O— or a nitrogen heterocycle and $G^3$ comprises polystyrene, polyacrylate, polydimethylsiloxane, polyether, polymethacrylate, or polylactic acid;
  $R^1$ is unbranched or unbranched alkyl;
  $R^2$ is branched or unbranched alkyl;
  $R^3$ is branched or unbranched alkyl;
  $R^4$ is branched or unbranched alkyl;
  each G is each independently $CH_2$ or C=O;
  $J^1$ is $CH_2$, C=O, or O;
  $J^2$ is $CH_2$, C=O, or O;
  $J^3$ is $CH_2$, C=O, or O;
  $J^4$ is $CH_2$, C=O, or O;
  $A^1$, $A^2$, $A^3$, and $A^4$ are each independently

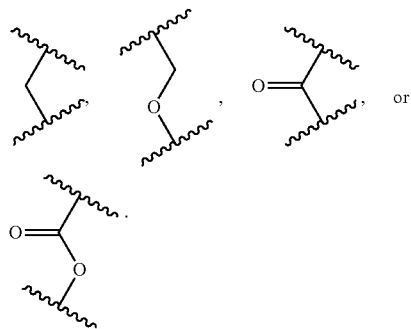

each Q is independently alkyl, cycloalkyl, heterocycloalkyl, carbonyl, silyl, aryl, or heteroaryl;
  a and b are each independently 0 to 1000; and
  x and y are each independently 1 to 1000;
    wherein blocks a, b, x and y are in any order, a ratio of x:a is 1:0 to 1:3, and a ratio of y:b is 1:0 to 1:3.

* * * * *